US012726642B2

(12) United States Patent
Giasson

(10) Patent No.: US 12,726,642 B2
(45) Date of Patent: Sep. 1, 2026

(54) METHOD AND SYSTEM FOR HIGH THROUGHPUT LIVE AND OFFLINE MULTIMEDIA TRANSCODING

(71) Applicant: CORESEE, INC., Irvine, CA (US)

(72) Inventor: Frédéric Giasson, Canton-de-Hatley (CA)

(73) Assignee: CORESEE, INC., Irvine, CA (US)

( * ) Notice: Subject to any disclaimer, the term of this patent is extended or adjusted under 35 U.S.C. 154(b) by 146 days.

(21) Appl. No.: 18/392,409

(22) Filed: Dec. 21, 2023

(65) Prior Publication Data

US 2024/0214590 A1 Jun. 27, 2024

Related U.S. Application Data

(60) Provisional application No. 63/434,448, filed on Dec. 21, 2022.

(51) Int. Cl.
*H04N 19/40* (2014.01)
*H04N 19/177* (2014.01)

(52) U.S. Cl.
CPC ........... *H04N 19/40* (2014.11); *H04N 19/177* (2014.11)

(58) Field of Classification Search
None
See application file for complete search history.

(56) References Cited

U.S. PATENT DOCUMENTS 9,609,317 B1 3/2017 Kizhepat et al.
9,787,986 B2 10/2017 Dunphy
10,003,626 B2 6/2018 Kim et al.
10,027,997 B2 7/2018 Mutton
10,165,310 B2 12/2018 Sievers et al.
10,218,826 B2 2/2019 Eswaran et al.
10,298,969 B2 5/2019 Bayoumi et al.
10,356,448 B2 7/2019 Ducloux et al.
10,595,059 B2 3/2020 Mutton
10,951,925 B2 3/2021 Reitmeyer et al.
11,184,627 B2 11/2021 Zhang et al.
(Continued)

*Primary Examiner* — Kaitlin A Retallick

(74) *Attorney, Agent, or Firm* — Knobbe, Martens, Olson & Bear, LLP

(57) ABSTRACT

A versatile high-throughput multimedia transcoding station, serving a plurality of multimedia sources, employs transcoding resources including a pool of decoders, a pool of signal-adaptors, and a pool of encoders operating concurrently to realize low-latency transcoding of high-flow-rate multimedia streams. A multimedia stream contains a video stream organized into source groups-of-pictures (GOPs). Upon receiving a transcoding request indicating characteristics of a source multimedia stream and desired characteristics of a destination multimedia stream, an orchestrator rapidly allocates a resource for each GOP and coordinates activation of a content-processing assembly which encompasses the transcoding resources and means for distributing each GOP to compatible resources. The orchestrator assembly monitors progress of GOPs' processing and, when needed under high workload fluctuation, instructs a multimedia source to pause transmission. Each of the decoders, signal adaptors, and encoders comprises a respective hardware processor coupled to a memory device storing software instructions and a buffer holding intermediate data.

13 Claims, 63 Drawing Sheets

(56) References Cited

U.S. PATENT DOCUMENTS

| | | | | |
|---|---|---|---|---|
| 11,363,262 | B1 | 6/2022 | Pang et al. | |
| 11,405,661 | B2 | 8/2022 | Reitmeyer et al. | |
| 11,528,516 | B2 | 12/2022 | Park et al. | |
| 11,638,033 | B2 | 4/2023 | Braness et al. | |
| 11,716,480 | B2 | 8/2023 | Leontaris et al. | |
| 11,743,478 | B2 | 8/2023 | Rao | |
| 11,825,136 | B2 | 11/2023 | Yan | |
| 11,849,112 | B2 | 12/2023 | Naletov et al. | |
| 2020/0322659 | A1* | 10/2020 | Park | H04N 21/2405 |
| 2021/0344733 | A1* | 11/2021 | Tweedale | H04L 41/08 |
| 2024/0163464 | A1* | 5/2024 | Miller | H04N 19/40 |
| 2024/0323383 | A1* | 9/2024 | Giasson | H04N 19/40 |

* cited by examiner

Number of integrated workers:

$W_T \geq \lceil T_T / T_G \rceil$

TG: Duration of a raw GOP

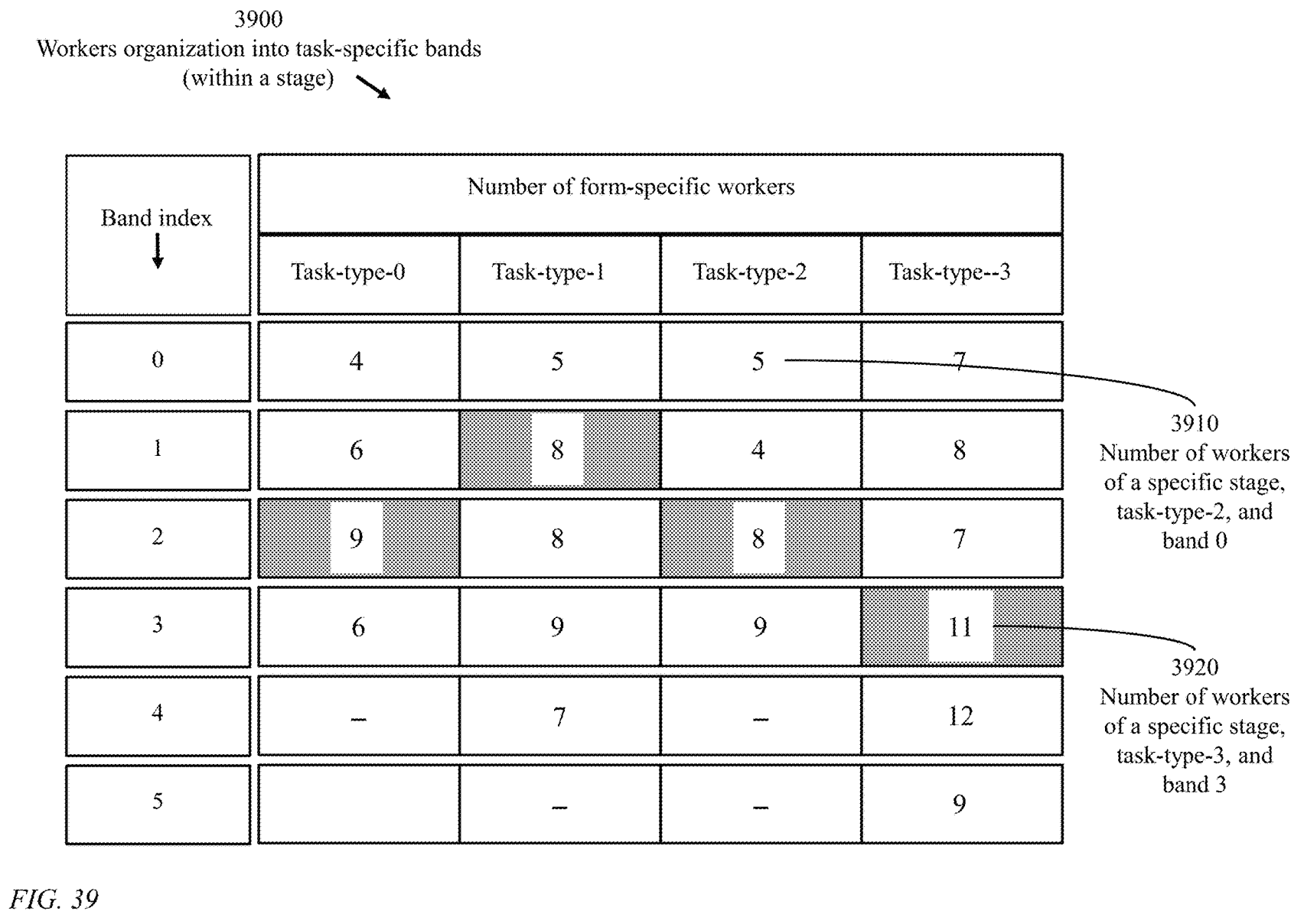

3900
Workers organization into task-specific bands (within a stage)

| Band index | Number of form-specific workers | | | |
|---|---|---|---|---|
| | Task-type-0 | Task-type-1 | Task-type-2 | Task-type--3 |
| 0 | 4 | 5 | 5 | 7 |
| 1 | 6 | 8 | 4 | 8 |
| 2 | 9 | 8 | 8 | 7 |
| 3 | 6 | 9 | 9 | 11 |
| 4 | – | 7 | – | 12 |
| 5 | | – | – | 9 |

FIG. 39

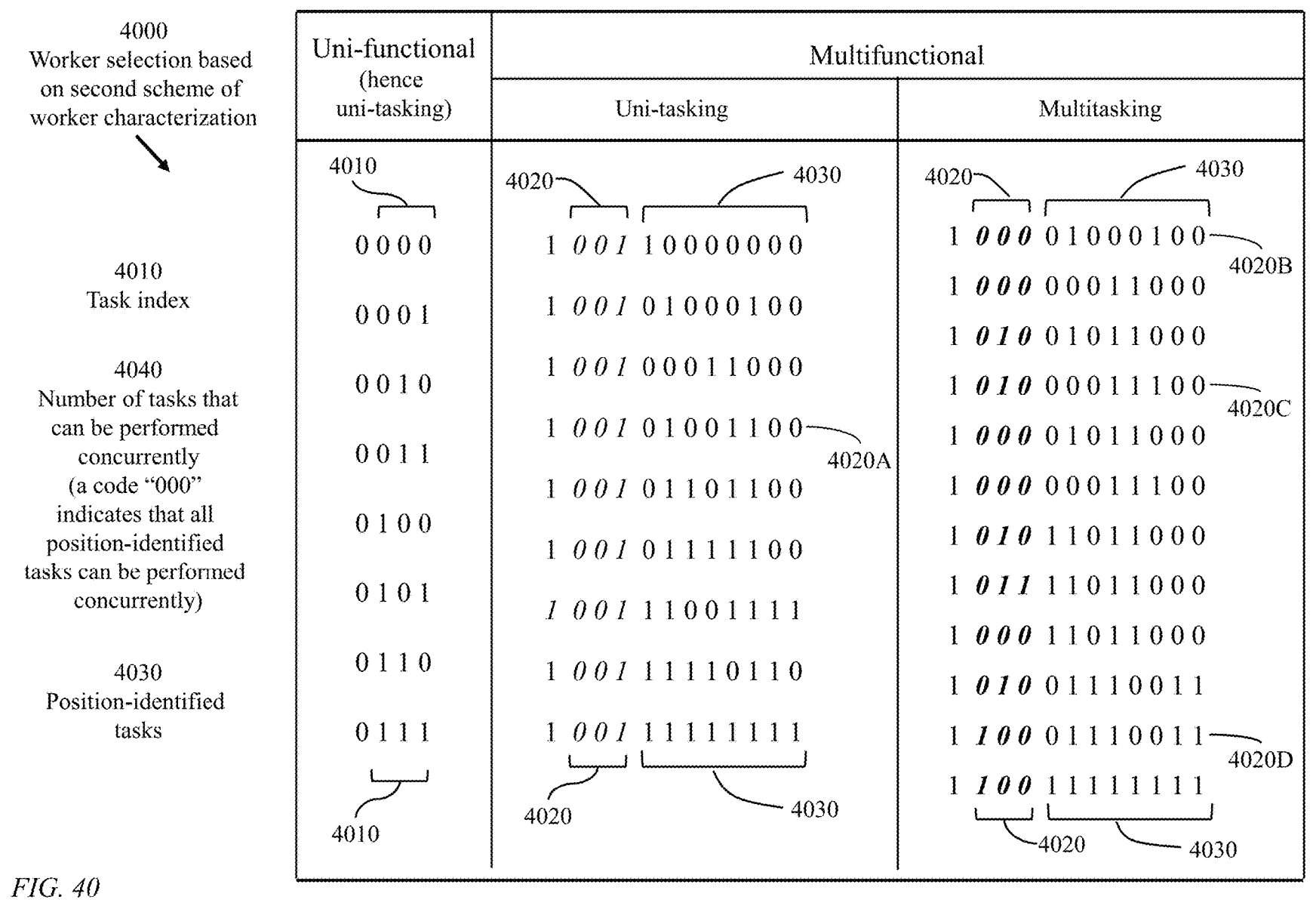

4000
Worker selection based on second scheme of worker characterization

4010
Task index

4040
Number of tasks that can be performed concurrently (a code "000" indicates that all position-identified tasks can be performed concurrently)

4030
Position-identified tasks

| Uni-functional (hence uni-tasking) | Multifunctional | |
|---|---|---|
| | Uni-tasking | Multitasking |
| 0 0 0 0 | 1 *0 0 1* 1 0 0 0 0 0 0 0 | 1 *0 0 0* 0 1 0 0 0 1 0 0 |
| 0 0 0 1 | 1 *0 0 1* 0 1 0 0 0 1 0 0 | 1 *0 0 0* 0 0 0 1 1 0 0 0 |
| 0 0 1 0 | 1 *0 0 1* 0 0 0 1 1 0 0 0 | 1 *0 1 0* 0 1 0 1 1 0 0 0 |
| 0 0 1 1 | 1 *0 0 1* 0 1 0 0 1 1 0 0 | 1 *0 1 0* 0 0 0 1 1 1 0 0 |
| 0 1 0 0 | 1 *0 0 1* 0 1 1 0 1 1 0 0 | 1 *0 0 0* 0 1 0 1 1 0 0 0 |
| 0 1 0 1 | 1 *0 0 1* 0 1 1 1 1 1 0 0 | 1 *0 0 0* 0 0 0 1 1 1 0 0 |
| 0 1 1 0 | *1 0 0 1* 1 1 0 0 1 1 1 1 | 1 *0 1 0* 1 1 0 1 1 0 0 0 |
| 0 1 1 1 | 1 *0 0 1* 1 1 1 1 0 1 1 0 | 1 *0 1 1* 1 1 0 1 1 0 0 0 |
| | 1 *0 0 1* 1 1 1 1 1 1 1 1 | 1 *0 0 0* 1 1 0 1 1 0 0 0 |
| | | 1 *0 1 0* 0 1 1 1 0 0 1 1 |
| | | 1 *1 0 0* 0 1 1 1 0 0 1 1 |
| | | 1 *1 0 0* 1 1 1 1 1 1 1 1 |

*FIG. 40*

4100
Order of selecting
available workers

| Worker type | Number of workers | Task index | Individual workers' identifiers |
|---|---|---|---|
| 00 | 2 | 0 | 0 1 |
| 01 | 2 | 1 | 2 3 |
| 02 | 0 | 2 | * |
| 03 | 4 | 3 | 4 5 6 7 |
| 04 | 3 | 0 1 | 8 9 10 |
| 05 | 0 | 0 2 | * |
| 06 | 2 | 0 3 | 11 12 |
| 07 | 2 | 1 2 | 13 14 |
| 08 | 0 | 1 3 | * |
| 09 | 5 | 2 3 | 15 16 17 18 19 |
| 10 | 0 | 0 1 2 | * |
| 11 | 8 | 0 1 3 | 20 21 22 23 24 25 26 27 |
| 12 | 5 | 0 2 3 | 28 29 30 31 32 |
| 13 | 2 | 1 2 3 | 33 34 |
| 14 | 5 | 0 1 2 3 | 35 36 37 38 39 |

4400
Sorted workers types

| | Transcoding stage | | | | | | | | |
|---|---|---|---|---|---|---|---|---|---|
| | Decoding | | | Signal processing | | | Encoding | | |
| Task → | 0 | • • • | $\mu_1-1$ | 0 | • • • | $\mu_2-1$ | 0 | • • • | $\mu_3-1$ |
| Worker type ↓ | 00 | | 03 | 00 | | 04 | 00 | | 02 |
| | 04 | | 06 | 02 | • • • | 05 | 03 | • • • | 05 |
| | 05 | | 08 | 05 | | 07 | 04 | | 07 |
| | 06 | | 09 | 08 | | | 06 | | 08 |
| | 10 | • • • | 11 | | | | 08 | | 11 |
| | 11 | | 12 | | | | 10 | | |
| | | | 13 | | | | | | |

FIG. 44

| Worker type | Number of provisioned workers | Number of available workers | Task-0 worker types | Task-1 worker types | Task-2 worker types | Task-3 worker types |
|---|---|---|---|---|---|---|
| 00 | 2 | 1 | 00 | | | |
| 01 | 2 | 0 | | 01 | | |
| 02 | * | * | | | 02 | |
| 03 | 4 | 2 | | | | 03 |
| 04 | 3 | 3 | 04 | 04 | | |
| 05 | * | * | 05 | | 05 | |
| 06 | 2 | 1 | 06 | | | 06 |
| 07 | 2 | 0 | | 07 | 07 | |
| 08 | * | * | | * | | 08 |
| 09 | 5 | 2 | | | 09 | 09 |
| 10 | * | * | 10 | 10 | 10 | |
| 11 | 8 | 2 | 11 | 11 | | 11 |
| 12 | 7 | 3 | 12 | | 12 | 12 |
| 13 | 2 | 0 | | 13 | 13 | 13 |
| 14 | 5 | 1 | 14 | 14 | 14 | 14 |

4550

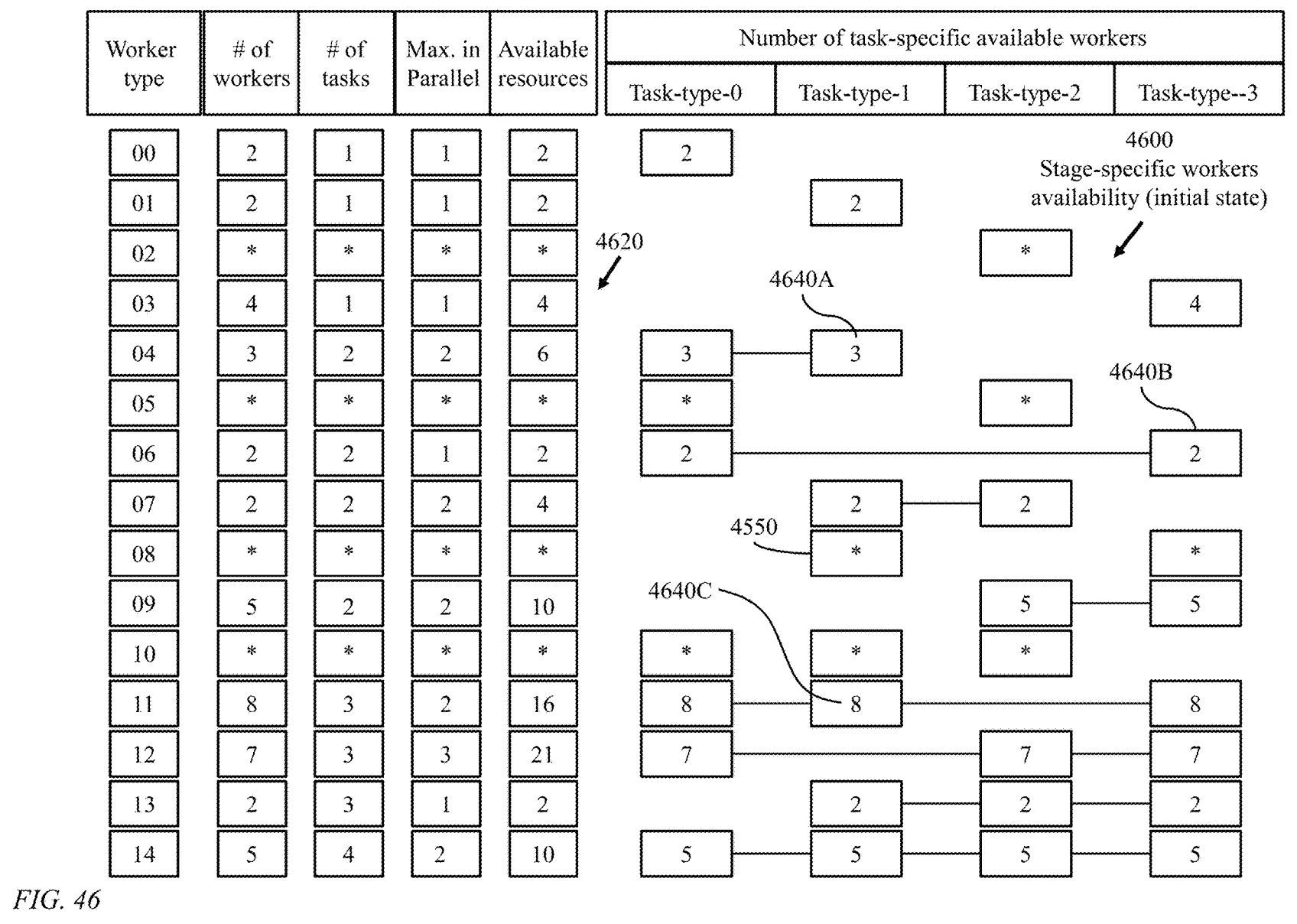

| Worker type | # of workers | # of tasks | Max. in Parallel | Available resources | Number of task-specific available workers | | | |
|---|---|---|---|---|---|---|---|---|
| | | | | | Task-type-0 | Task-type-1 | Task-type-2 | Task-type--3 |
| 00 | 2 | 1 | 1 | 2 | 2 | | | |
| 01 | 2 | 1 | 1 | 2 | | 2 | | |
| 02 | * | * | * | * | | | * | |
| 03 | 4 | 1 | 1 | 4 | | | | 4 |
| 04 | 3 | 2 | 2 | 6 | 3 | 3 | | |
| 05 | * | * | * | * | * | | * | |
| 06 | 2 | 2 | 1 | 2 | 2 | | | 2 |
| 07 | 2 | 2 | 2 | 4 | | 2 | 2 | |
| 08 | * | * | * | * | | * | | * |
| 09 | 5 | 2 | 2 | 10 | | | 5 | 5 |
| 10 | * | * | * | * | * | * | * | |
| 11 | 8 | 3 | 2 | 16 | 8 | 8 | | 8 |
| 12 | 7 | 3 | 3 | 21 | 7 | | 7 | 7 |
| 13 | 2 | 3 | 1 | 2 | | 2 | 2 | 2 |
| 14 | 5 | 4 | 2 | 10 | 5 | 5 | 5 | 5 |

FIG. 46

| Worker type | # of workers | # of tasks | Max. in Parallel | Available resources | Number of task-specific available workers | | | |
|---|---|---|---|---|---|---|---|---|
| | | | | | Task-type-0 | Task-type-1 | Task-type-2 | Task-type--3 |
| 00 | 2 | 1 | 1 | 0 | 0 | | | |
| 01 | 2 | 1 | 1 | 0 | | 0 | | |
| 02 | * | * | * | * | | | * | |
| 03 | 4 | 1 | 1 | 2 | | | | 2 |
| 04 | 3 | 2 | 2 | 3 | 1 | 2 | | |
| 05 | * | * | * | * | * | | * | |
| 06 | 2 | 2 | 1 | 0 | 1 | | | 1 |
| 07 | 2 | 2 | 2 | 1 | | 1 | 0 | |
| 08 | * | * | * | * | | * | | * |
| 09 | 5 | 2 | 2 | 3 | | | 1 | 2 |
| 10 | * | * | * | * | * | * | * | |
| 11 | 8 | 3 | 2 | 2 | 3 | 1 | | 6 |
| 12 | 7 | 3 | 3 | 3 | 0 | | 2 | 1 |
| 13 | 2 | 3 | 1 | 0 | | 1 | 2 | 1 |
| 14 | 5 | 4 | 2 | 1 | 3 | 2 | 2 | 4 |

4700
Stage-specific workers availability (in operation)

Measuring workers execution time
using training data and learning data

Stage-1 de-compression workers

Compression standard of input stream:

| Frames/sec of input stream | Number of frames per input GOP | Number of pixels per frame (raw) | Size (# of bytes) of compressed input GOP | $\tau_1$: De-compression duration |
|---|---|---|---|---|
| | | | | |
| ⋮ | ⋮ | ⋮ | ⋮ | ⋮ |
| | | | | |

*FIG. 61*

Measuring workers execution time using training data and learning data

Stage-2 Signal-transformation workers

| Frames/sec of input stream | Frames/sec of output stream | Ratio of frame rates | Requisite signal-processing tasks | $\tau_2$: Signal-transformation duration |
|---|---|---|---|---|
| | | | | |
| ⋮ | ⋮ | ⋮ | ⋮ | ⋮ |
| | | | | |

*FIG. 62*

Measuring workers execution time using training data and learning data

Stage-3 compression workers

Compression standard of output stream:

| Frames/sec of output stream | Number of frames per output GOP | Size (# of bytes) of compressed output GOP | Compression ratio | $\tau_3$: Compression duration |
|---|---|---|---|---|
| | | | | |
| ⋮ | ⋮ | ⋮ | ⋮ | ⋮ |
| | | | | |

*FIG. 63*

METHOD AND SYSTEM FOR HIGH THROUGHPUT LIVE AND OFFLINE MULTIMEDIA TRANSCODING

CROSS-REFERENCE TO RELATED APPLICATIONS

The present application claims the benefit of U.S. provisional application 63/434,448 filed Dec. 21, 2022, the entire content of which is incorporated herein by reference.

FIELD OF THE INVENTION

The invention relates to multimedia streaming. In particular, the invention is directed to realizing a large-scale transcoding station serving high-speed streams of diverse formations.

BACKGROUND

The rapid growth of transport capacity of communication networks enables provision of multimedia streaming at high flow rates. The constantly evolving techniques of video-signal encoding necessitates an intermediate transcoding layer to enable multimedia sources of different generations to stream to receivers which may not be equipped to decode streams of different resolutions and formats encoded at sources of different generations. In some applications, video signals are generated using codecs producing high-quality encoded signals but at a low compression ratio, thus necessitating a large storage capacity or a high-capacity communication path, of the order of gigabits/sec, to a recipient.

A traditional transcoding server is typically constructed to download a source multimedia file, to be stored locally, then produce a corresponding transcoded file which is also stored locally to be uploaded to a designated destination. The sizes of files thus produced may be of the order of a terabyte. Transcoding may be performed in a single server or cooperatively in multiple servers which may not be collocated.

There is a need, therefore, to explore methods and systems for expeditious and efficient transcoding of high-speed multimedia streams of diverse formations.

SUMMARY OF THE INVENTION

The objective of the present invention is to realize a heterogeneous distributed transcoding process integrating multiple transcoding functions while minimizing use of local storage and efficiently managing resources.

In accordance with an aspect, the present invention provides a transcoding station for multimedia transcoding. The transcoding station comprises a network interface, a pool of encoders, a pool of signal-adaptors, a pool of decoders, an orchestrator assembly, and a content-processing assembly.

The network interface is configured to receive, from a multimedia source, a transcoding request and a multimedia stream comprising a video stream organized into source groups-of-pictures (GOPs). The transcoding request indicates a first standard according to which the multimedia stream is formed and a second standard according to which an output decoded stream is to be formed.

The pool of decoders is configured to concurrently decode different GOPs, according to the first standard, to produce respective decoded GOPs. The pool of signal-adaptors is configured to concurrently process different decoded GOPs to produce respective adapted GOPs. The pool of encoders is configured to concurrently encode different adapted GOPs to produce respective encoded GOPs according to the second standard;

The orchestrator assembly is configured to assign each source GOP to an available decoder, each decoded GOP to an available signal adaptor, and each adapted GOP to an available encoder. The content-processing assembly is configured to provide each source GOP access to an available decoder, each decoded GOP access to an available signal adaptor, and each adapted GOP access to an available encoder. An output-collating module, coupled to the network interface, is configured to arrange successive encoded GOPs in the order of corresponding source GOPs.

Each decoder of the pool of decoders, each signal adaptor of the pool of signal adaptors, and each encoder of the pool of encoders comprises a respective hardware processor coupled to a memory device storing software instructions, and a buffer holding intermediate data.

The orchestrator assembly is further configured to determine, in response to a transcoding request, availability time based on current occupancy of the pool of decoders, the pool of signal adaptors, and the pool of encoders. The orchestrator assembly communicates the availability time to the multimedia source through the network interface.

The orchestrator assembly is further configured to track counts of source GOPs, decoded GOPs, and adapted GOPs waiting for assignment to respective decoders, signal-adaptors, and encoders, respectively. If any of the counts exceeds a respective prescribed threshold, the orchestrator assembly instructs the multimedia source, through the network interface, to pause transmission of the multimedia stream. When none of the counts exceeds a corresponding prescribed threshold while transmission of the multimedia stream is paused, the orchestrator assembly instructs the multimedia source, through the network interface, to resume transmission of the multimedia stream.

The content-processing assembly comprises a first content-access unit coupled to the network interface and the pool of decoders, a second content-access unit coupled to the pool of decoders and the pool of signal-adaptors, a third content-access unit coupled to the pool of signal-adaptors and the pool of encoders, and a fourth content-access unit, comprising a collating module, coupled to the pool of encoders and the network interface.

The orchestrator assembly comprises an orchestrator core coupled to three controllers. A first controller is coupled to the first content-access unit and the pool of decoders. A second controller is coupled to the second-content-access unit and the pool of signal adaptors. A third controller is coupled to the third content-access unit and the pool of encoders.

The network interface is further configured to affix a GOP identifier to each source GOP of the multimedia stream and communicate the source GOP identifiers and corresponding metadata to the orchestrator assembly and to the content-processing assembly.

The first controller is configured to queue an identifier of each source GOP and, upon locating an available decoder, instruct the content-processing assembly to process content of a queued source GOP. The second controller is configured to queue an identifier of each decoded GOP and, upon locating an available signal adaptor, instruct the content-processing assembly to process content of a queued decoded GOP. The third controller is configured to queue an identifier of each adapted GOP and, upon locating an available decoder, instruct the content-processing assembly to process content of a queued adapted GOP.

According to an implementation, the pool of decoders comprises a first number of clusters of respective distinct decoders. The pool of signal-adaptors comprises a second number of clusters of respective distinct signal-adaptors. The pool of encoders comprises a third number of clusters of respective distinct encoders.

Based on information within the transcoding request, an available decoder is selected from a compatible cluster of the first number of clusters, an available signal-adaptor is selected from a compatible cluster of the second number of clusters, and an available encoder is selected from a compatible cluster of the third number of clusters.

Thus, the disclosed transcoding station operates at a much higher speed in comparison with conventional transcoding servers and eliminates the need to download and locally store the multimedia file to be transcoded, the produced transcoded file, or intermediary format. Any transient media format is streamed from one stage of transcoding to another in a continuous way, reducing the amount of RAM memory used as opposed to storing complete intermediate media before passing them on to the next stage.

In accordance with another aspect, the invention provides a method of multimedia transcoding. The method comprises receiving, at a network interface, from a multimedia source, a transcoding request and a multimedia stream. A hardware orchestrator assembly and a content-processing assembly perform requisite transcoding processes of the multimedia stream.

The multimedia stream comprises a video stream organized into source groups-of-pictures (GOPs) and corresponding metadata. The transcoding request indicates a first standard according to which the multimedia stream is formed and a second standard according to which an encoded stream is to be formed.

Multiple decoding workers of the pool of decoding workers are activated concurrently to decode different source GOPs, according to the first standard, to produce respective decoded GOPs;

Multiple signal-adaptation workers, of a pool of signal-adaptation workers, are activated concurrently to process different decoded GOPs of the respective decoded GOPs to produce respective adapted GOPs.

Multiple encoding workers, of a pool of encoding workers, are activated concurrently to encode different adapted GOPs of the respective adapted GOPs to produce respective encoded GOPs according to the second standard.

The network interface affixes a GOP identifier to each source GOP of the multimedia stream; and communicates the GOP identifiers to the orchestrator assembly and to the content-processing assembly.

The method segments the pool of decoding workers into a first number of distinct clusters of decoding workers, the pool of signal-adaptation workers into a second number of distinct clusters of signal-adaptation workers; and the pool of encoding workers into a third number of distinct clusters of encoding workers. Based on information within the transcoding request, the orchestrator assembly selects the multiple decoding workers from a respective cluster of decoding workers, selects the multiple signal-adaptation workers from a respective cluster of signal-adaptation workers, and selects the multiple encoding workers from a respective cluster of encoding workers.

The orchestrator assembly continually tracks a first count of GOPs waiting for processing at the respective cluster of decoding workers, a second count of decoded GOPs waiting for processing at the respective cluster of signal-adaptation workers, and a third count of adapted GOPs waiting for processing at the cluster of encoding workers.

If any of the first count, second count, or third count exceeds a respective prescribed threshold, the orchestrator assembly instructs the multimedia source, through the network interface, to pause transmission of the multimedia stream.

If none of the first count, second count, and third count exceeds a corresponding prescribed threshold while transmission of the multimedia stream is paused, the orchestrator assembly instructs the multimedia source, through the network interface, to resume transmission of the multimedia stream.

The orchestrator assembly arranges successive encoded GOPs, of the respective encoded GOPs, according to an order of corresponding source GOPs of the multimedia stream.

In accordance with a further aspect, the invention provides a transcoding station comprising a network interface, and an orchestrator assembly coordinating activation of clusters of decoders, clusters of signal adaptors, and clusters of encoders.

The network interface is configured to receive from a multimedia source a transcoding request and a multimedia stream comprising a video stream organized into source groups-of-pictures (GOPs) and corresponding metadata.

The orchestrator assembly coupled to the network interface, a cluster of $N_1$ decoders, $N_1 \geq 1$, a cluster of $N_2$ signal adaptors, $N_2 \geq 1$, and a cluster of $N_3$ encoders, $N_3 \geq 1$.

A 1: $N_1$ selector is configured to distribute contents of successive source GOPs to orchestrator-selected decoders to produce respective decoded GOPs. An $N_1$:$N_2$ switching element is configured to distribute the respective decoded GOPs to orchestrator-selected signal adaptors to produce respective adapted GOPs. An $N_2$:$N_3$ switching element is configured to distribute the respective adapted GOPs to orchestrator-selected encoders to produce respective encoded GOPs. An $N_3$:1 selector coupled to a collating module is configured to collate the respective encoded GOPs to form a contiguous transcoded video stream.

Each decoder is compatible with a first standard, indicated in the transcoding request, according to which the multimedia stream is formed. Each encoder is configured to encode an output of any signal adaptor according to a second standard specified in the transcoding request.

The orchestrator assembly is configured to track a first count of source GOPs waiting for decoding at the cluster of $N_1$ decoders, a second count of decoded GOPs waiting for signal adaptation at the cluster of $N_2$ signal adaptors, and a third count of adapted GOPs waiting for decoding at the cluster of $N_3$ encoders.

If any of the first count, the second count, or the third count exceeds a respective prescribed threshold, the orchestrator assembly instructs the multimedia source to halt transmission of the multimedia stream. If none of the first count, the second count, and the third count exceeds the prescribed threshold while transmission of the multimedia stream is halted, the orchestrator assembly instructs the multimedia source to resume transmission of the multimedia stream.

The cluster of $N_1$ decoders is selected from a plurality of decoders based on the first standard and detailed characterization of content of the multimedia stream embedded in the metadata. The cluster of $N_2$ signal adaptors is selected from a plurality of signal adaptors based on requisite signal-adaptation processes indicated in the metadata. The cluster of $N_3$ encoders is selected from a plurality of encoders based on the second standard. Each of the $N_1$ decoders, $N_2$ signal adaptors, and $N_1$ encoders comprises a respective hardware processor coupled to a memory device storing software instructions, and a buffer holding intermediate data.

BRIEF DESCRIPTION OF THE DRAWINGS

Embodiments of the present invention will be further described with reference to the accompanying exemplary drawings, in which:

FIG. 39 illustrates application of the first scheme of FIG. 35 to a case where workers are organized into multiple task-specific worker bands, for any of the three stages, in accordance with an embodiment of the present invention;

FIG. 40 illustrates heterogenous resources of a large-scale transcoding station where workers of any stage comprise a mixture of uni-functional and multi-functional workers with the multifunctional workers comprising uni-tasking worker and multitasking workers, in accordance with an embodiment of the present invention;

FIG. 44 is a table of worker types relevant to each task of each stage, the worker types being sorted in an ascending order according to worker's versatility, in accordance with an embodiment of the present invention;

FIG. 46 illustrates a data structure for facilitating selection of workers for a mixture of workers comprising both uni-tasking workers and multitasking workers, in accordance with an embodiment of the present invention;

FIG. 47 illustrates a snapshot of availability of workers of the mixture of workers indicated in FIG. 46;

FIG. 61 illustrates tracked data relevant to stage-1;

FIG. 62 illustrates tracked data relevant to stage-2; and

FIG. 63 illustrates tracked data relevant to stage-3.

TERMINOLOGY

Figure 1:
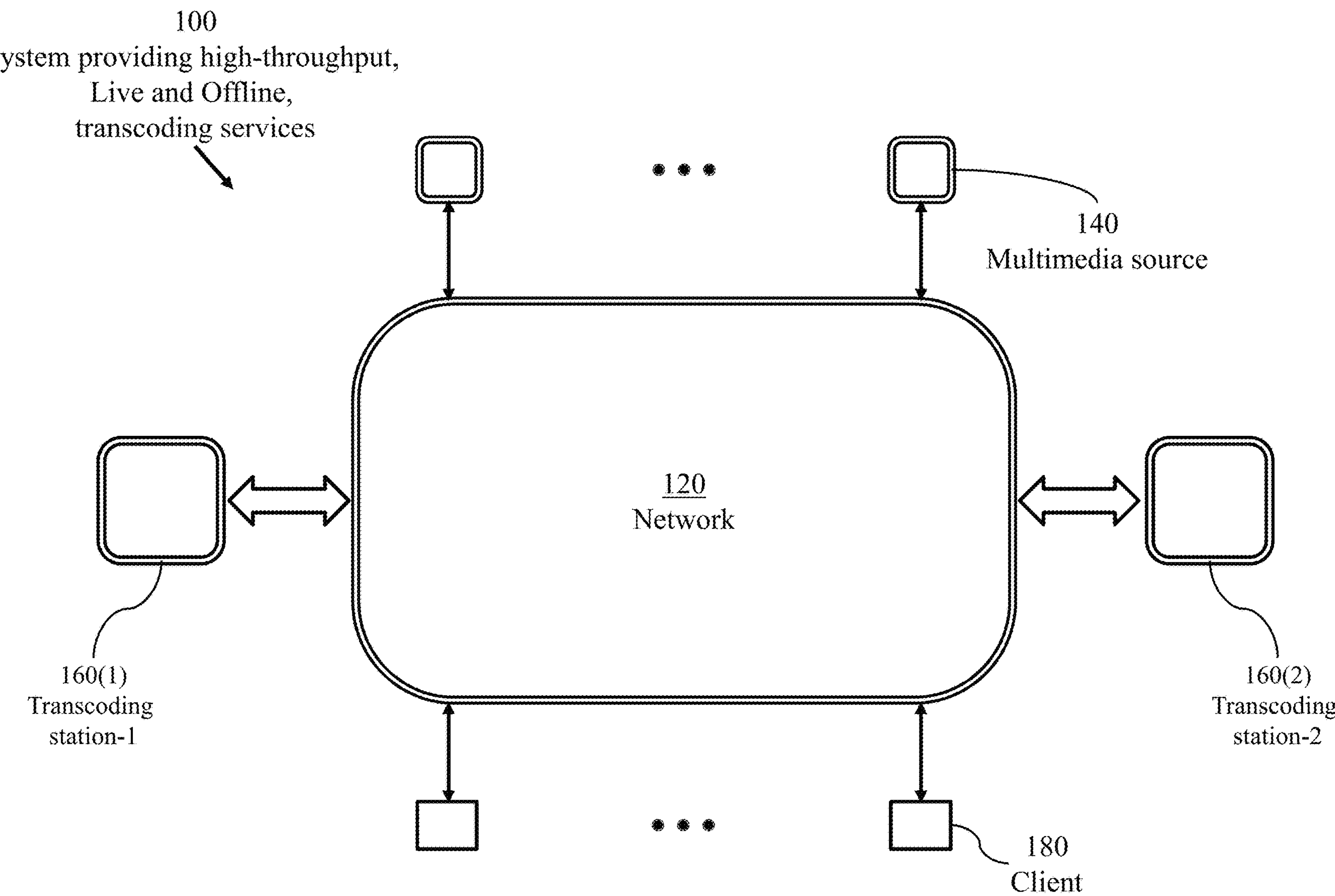
FIG. 1 illustrates a network supporting transcoding stations.

Group-of-pictures: A multimedia stream comprises a video stream which may be organized into independent groups-of-pictures (GOPs) to enable parallel processing. The GOPs generated at different multimedia sources may have arbitrary numbers of video frames.

Content data vs. control data: The streaming data comprises content data of different forms (video, audio, text, . . . ) and control data which guide the processing and routing of the content data. The content data of a multimedia constitutes the bulk of the data of the stream.

Orchestrator assembly: An orchestrator assembly comprises an orchestrator core (functioning as a master controller) and multiple stage controllers each dedicated to a respective processing stage. The orchestrator assembly guides the work-load assignment to a plurality of heterogenous workers (defined below).

Content-processing assembly: The content-processing assembly, operating under control of the orchestrator assembly, dynamically provides to each engaged worker access to respective data.

Content-access units: The content-processing assembly is structured in the form of content-access units.

Collator: A collator is an output module of the transcoding station, coupled to the network interface, which is configured to arrange successive encoded GOPs in the order of corresponding source GOPs.

Decoder: The term decoder refers to a decompression module for reconstructing raw source data from a received compressed source data.

Encoder: The term refers to a compression module for compressing a signal-processed stream adapted to be compatible with intended receivers.

VPU: A video-processing unit (VPU), also called a signal adaptor, formats a video signal to be compatible with intended receivers.

Transcoder: The term transcoder refers to a device employing at least one decoder, at least one VPU, and at least one encoder.

Worker: The term "worker" refers to a decoder, a signal adaptor, or an encoder having a respective hardware processor coupled to a memory device storing software instructions and a buffer holding transitory data.

Transcoding station: A transcoding station is a large-scale transcoder employing a plurality of heterogenous workers where workers of any processing stage comprise a mixture of uni-functional and multi-functional workers, with the multifunctional workers comprising uni-tasking worker and multitasking workers.

Worker type: The plurality of heterogenous workers is sorted according to types of tasks that a worker is configured to perform.

Versatility indicator: A versatility indicator of a worker type is a number of tasks that a worker of the worker-type is configure to perform whether one at a time or concurrently.

REFERENCE NUMERALS

100: A system providing high throughput live, or posterior, transcoding services
120: A network supporting transcoding stations
140: Multimedia sources
160: Transcoding station
180: Clients of the transcoding system
200: An overview of a structure of a transcoding station
210: Dual link connecting to network 120
220: Network interface
230: External control signals and metadata from multiple sources 140
231: External control data directed to Orchestrator 250
232: Control data directed to destinations through the network interface 220
235: Selector of external control data from a specific stream
240: External content data from the sources
241: External content data (upstream content data) directed to the pool of workers 260
242: Content data directed to destinations through the network interface 220
245: Selector of external content data from a specific stream
250: Orchestrator
260: A pool of workers of different types
270: Dual control paths between orchestrator 250 and the pool of workers 260
280: A pool of resources communicatively coupled to the pool of workers 260
300: Network-interface components
310: Source interaction module
320: Control data and metadata extraction module
330: Destination interaction module
340: Source-characterization algorithm
350: Source characteristics database
360: Content-data-extraction module
380: Transcoded GOPs rearrangement module
390: Network-interface processor (or a pool of processors)
400: Exemplary workers of the pool of workers 260 comprising integrated workers and specialized workers
410: An integrated worker whereby decoding (decompression), signal processing, and encoding (compression) are performed
420: A set of independent specialized workers
421: A specialized worker (type-1 worker) performing decoding (decompression) of a compressed multimedia signal formed according to a specific standard
422: A specialised worker (type-2 worker) performing conventional signal processes
423: A specialized worker (type-3 worker) performing multimedia encoding (compression) according to a requisite standard
500: Duration of transcoding functions: comparison of using integrated workers 410 versus using specialized workers 420
600: Concurrent transcoding of GOPs using integrated workers 410
610: A process of transcoding individual GOPs independently using multiple integrated workers 410
612: Received multimedia signals organized into independent GOPs
614: Metadata defining structure (format) of incoming GOPs
620: A process of collating transcoded GOPs in the temporal order in which corresponding incoming GOPs were received
622: Transcoded GOPS arranged in proper order
700: Concurrent transcoding of GOPs using specialized workers
712: A process of decoding (decompressing) individual compressed GOPs independently using type-1 workers
714: Conventional signal processing of decoded GOPs, received from type-1 workers, using type-2 workers
716: A process of encoding processed GOPs, received from type-2 workers, using type-3 workers
720: A process of collating transcoded GOPs, received from type-3 workers, to produce a stream of transcoded GOPs of the same sequential order of corresponding incoming GOPs
800: Processing time intervals of independently transcoded GOPs, GOP-$j^T$, j>0, for a case of GOPs of equal transcoding time intervals
810: Indices of successive raw GOPs
820: Time interval of a single transcoded GOP
900: Processing time intervals of independently transcoded GOPs, GOP-$j^T$, j>0, for a general case of GOPs of differing transcoding time intervals
920: Time interval of a single transcoded GOP
1000: Assignment of GOPs to a number of integrated workers 410 for performing concurrent transcoding processes for a case of GOPs of equal transcoding time intervals
1010-1016: Transcoding tasks assigned to integrated workers 410 of indices 0 to 6
1100: Assignment of GOPs to a number of integrated workers for performing concurrent transcoding processes for a case of live transcoding and GOPs of differing transcoding time intervals
1010-1017: Transcoding tasks assigned to integrated workers 410 of indices 0 to 7
1200: Delay of transcoded GOP stream with respect to a respective incoming GOP stream for a case of using integrated workers
1300: Delay of transcoded GOP stream with respect to a respective incoming GOP stream for a case of using specialized workers
1400: Resources of a large-scale transcoding station employing pools of workers
1410: Compressed stream from source
1420: Pool of type-1 workers (stage-1 workers) 1421
1421: A type-1 worker
1430: Reproduced source raw signal
1440: Pool of type-2 workers (stage-2 workers) 1441
1441: A type-2 worker
1450: Processed reproduced source raw signal
1460: Pool of type-3 workers (stage-3 workers) 1461

1461: A type-3 worker

1470: Compressed transcoded stream

1500: Large-scale transcoding station employing pools of workers where at least one pool comprises clusters of workers of distinct characteristics

1560: Cluster of workers; 1560(*j*), 0≤j<($\mu_1$−1), of stage-1

1570: Cluster of workers; 1570(*j*), 0≤j<($\mu_2$−1), of stage-2

1580: Cluster of workers; 1580(*j*), 0≤j<($\mu_3$−1), of stage-3

1600: Schematic of a large-scale transcoding station indicating heterogenous workers of stage-1

1610: Module for acquisition of a multimedia stream from a source 140 under control of an orchestrator 1620

1620: An orchestrator controlling operations of the transcoding station

1630: Module for communicating transcoded multimedia stream to a client under control of orchestrator 1620

1640: Equipment for stage-1 (decoding stage) of the transcoding station

1642: A module for directing individual GOPs to appropriate decoders

1643: 1:$N_1$ selector, $N_1$>1

1644: A worker (decoder) of a specific type

1700: Schematic of the large-scale transcoding station indicating heterogenous workers of stage-2

1752: A module for directing individual GOPs to appropriate video-processing units (VPUs)

1753: 1: $N_2$ selector, $N_2$>1

1754: A worker (VPU) of a specific type

1800: Schematic of the large-scale transcoding station indicating heterogenous workers of stage-3

1862: A module for directing individual GOPs to appropriate encoders

1863: 1: $N_3$ selector, $N_3$>1

1864: A worker (encoder) of a specific type

1900: Forms of signals formed at a source directed to a transcoding station

1910: A video stream arranged in groups of pictures (GOPs), also referenced as a group of frames

1920: Compressed video stream of variable flow rate but equal compressed GOP durations

1930: Compressed video stream of fixed flow rate, hence variable compressed GOP durations

2000: Allocation of successive GOPs of video-signal 1910 to workers of the three stages

2010: GOPs received during successive equal intervals

2020: Indices of GOPs 2010

2030: Duration of processing of a GOP 2010 within a first stage

2035: Delayed processing

2040: Duration of processing of a GOP within the second stage

2050: Duration of processing of a GOP within the third stage

2100: Allocation of successive GOPs of video-signal 1920 to workers of the three stages

2110: GOPs received during successive variable intervals

2120: Indices of GOPs 2110

2130: Duration of processing of a GOP 2110 within a first stage

2135: Delayed processing

2140: Duration of processing of a GOP within the second stage

2150: Duration of processing of a GOP within the third stage

2200: Effect of varying durations of GOP processing on sequential order of processed GOPs

2210: Instants of receiving GOPs

2220: Indices of received GOPs

2230: Sequential order of output GOPs of stage-1

2240: Sequential order of output GOPs of stage-2

2250: Sequential order of output GOPs of stage-3

2260: Process of rearranging the encoded GOPs of stage-3 according to corresponding temporal order at source

2300: A transcoding station handing GOPs of a multimedia stream

2310: Dual link connecting the transcoding station to network 120

2320: Network interface of the transcoding station

2330: External two-way control data between the orchestrator and source equipment exchanged through network interface 2320

2340: Upstream content data received from a source through the network interface 2320

2342: Downstream data transmitted to a client (destination) through the network interface 2320

2350: Orchestrator assembly comprising an orchestrator core and three stage controllers (detailed in FIG. 24)

2360: Internal control data exchanged between workers and the orchestrator assembly 2350

2370: Content processing and transfer assembly (detailed in FIG. 26 and FIG. 27)

2400: Architecture of an orchestrator assembly where an orchestrator core communicates with workers of each stage through a respective stage controller

2410: Transmission medium from a source (part of dual link 2310)

2420: Transmission medium to a sink (part of dual link 2310)

2450: Orchestrator core

2451: Stage-1 controller

2452: Stage-2 controller

2453: Stage-3 controller

2500: A stage controller

2510: An interface with a pool of workers of a respective stage

2520: Buffer holding identifiers of GOPs received from a previous stage

2530: Buffer storing indices of available (free) workers

2540: Stage-orchestrator interface

2542: Dual channel carrying control data from orchestrator

2543: Metadata of a new GOP

2544: Identifier of a processed GOP

2560: Processor (or an assembly of processors)

2570: Stage scheduler (a software module)

2600: Content-data flow within the transcoding station

2610: Stage-1 content-transfer unit

2620: Stage-2 content-transfer unit

2630: Stage-3 content-transfer unit

2631: Type-1 worker (stage-1 worker)

2632: Type-2 worker (stage-2 worker)

2633: Type-3 worker (stage-3 worker)

2700: Overview of the transcoding station indicating connection of the orchestrator assembly to the content-processing assembly

2710: Content-access unit between the network interface and the pool of stage-1 workers

2720: Content-access unit between the pool of stage-1 workers and the pool of stage-2 workers

2730: Content-access unit between the pool of stage-2 workers and the pool of stage-3 workers

2740: Content-access unit between the pool of stage-3 workers and the network interface

2750: Content-handling mechanism (an implementation of content processing and transfer assembly 2370)

2780: Compressed transcoded stream directed to at least one client 180 through the network interface 2320

2790: Dual channel connecting the orchestrator core to content-access unit 2740

2800: A mechanism for content transfer through the transcoding station

2821: Channels connecting output port of switch-1, implemented as a 1:n selector (with n=6) to individual stage-1 workers (decoders)

2822: Channels from individual stage-1 workers to input ports of switch-2

2823: Channels from output ports of switch-2 to stage-2 workers (video-processing units, VPUs)

2824: Channels from stage-2 workers to input ports of switch-3

2825: Channels from output ports of switch-3 to stage-3 workers (encoders)

2826: Channels from stage-3 workers to input ports of switch-4 (implemented as an m:1 selector, m=7)

2840: 7:1 selector

2870: Collator of decoded GOPs

2900: A first example of a switching component of the mechanism for content access

2910: n:1 Selector (n=6)

2920: A single channel from n:1 selector 2910 to 1:y selector 2930, y>1

2930: 1:y selector (y=4)

3000: A second example of a switching component of the mechanism for content access

3010: 12:1 Selector

3011: 12:1 Selector

3020: A single channel from selector 3010 to selector 3030

3021: A single channel from selector 3010 to selector 3031

3030: 1:4 selector

3031: 1:4 selector

3040: A pool of twelve workers 3041

3041: A single worker of pool 3040

3042: A single worker of pool 3040

3060: A pool of seven workers

3061: A single worker of pool 3060

3062: A single worker of pool 3060

3100: Processes performed at network interface 2320 comprising processes 3110 to 3170

3200: Processes performed at the orchestrator assembly 2350 comprising processes 3210 to 3260

3300: Further processes performed at the orchestrator assembly 2350 comprising processes 3310 to 3340

3400: Processes performed at a stage controller, according to a first scheme of stage-specific worker allocation, comprising processes 3410 to 3490

3500: Processes performed at a stage scheduler 2570 comprising processes 3510 to 3590

3600: An example of worker selection implemented according to the first scheme of stage-specific worker allocation

3610: Initial state of a circular buffer holding workers' identifiers

3612: Worker identifier

3614: Index of the circular buffer

3620: An intermediate state of the circular buffer

3622: Identifier of an available worker

3630: Another intermediate state of the circular buffer

3632: Identifier of an available worker

3700: Steps of worker selection

2800: Continued steps of worker selection

3900: Workers organization into multiple task-specific worker bands

3910: Number of workers of a specific stage, a specific task-type, and a specific form; a first example

3920: Number of workers of a specific stage, a specific task-type, and a specific form; a second example

4000: Second scheme of worker characterization

4010: Task index

4020: Maximum number of concurrent tasks

4030: Position-identified tasks

4100: Order of selection of available workers

4110: Uni-functional workers

4120: Multifunctional uni-tasking workers

4130: Multifunctional multitasking workers

4200: Mixture of uni-functional and multifunctional workers first example

4210: Worker type

4220: Number of workers

4230: Task indices

4240: Individual worker identifiers

4300: Mixture of uni-functional and multifunctional workers second example

4400: Sorted worker types

4500: A data structure for facilitating worker selection in a transcoding station employing a mixture of uni-functional and multifunctional uni-tasking workers

4550: The symbol "*" indicates a worker type that has not yet been provisioned

4600: A data structure for facilitating worker selection in a transcoding station employing a mixture of uni-functional and multifunctional workers of both uni-taking and multitasking capabilities (data under the fields of "available resources" and "number of task-specific available workers" correspond to an initial state)

4640: Number of available workers of a specific worker type configured to perform a specific task—for example, 4640A indicates a number of available workers of work-type 4 configured to perform task 1, 4640B indicates a number of available workers of work-type 6 configured to perform task 3, and 4640C indicates a number of available workers of work-type 11 configured to perform task 1

4700: Exemplary entries of data structure 4600 in operation

4800: Processes of worker selection of heterogenous sources comprising processes 4810 to 4880

4900: Examples of uni-functional and multi-functional worker types

5000: Examples of worker selection from a respective worker group of a same worker type (work type 14) for a case of 5 workers each configured to perform any of 14 tasks (versatility=14) but with a multi-tasking limit of 2 (at most two concurrent tasks per worker)

5010: A first scenario of a fully occupied work group of worker-type 14

5020: A second scenario of a fully occupied work group of worker-type 14

5030: A third scenario of a fully occupied work group of worker-type 14

5040: A fourth scenario of a fully occupied work group of worker-type 14

5100: A procedure of constructing a data structure for facilitating allocation of workers comprising processes 5110 to 5170

5200: A procedure, comprising processes 5210 to 5290, for allocating tasks to workers for a case of a transcoding station employing a mixture of uni-functional and multifunctional workers where all workers are uni-tasking workers

5300: A procedure, comprising processes 5230 to 5390, for allocating tasks to workers for a case of a transcoding station employing a mixture of uni-functional and multifunctional workers with workers of both uni-tasking and multicasting capabilities

5400: A transcoding station configured to concurrently transcode multiple streams using a shared orchestrator core

5420: Multiple dual links connecting the network interface to a network

5421: Overall control data from all connecting sources

5422: Overall content data from all connecting sources and content data to destination sinks

5430: An orchestrator assembly with a single orchestrator core configured to handle multiple streams

5440: Dual control paths between orchestrator assembly 5430 and workers of the three stages

5460: Overall stage-1 workers handling all streams

5470: Overall stage-2 workers handling all streams

6480: Overall stage-2 workers handling all streams

5500: A transcoding station configured to concurrently transcode multiple streams using multiple orchestrator assemblies

5530: A single orchestrator assembly

5540: A set of orchestrator assemblies 5530

5550: Dual control paths between the set of orchestrator assemblies and workers

5600: A set of K orchestrator assemblies 5530, K>1, with orchestrator assembly 5530(*j*), 1≤j≤K, comprising a respective orchestrator core 2450(*j*), a stage-1 controller 5651(*j*), a stage-2 controller 5652(*j*), and a stage-3 controller 5653(*j*)

5610: Dual channels carrying multimedia streams from respective sources and to respective sinks

5650: An orchestrator assembly for a specific multimedia stream

5651: Stage-1 controller of a respective orchestrator assembly

5652: Stage-2 controller of a respective orchestrator assembly

5653: Stage-3 controller of a respective orchestrator assembly

5700: Multiple-stream resource sharing

5760: Shared stage-1 workers including floating workers to be adaptively allocated to any stream as the need arises

5770: Shared stage-2 workers including floating workers

5780: Shared stage-3 workers including floating workers

5800: Alternative worker-allocation policies

5810: First worker-allocation policy based on segmentation of workers into stream-specific groups with an additional group of floating workers

5811: Group of workers reserved for a first stream

5812: Group of workers reserved for a second stream

5813: Group of workers reserved for a third stream

5814: Group of workers designated as floating workers

5820: Second worker-allocation policy based on designating each worker as a floating worker

5840: Workers adaptively allocated to streams

5850: Individual workers

5860: A pool of workers of a specific worker type allocated to handle GOPs of different streams

5900: Overview of a large-scale transcoding station concurrently receiving multiple incoming multimedia streams and producing multiple transcoded streams per incoming stream according to different standards

5920: Large-scale network interface

6000: Procedure for measuring tasks' execution durations using training data and operational data comprising processes 6010 to 6040

6100: Stage-1 measurements corresponding to specific stage-1 metadata

6200: Stage-2 measurements corresponding to specific stage-2 metadata

6300: Stage-3 measurements corresponding to specific stage-3 metadata

Notation

GOP-$k^T$: A transcoded GOP of index k, k>0

$T_G$: Duration of a raw GOP as produced at source $T_T$: Duration of a transcoding process using an integrated worker 410

$T_{S1}$: Duration of performing a stage-1 function using a type-1 worker 421

$T_{S2}$: Duration of performing a stage-2 task using a type-2 worker 422

$T_{s3}$: Duration of performing a type-3 task using a type-3 worker 423

$T_T^+$: A representative value of $T_T$ based on statistical distribution of per GOP transcoding-process duration.

$T_{sj}^+$: j=1, 2, or 3, a representative value of $T_{Sj}$, determined from learned statistical distribution of per GOP specialized-processes duration.

$W_T$: Total number of integrated workers $W_{S1}$: Number of type-1 workers $W_{S2}$: Number of type-2 workers $W_{S3}$: Number of type-3 workers

DETAILED DESCRIPTION

FIG. 1 illustrates a system 100 providing transcoding services comprising a network 120 supporting multimedia sources 140, multiple transcoding stations 160, two of which are illustrated, and clients 180 of the transcoding system.

Prior-Art Transcoding

A conventional transcoding server is configured to perform processes of:

(1) acquiring baseband signals from modulated carriers received from multimedia sources;

(2) detecting a transcoding request from a received signal;

(3) extracting a stream of compressed group-of-pictures (GOPs) from an acquired baseband signal;

(4) transcoding the stream of compressed GOPs to produce a stream of compressed transcoded GOPs; and (5) modulating a carrier signal with the output stream of compressed transcoded GOPs for transmission to at least one destination.

Generally, transcoding is performed in basic processing stages categorized as a decoding (decompression) stage, a signal-processing stage, and an encoding (compressing) stage, hereinafter referenced as the first stage, the second stage, and the third stage (stage-1, stage-2, stage-3), respectively. A compressed input stream of a specific raw multimedia stream is received from a multimedia source and supplied to a decoding stage which produces a decompressed stream approximately reproducing the specific raw multimedia stream. The decompressed stream is supplied to a signal-processing stage which performs conventional processes such as filtering and de-warping based on metadata embedded within the received transcoding request. The signal-processing stage produces a processed stream which is adapted to characteristics of a target client. The encoding stage compresses the processed stream to produce a compressed output stream according to a compression standard compatible with capabilities of the target client.

Figure 2:
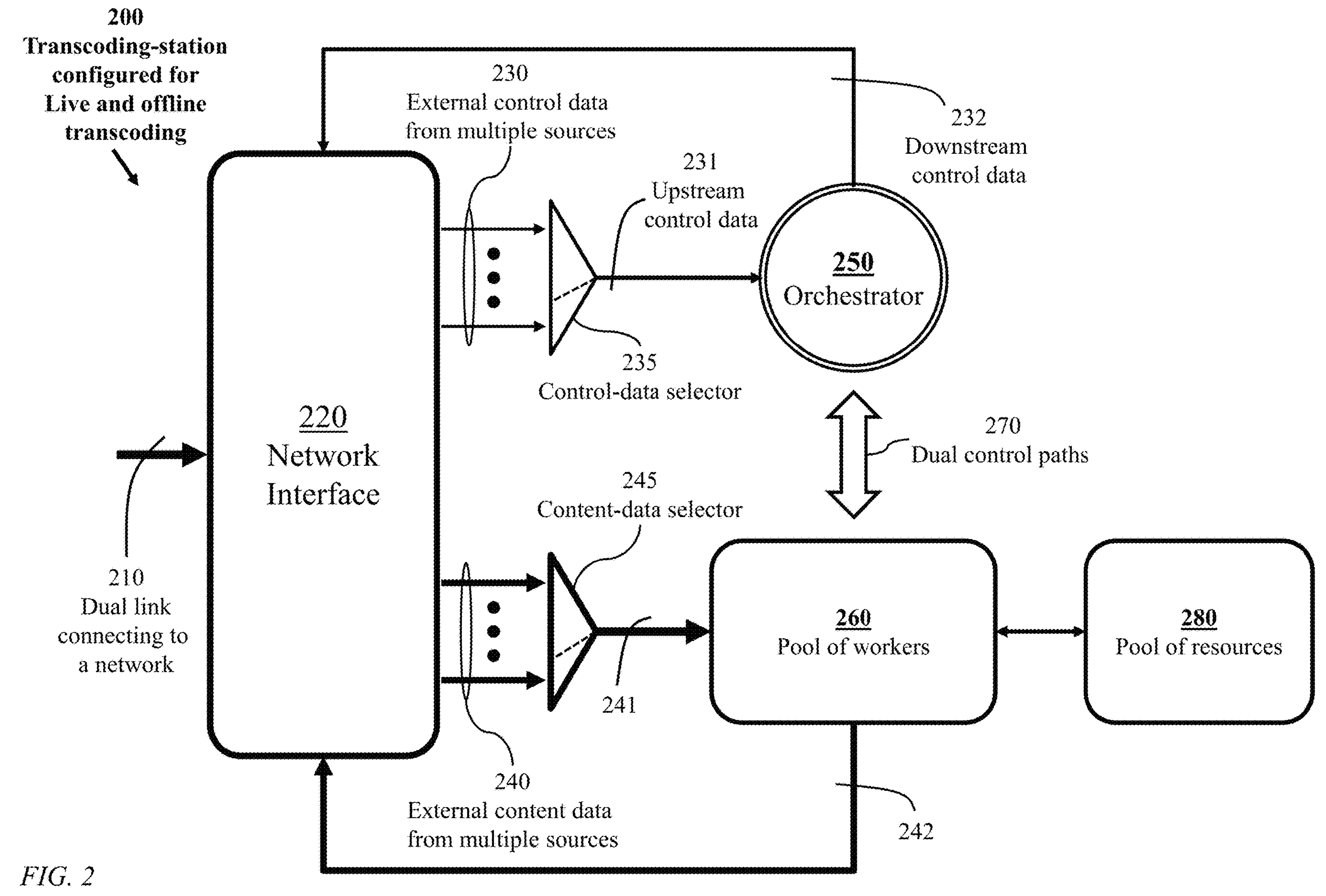
FIG. 2 is an overview of a structure of a transcoding station configured for both live multimedia transcoding and multimedia-file transcoding, in accordance with an embodiment of the present invention.

FIG. 2 is an overview 200 of a structure of a transcoding station 160. A network interface 220 (detailed in FIG. 3) connects to network 120 through a dual link 210 for receiving transcoding requests from the plurality of multimedia sources 140 and signal streams to be transcoded then communicating transcoded streams to respective destinations through the network 120. The network interface 220 is configurated to separate control data (including metadata) 230 and content data 240 from each stream received from a multimedia source 140. The network interface directs the control data 230 to an orchestrator 250, through stream-specific control-data selector 235, and the content data 240 to a pool 260 of shared workers of different types through high-capacity stream-specific content selector 245. The orchestrator 250 receives stream-specific upstream control data 231 and transmits stream-specific downstream control data 232 to respective destinations through the network interface. The pool 260 of workers receives stream-specific upstream content data 241 and transmits stream-specific downstream content data 242 to respective destinations through the network interface 220.

The orchestrator communicates with the pool 260 of workers through dual control paths 270. A pool 280 of resources is communicatively coupled to the pool of workers 260. A worker may be coupled to respective dedicated resources or rely on a pool of shared resources.

To enable concurrent transcoding at the transcoding stations 160, the multimedia sources 140 generally format video-signal components of multimedia signals into groups of pictures (GOPs). A GOP comprises a number $\gamma$ of video frames, $\gamma>1$ ($\gamma=50$, for examples) which may be source dependent and may even differ for GOPs of a same stream. At a frame rate of f frames per second, the duration of a GOP before compression at source is $\tau=(\gamma/f)$, and the GOP generation rate, denoted $\lambda$, is $\lambda=(f/\gamma)$.

Figure 3:
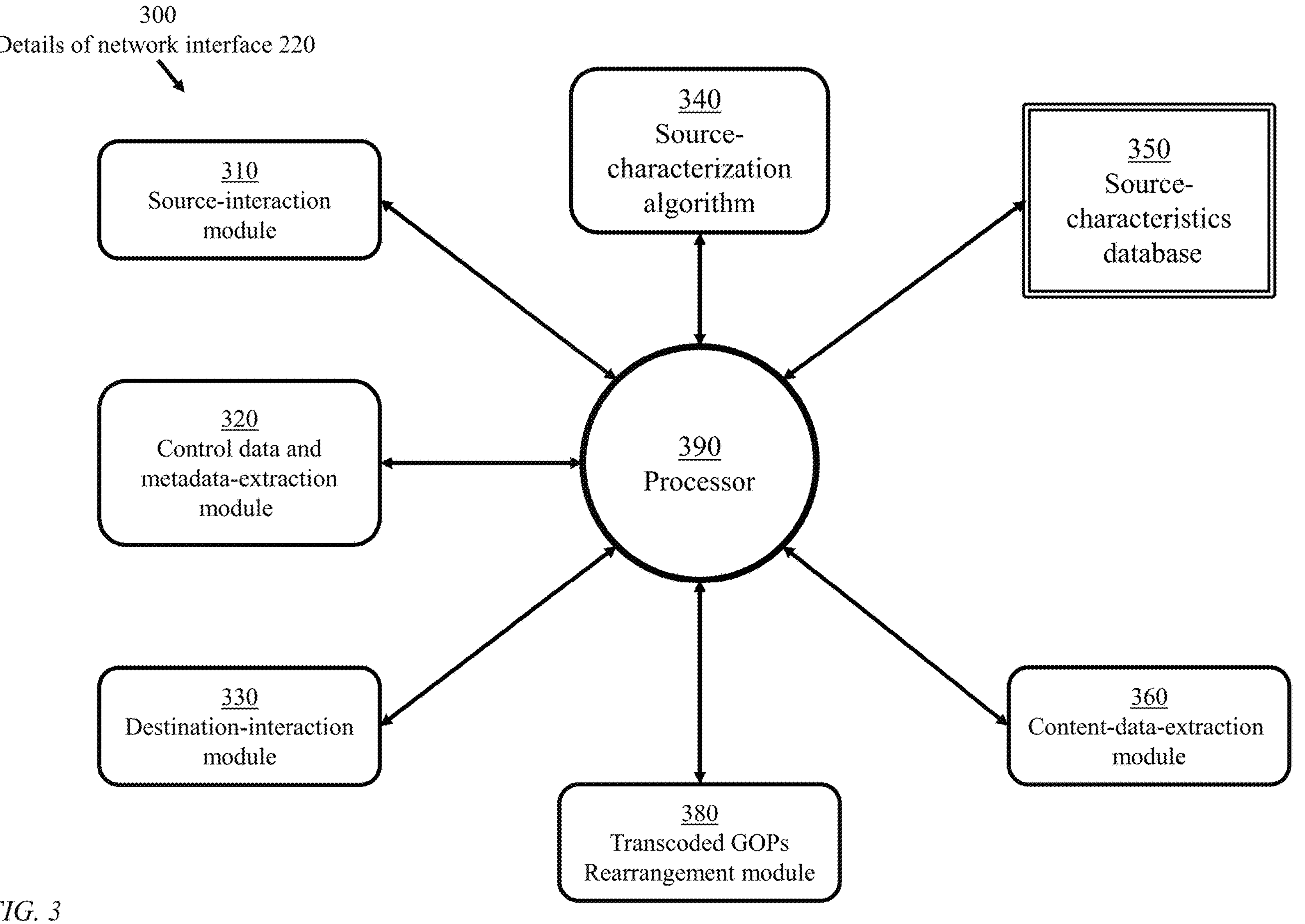
FIG. 3 illustrates details of a network interface, in accordance with an embodiment of the present invention.

FIG. 3 illustrates components 300 of a network interface 220. A source interaction module 310 receives transcoding requests from different multimedia sources 140, communicates respective admission, or otherwise, to respective sources, and receives content data and corresponding control data and metadata from admitted sources. A Metadata extraction module 320 separates metadata and corresponding control data for a received stream to be directed to orchestrator 250 (FIG. 2). A destination interaction module 330 communicates notifications and respective transcoded content to all destinations of each transcoded stream. A source-characterization algorithm 340 determines characteristics of each engaged multimedia source 140, with the help of a source-characteristics database 350. A content-data-extraction module 360 separates content (the payload, the data to be transcoded) of each stream to be directed to the pool 260 of workers (FIG. 2). A module 380 for rearranging transcoded GOPs collates GOPs according to streams and orders transcoded GOPs of each stream to correspond to the temporal order of corresponding incoming GOPs. A network-interface processor (or a pool of processors) 390 executes software instructions of modules 310, 320, 330, 340, 360, and 380.

As described above, a transcoding process is implemented in three stages. In a first stage, a received GOP is decompressed. In a second stage, conventional signal processing may be performed to condition the individual frames of the decompressed GOP according to respective metadata. In a third stage, the processed GOPs are encoded according to a standard specified in the respective meta data.

Figure 4:
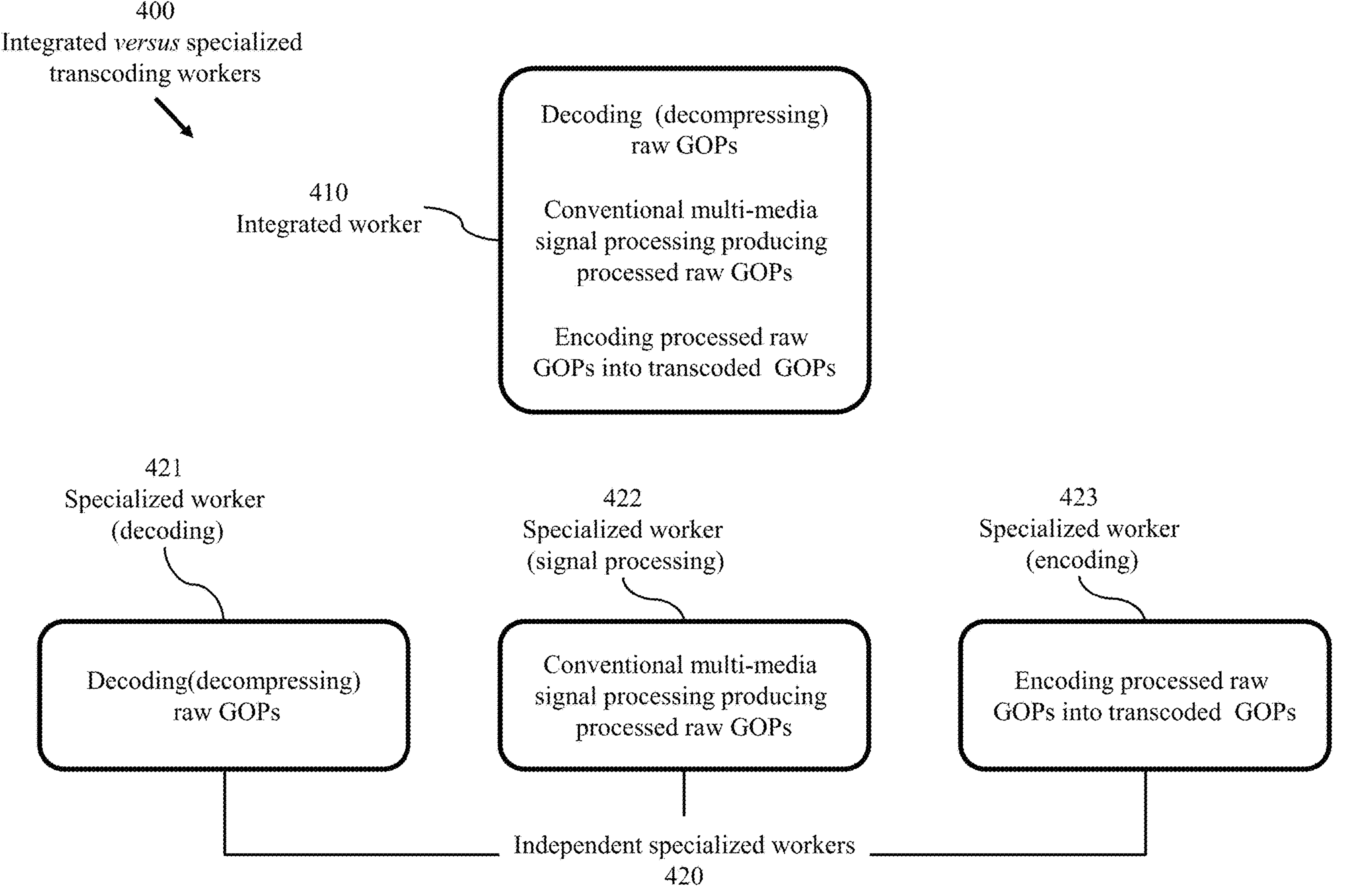
FIG. 4 illustrates functions of an integrated worker and functions of a set of specialized workers for use in an embodiment of the present invention.

FIG. 4 provides a clarification 400 of using integrated workers versus using specialized workers. The pool of workers 260 may comprise integrated workers 410 and/or sets 420 of specialized workers. An integrated worker 410 sequentially performs processes of decompression, signal processing, and encoding of the aforementioned three stages. A set 420 of specialized workers comprises:

- a specialized worker 421 performing decompression of a compressed multimedia signal of a specified standard (referenced as a type-1 worker or a stage-1 worker)
- a specialised worker 422 performing conventional signal processes (referenced as a type-2 worker or a stage-2 worker); and
- a specialized worker 423 performing multimedia encoding, including compression, according to a requisite standard (referenced as a type-3 worker or a stage-3 worker).

Live Multimedia Transcoding Versus Multimedia-File Transcoding

Structuring a multimedia stream into independent GOPs enables concurrent transcoding of multiple GOPs. Concurrent transcoding may be performed using a group of integrated workers 410 or groups of specialized workers comprising a first group of type-1 workers 421, a second group of type-2 workers 422, and a third group of type-33 workers 423.

For a task of transcoding a recorded multimedia session, where encoded data of an entire multimedia session is stored in an accessible memory device, the number of workers of any type may vary from one (hence processing one GOP at a time) to an arbitrary number. The period of time taken to complete transcoding an entire stored multimedia session decreases as the number of workers increases. Using integrated workers, the number of workers which may be employed concurrently varies from one to a total number of GOPs of an entire session. Using specialized workers, the number of workers of the most processing-intensive type may vary from one to the total number of GOPs of the session. Thus, the provisioning of workers is based on a trade off between overall transcoding time and cost.

Figure 5:
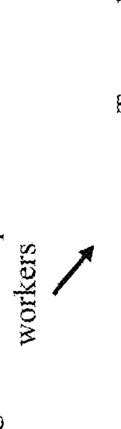
FIG. 5 illustrates duration of completion of a GOP transcoding using either integrated workers 410 or sets 420 of specialized workers 420 and indicates requisite number of workers for live multimedia transcoding.
Figure 5:
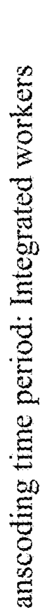
Figure 5:
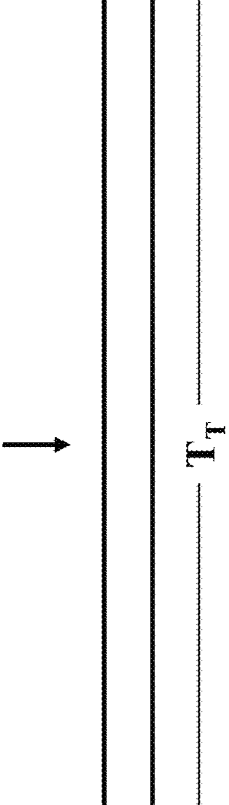
Figure 5:
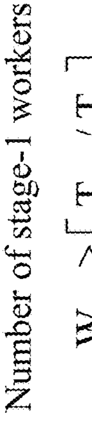
Figure 5:
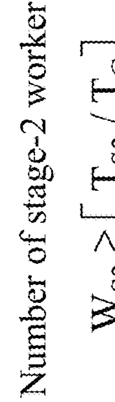
Figure 5:
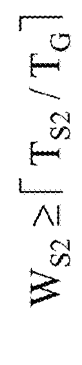
Figure 5:
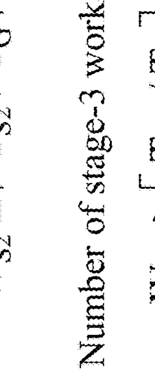
Figure 5:
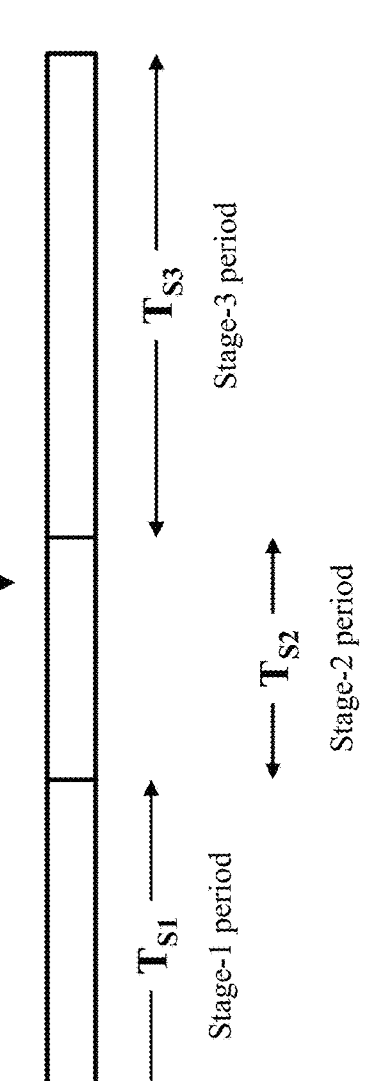

For a task of live transcoding of a multimedia stream, the number of workers of any type exceeds one and is determined according known task-execution durations as illustrated in FIG. 5. For example, if an appropriate number of integrated workers 410 is determined to have a lower bound of 20 and an upper bound of 24, then live transcoding cannot be realized with less than 20 integrated workers and employing more than 24 integrated workers cannot expedite the overall transcoding task since an idle worker cannot process a forthcoming GOP.

FIG. 5 provides a comparison 500 of durations of transcoding functions using integrated workers 410 versus using sets 420 of specialized workers 421, 422, and 423. The duration of a raw GOP (as produced at source) is denoted $T_G$. The duration of a transcoding process using an integrated worker is denoted $T_T$. The duration $T_G$ may vary from one GOP to another, even under the same frame rate, if the number of frames per GOP varies within a same stream. The duration $T_T$ may differ from one GOP to another, even with a constant number of frames per GOP, depending on the contents of the GOPs.

For a simplified case where both $T_G$ and $T_T$ are invariant for successive GOPs, the number of integrated workers 410, denoted $W_T$, needed to eliminate the need to store received GOPs within a transcoding station 200 is determined as $W_T \geq \lceil T_T/T_G \rceil$. With a duration $T_T$ varying for successive GOPs, the requisite number of integrated workers would be: $W_T \geq \lceil T_T^+/T_G \rceil$, where $T_T^+$ is determined from learned statistical distribution of per GOP transcoding-process duration.

For the simplified case where both $T_G$ and $T_T$ are invariant for successive GOPs, the number of specialized workers needed to eliminate the need to store received GOPs within the transcoding station 200 is determined as follows:

the number of type-1 workers, denoted $W_{S1}$, is determined as $W_{S1} \geq \lceil T_{S1}/T_G \rceil$;

the number of type-2 workers, denoted $W_{S2}$, is determined as $W_{S2} \geq \lceil T_{S2}/T_G \rceil$; and the number of type-3 workers, denoted $W_{S3}$, is determined as $W_{S3} \geq \lceil T_{S3}/T_G \rceil$, where $T_{Sj}$ denotes the duration of processes performed in stage-j, j=1, 2, or 3.

With a duration $T_{Sj}$, j=1, 2, or 3, varying for successive GOPs, the requisite number of specialized workers would be $W_{Sj} \geq \lceil T_{Sj}^+/T_G \rceil$, where $T_{Sj}^+$ is determined from learned statistical distribution of per GOP specialized-processes duration.

Figure 6:
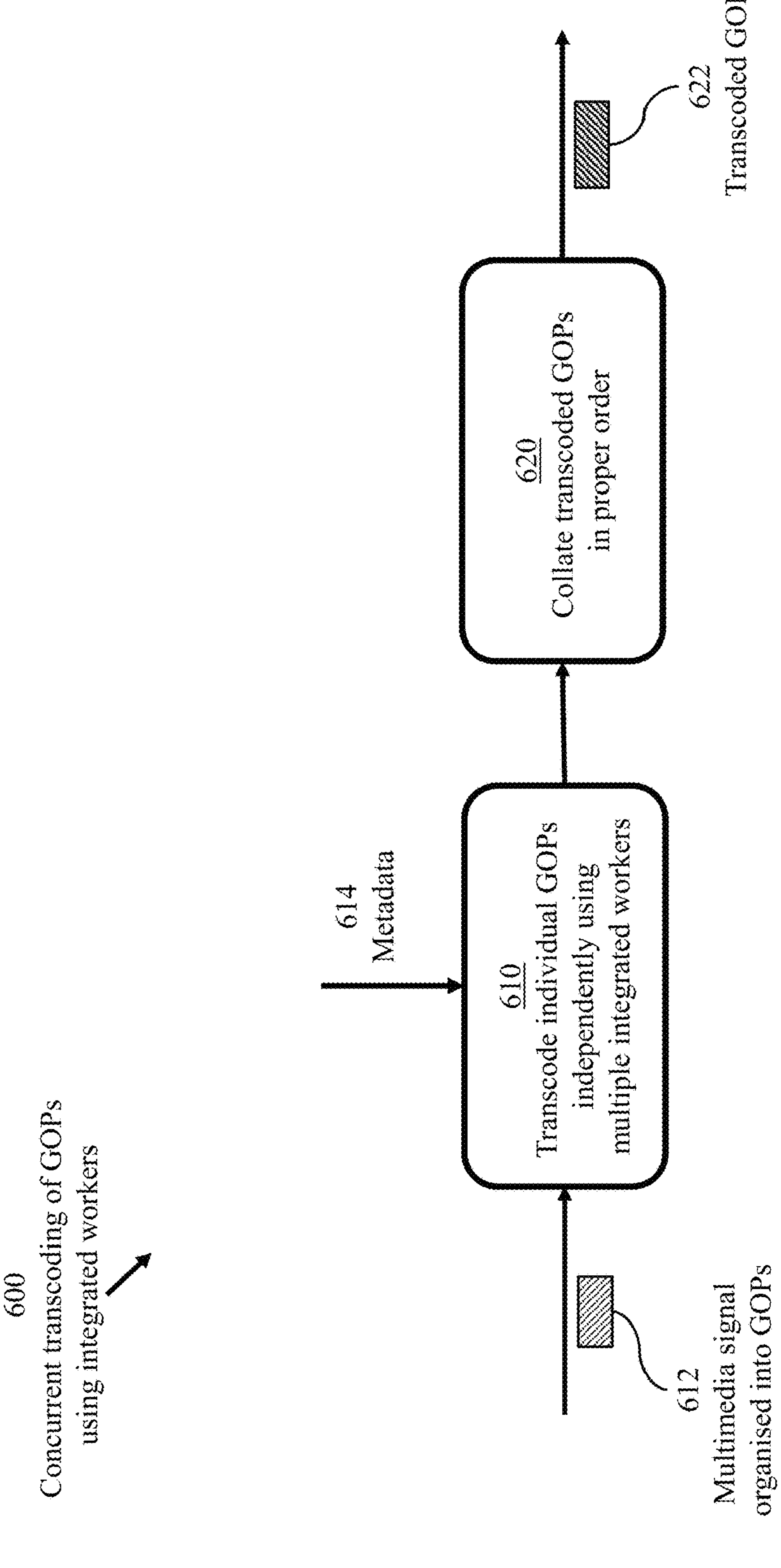
FIG. 6 is an overview of concurrent processing using integrated workers, in accordance with an embodiment of the present invention.

FIG. 6 is an overview 600 of concurrent transcoding using integrated workers 410. Process 610 transcodes received multimedia signals 612 organized into independent GOPs which are encoded (compressed) at source according to a first standard to be transcoded according to a second standard. The received GOPs are transcoded independently, according to metadata 614 defining structure of incoming GOPs, using a number $W_T$ of integrated workers 410. Metadata 614 may identify the second standard according to which the transcoded output is to be formed. Process 620 collates the transcoded GOPs, in the temporal order in which corresponding incoming GOPs were received, to produce a sequence of transcoded GOPS 622 arranged in proper order.

Figure 7:
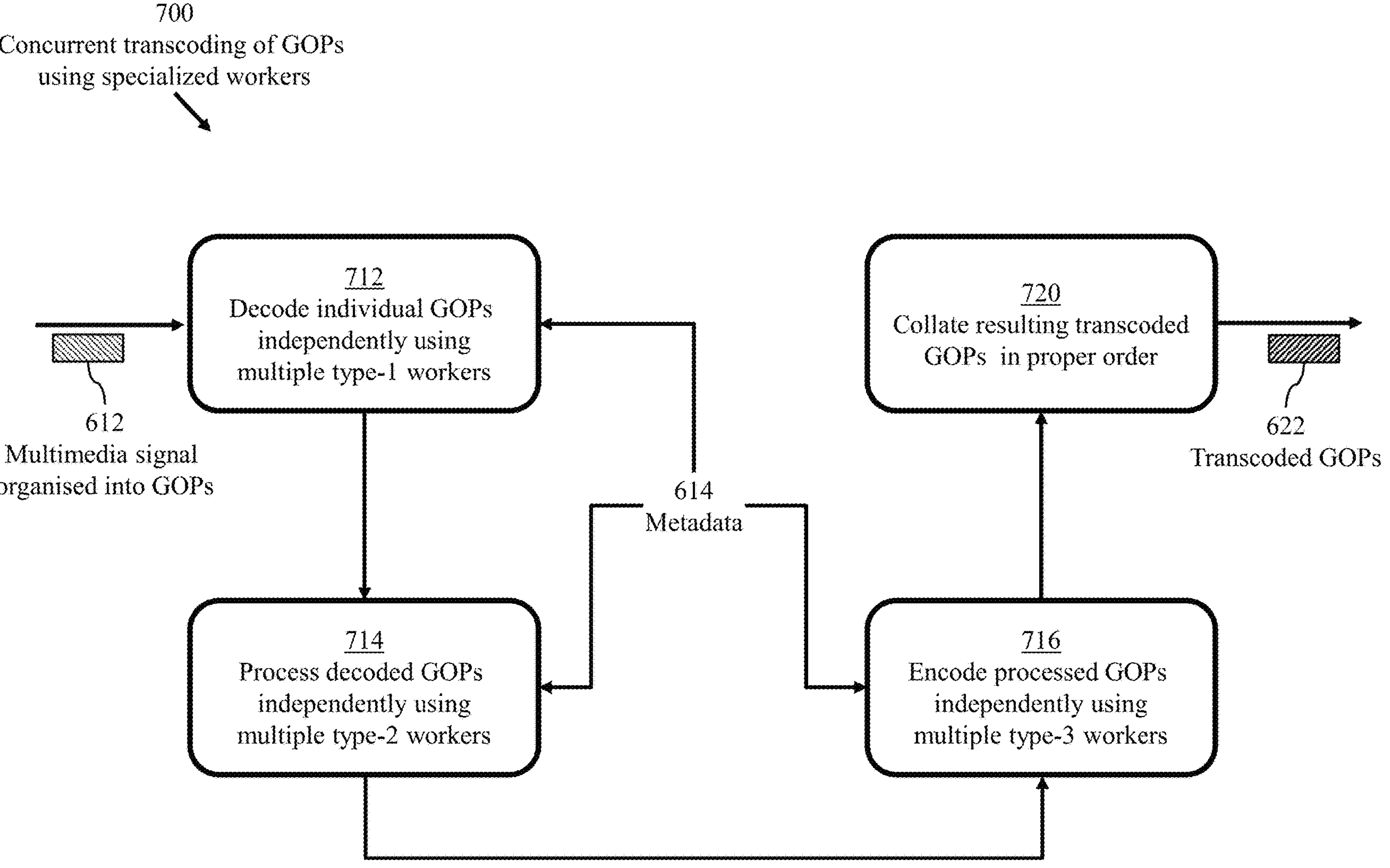
FIG. 7 is an overview of concurrent processing using specialized workers, in accordance with an embodiment of the present invention.

FIG. 7 illustrates a scheme 700 for concurrent transcoding of GOPs using specialized workers 240. Process 712 uses type-1 workers 421 to decode (decompress) received multimedia signals 612 organized into independent GOPs which are encoded (compressed) at source according to a first standard to be transcoded according to a second standard. Process 714 performs conventional signal processing of decoded GOPs, received from type-1 workers, using type-2 workers 422. Process 716 encodes (compresses) processed GOPs, received from type-2 workers, using type-3 workers 423. Process 720 collates transcoded GOPs, received from type-3 workers 423, to produce a stream of transcoded GOPs of the same sequential order of corresponding incoming GOPs of multimedia stream 612. The metadata 614 is supplied to processes 712, 714, and 716.

Figure 8:
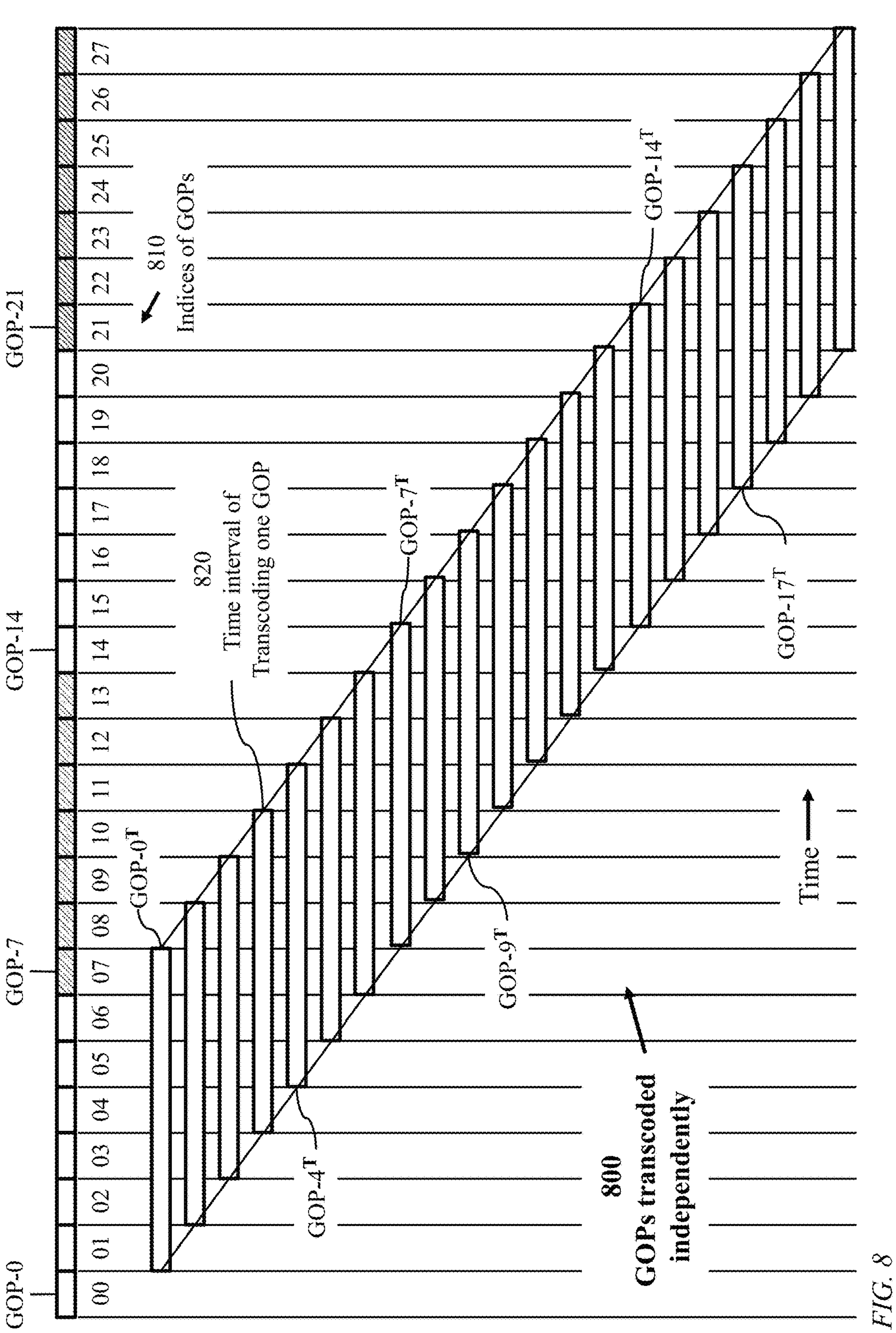
FIG. 8 illustrates time intervals of independently transcoded successive GOPs, denoted GOP-$k^T$, k>0, for a case of GOPs of equal processing time intervals.

FIG. 8 is a representation 800 of processing time intervals of independently transcoding GOPs to produce transcoded GOPs {GOP-0$^T$, GOP-1$^T$, etc.} for a case of GOPs of equal processing time intervals. Successive GOPs received at transcoding station 200 are identified according to indices 810. Using an appropriate number of integrated workers 410, for each incoming GOP transcoding starts immediately after completion of acquisition of the GOP and ends after a time interval 820. Thus, realizing live transcoding where an outgoing transcoded stream is transmitted after a relatively short period of time following arrival of a respective incoming stream.

Figure 9:
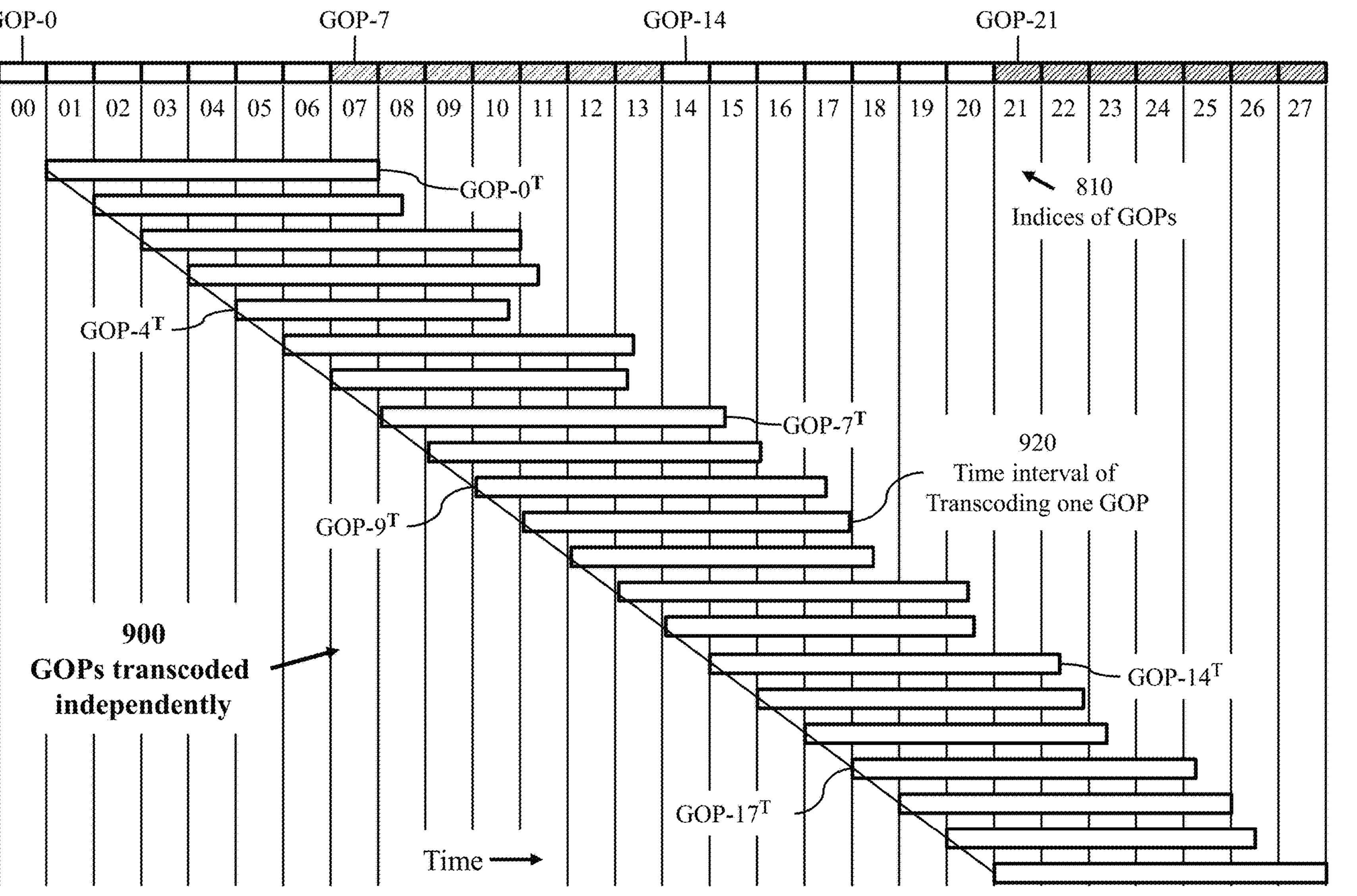
FIG. 9 illustrates time intervals of independently transcoded successive GOPs, GOP-$k^T$, k>0, for a case of GOPs of different transcoding time intervals.

FIG. 9 is a representation 900 of processing time intervals of independently transcoding GOPs to produce transcoded GOPs {GOP-0$^T$, GOP-1$^T$, etc.} for a case where the processing time required to transcode a GOP may differ significantly from one GOP to another. Using an appropriate number of integrated workers 410, for each incoming GOP transcoding starts immediately after completion of acquisition of the GOP and ends after a time interval 920. Thus, realizing live transcoding where an outgoing transcoded stream is transmitted after a relatively short period of time following arrival of a respective incoming stream.

Figure 10:
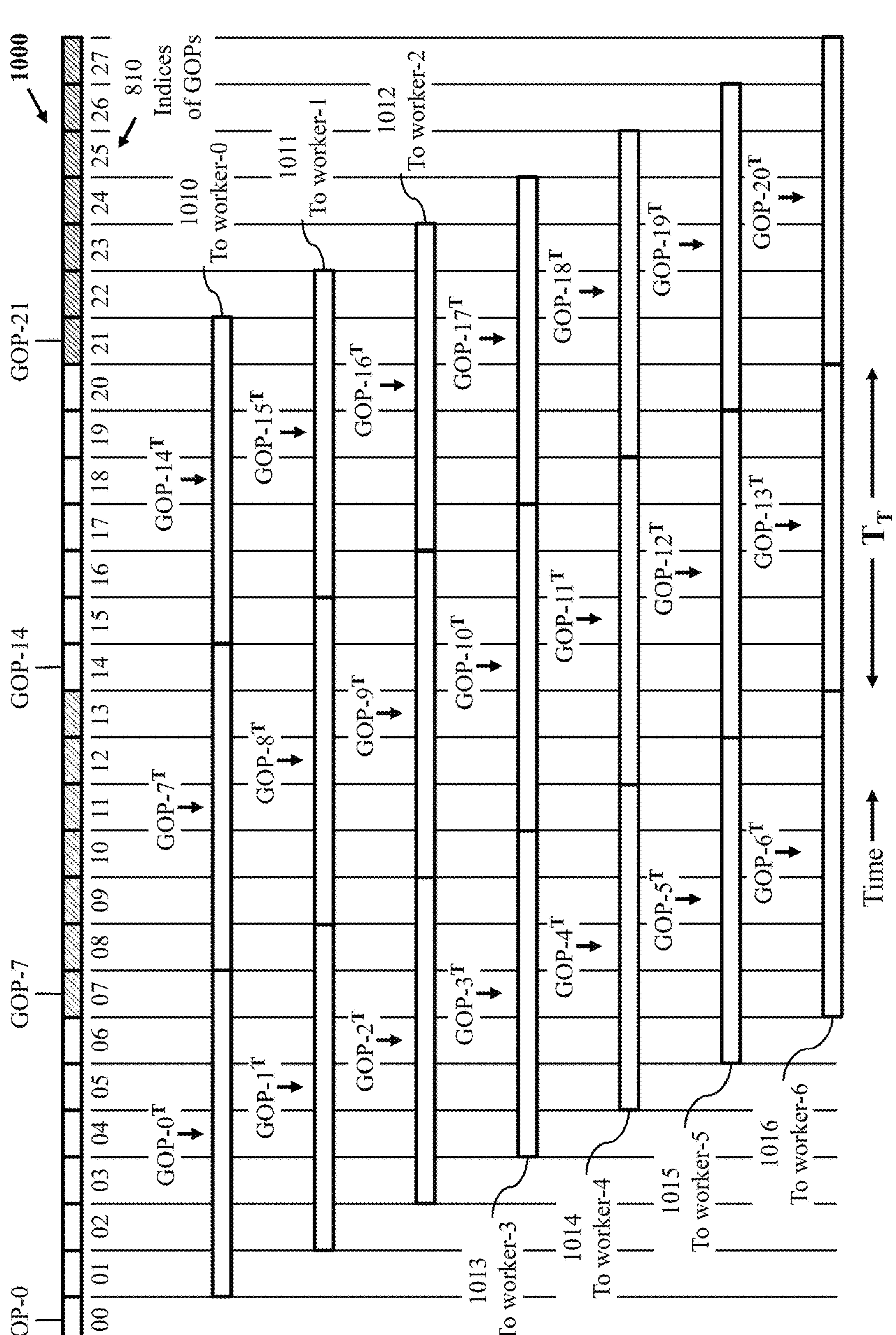
FIG. 10 illustrates a scheme 1000 of assignment of GOPs to a number of integrated workers for performing concurrent transcoding processes for a case of live multimedia transcoding and GOPs of equal transcoding time intervals (illustrated in FIG. 8)

FIG. 10 illustrates assignment of GOPs to a number of integrated workers for performing concurrent transcoding processes for the case of GOPs of equal transcoding time intervals (illustrated in FIG. 8). Transcoding tasks assigned to each worker of index j, 0≤j<7, are identified (reference numerals 1010 to 1016).

Figure 11:
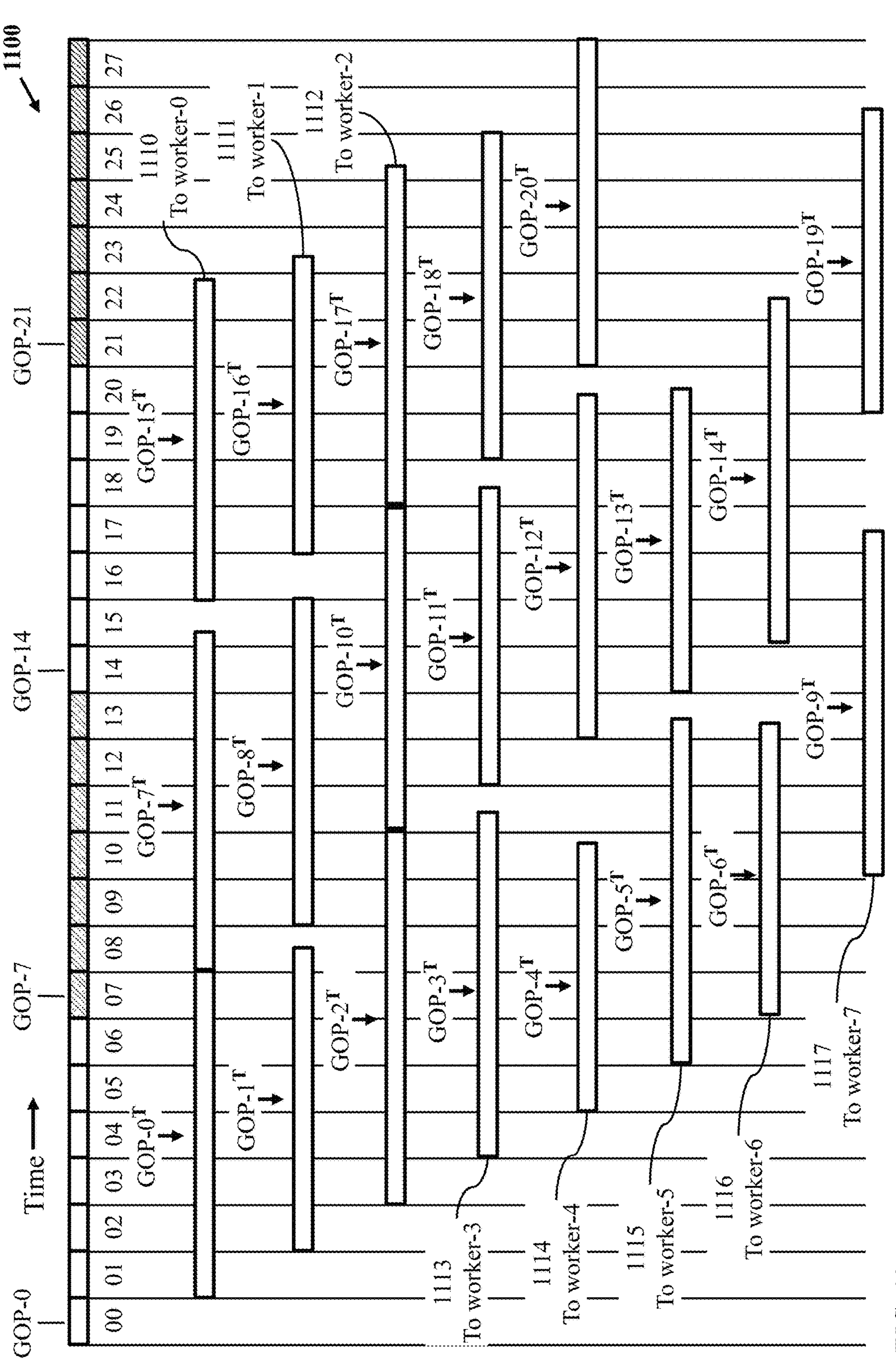
FIG. 11 illustrates a scheme 1100 of assignment of GOPs to a number of integrated workers for performing concurrent transcoding processes for a case of live multimedia transcoding and GOPs of differing transcoding time intervals (illustrated in FIG. 9)

FIG. 11 illustrates assignment of GOPs to a number of integrated workers for performing concurrent transcoding processes for the case of GOPs of differing transcoding time intervals (illustrated in FIG. 9). Transcoding tasks assigned to each worker of index j, 0≤j<8, are identified (reference numerals 1110 to 1117).

Figure 12:
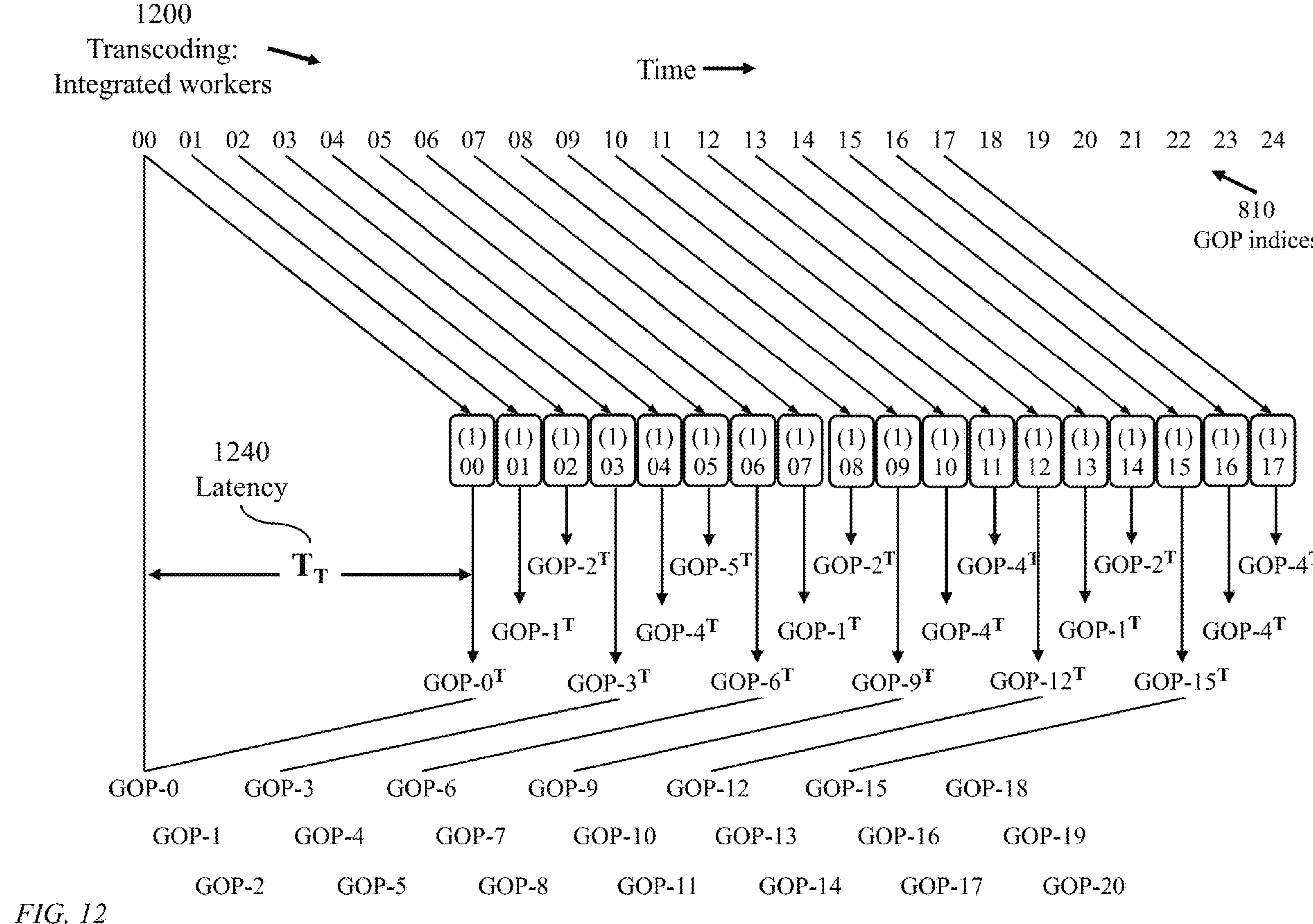
FIG. 12 illustrates transcoding latency of a stream of GOPs for a case of using integrated workers.

FIG. 12 illustrates an example 1200 of the delay 1240 incurred in transcoding an incoming GOP stream for a case of using integrated workers 410.

Figure 13:
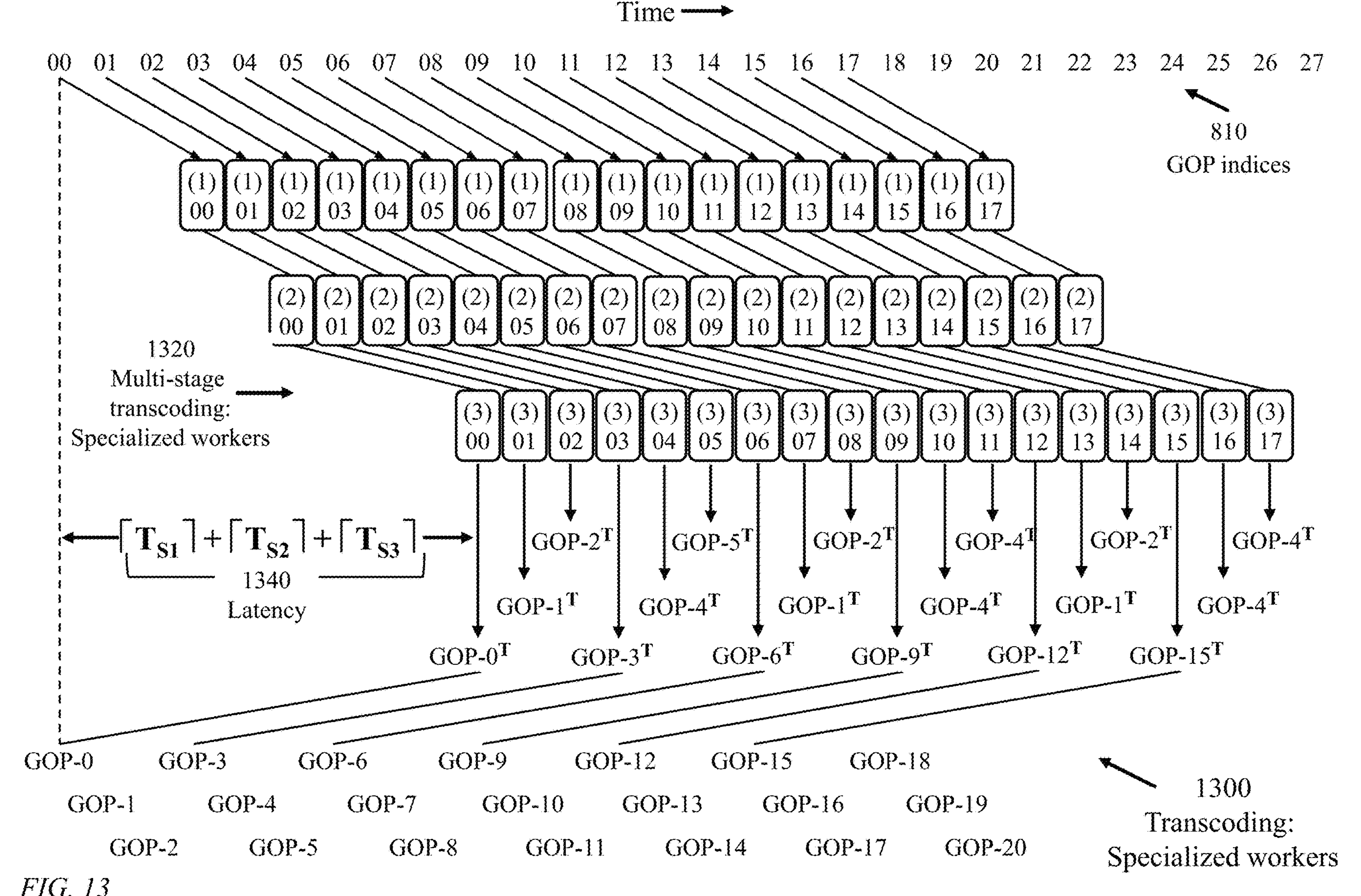
FIG. 13 illustrates transcoding latency of a stream of GOPs for a case of using specialized workers.

FIG. 13 illustrates an example 1300 of the delay 1340 incurred in transcoding an incoming GOP stream for a case of using specialized workers 420.

Figure 14:
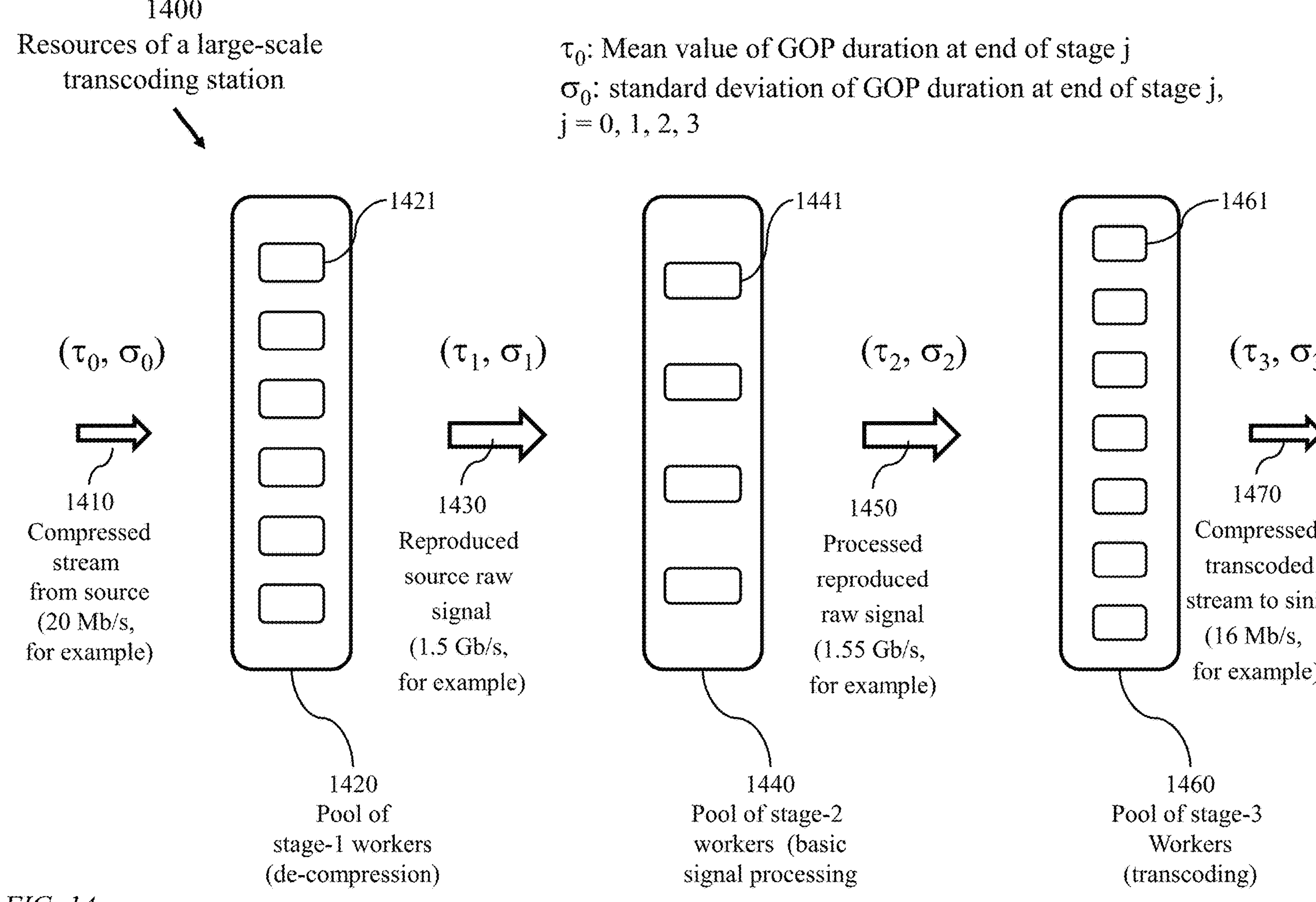
FIG. 14 illustrates resources provided at a large-scale versatile transcoding station comprising a first stage constructed as a pool of decoding workers, a second stage constructed as a pool of signal-processing workers, and a third stage constructed as a pool of encoding workers, in accordance with an embodiment of the present invention.

FIG. 14 illustrates resources 1400 provided at a large-scale transcoding station comprising a first stage comprising a pool 1420 of decoding workers 1421, a second stage comprising a pool 1440 of signal-processing workers 1441, and a third stage comprising a pool 1460 of encoding workers 1461. The signal-processing workers mainly perform video-signal operations and are hereinafter referenced as video-processing units (VPUs).

The transcoding station receives a stream 1410 of compressed GOPs from a source 140.

Figure 19:
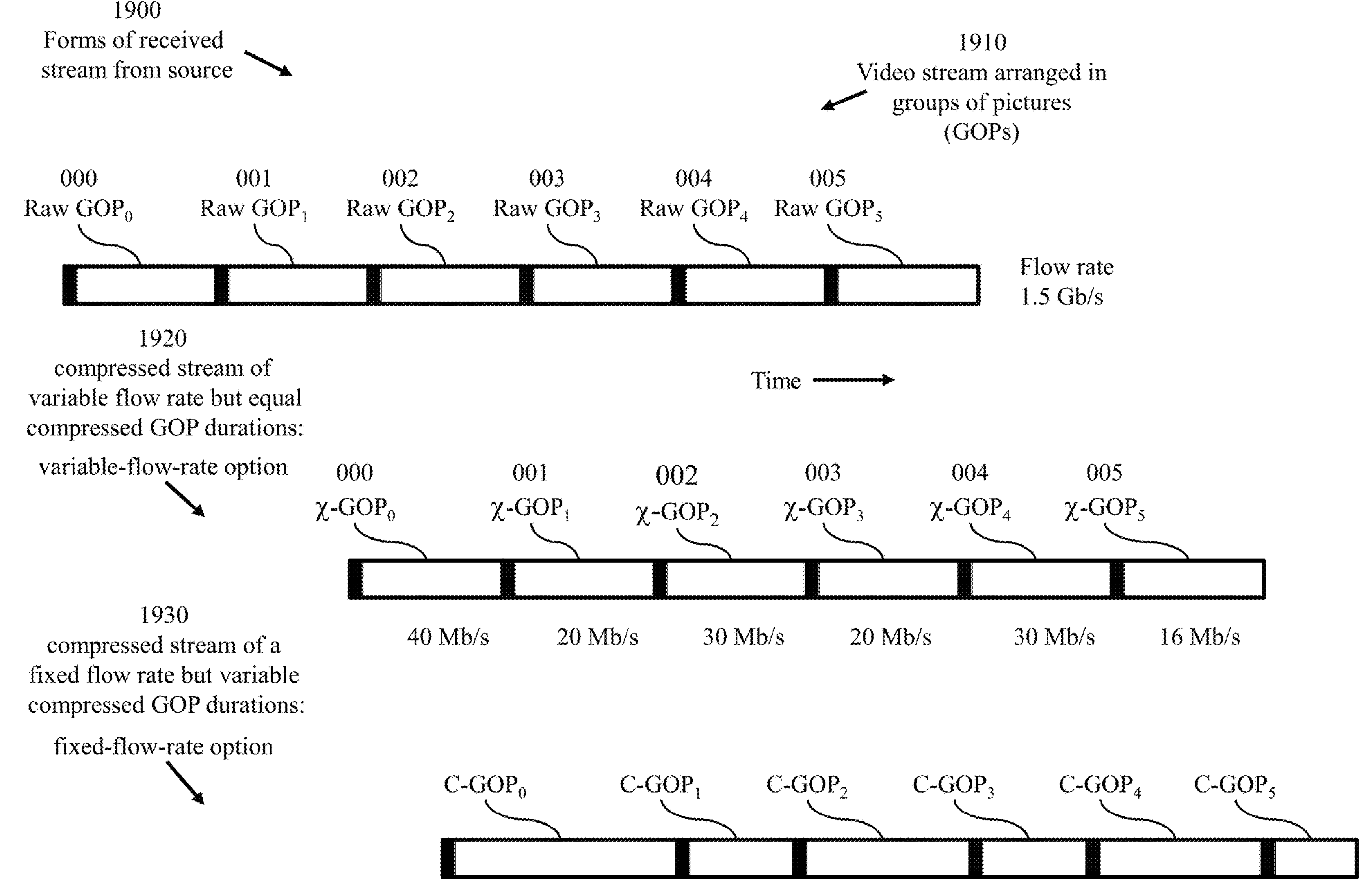
FIG. 19 illustrates forms of multimedia signals received at a transcoding station from a multimedia source, comprising variable flow rate signals comprising groups-of-pictures (GOPs) of fixed durations and signals of fixed flow rates with variable GOP durations, for use in an embodiment of the present invention.

Each of the corresponding raw GOPs at the source comprises a known number of video frames with a known rate of frames per second. The raw GOPs are compressed at source according to any of standardized methods to produce compressed GOPs. The sizes (number of bytes) of compressed GOPs may vary significantly according to intra-frame and inter-frame view variation. The durations of the compressed GOPs may be equal, if the stream is transmitted from the source at a variable bit rate, or time-variant if the stream is transmitted at a constant bit rate as illustrated in FIG. 19.

Figure 20:
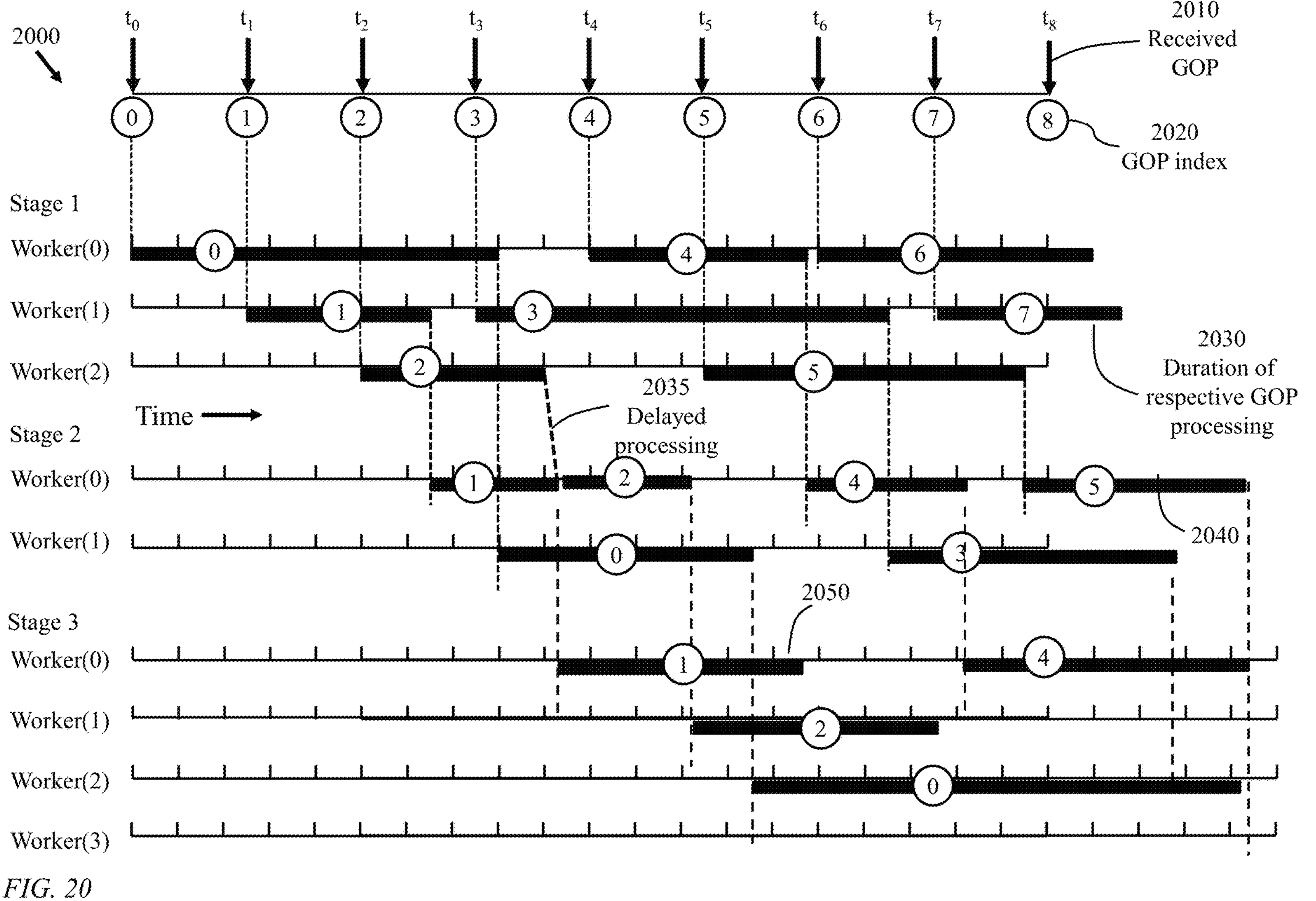
FIG. 20 illustrates allocation of successive GOPs to workers of the three stages of FIG. 14 for a stream of variable flow rate with GOPs of fixed durations, in accordance with an embodiment of the present invention.
Figure 22:
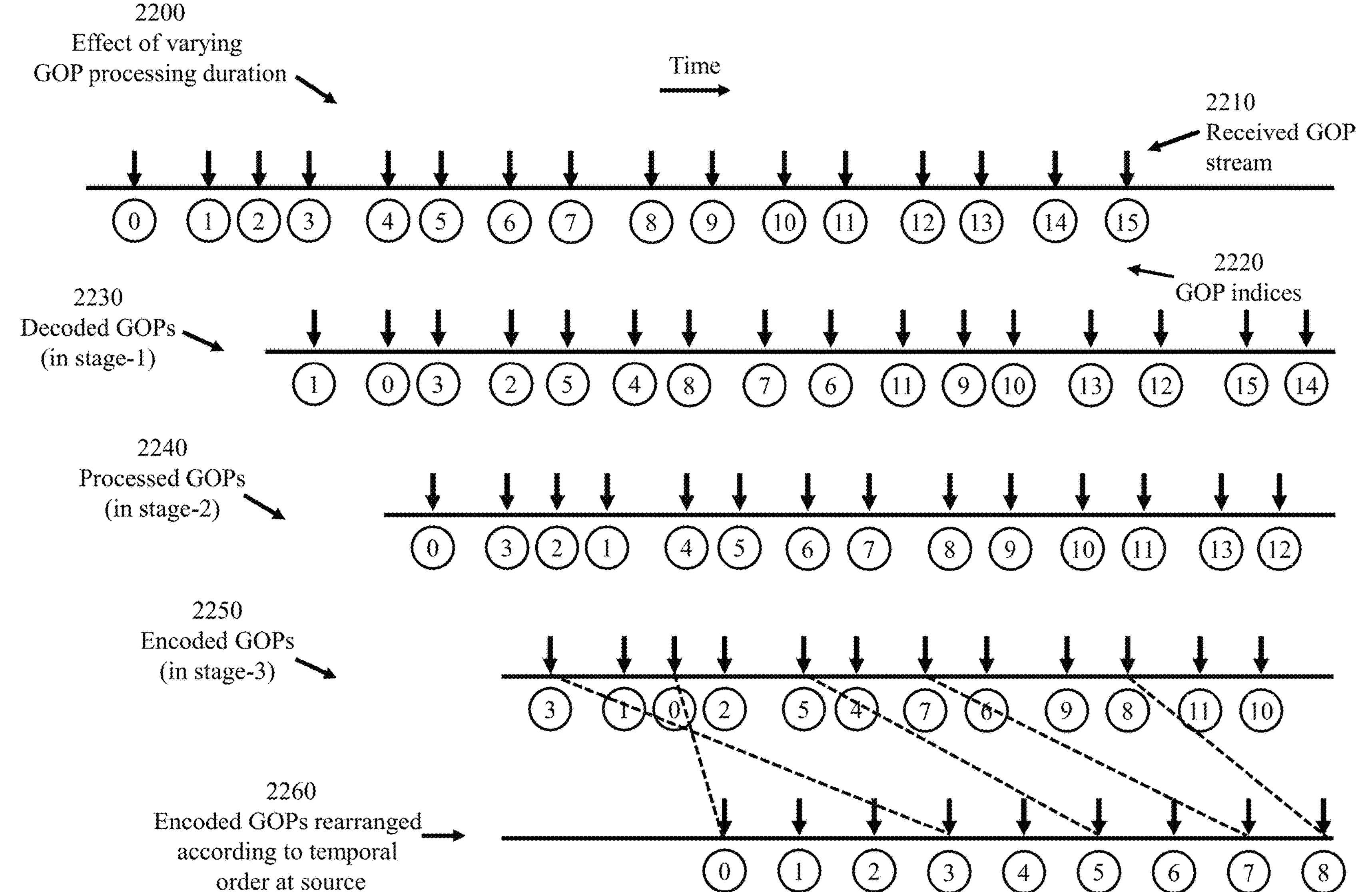
FIG. 22 illustrates discrepancy between the order of arrival of received GOPs and the order of transcoded GOPs due to varying processing effort of different GOPs within each of the three stages, thus necessitating reordering of the GOPs at output of the transcoding station.

The output stream 1430 of stage-1 is an approximation of the source raw stream. Regardless of the durations of the compressed GOPs of stream 1410, the decoding time intervals (workers' engagement periods) in stage-1 may vary significantly and may considerably exceed the mean-value $\tau_0$ of durations of the received compressed GOPs. To circumvent the need for massive storage of compressed GOPs at input of the first stage, multiple stage-1 decoders 1421 are employed so that several compressed GOPs may undergo decoding processes concurrently in different decoders 1421. Due to the variation of decoding time intervals of different GOPs, the output stream of stage-1 may comprise decoded GOPs produced in an order that differs from the order of respective compressed GOPs as illustrated in FIG. 20 and FIG. 22. For a steady-state operation, the collective decoding capability of stage-1 is selected so that the mean value $\tau_1$ of the completion time intervals of successive decoded GOPs does not exceed $\tau_0$.

The pool 1440 of video-processing units (VPUs) 1441 processes stream 1430 of decoded GOPs where several decoded GOPs may be processed concurrently in different VPUs.

Due to the variation of processing time intervals of different decoded GOPs of stream 1430, the output stream 1450 of stage-2 may comprise decoded GOPs produced in an order that differs from the order of respective decoded GOPs of stream 1430 as illustrated in FIG. 20 and FIG. 22. For a steady-state operation, the collective signal-processing capability of stage-2 is selected so that the mean value $\tau_2$ of the completion time intervals of successive processed GOPs within stage-2 does not exceed $\tau_0$; this is an essential design requirement.

The output stream 1450 of stage-2 comprises processed GOPs compatible with capabilities of intended receiving clients 180 (the transcoded stream may be directed to multiple clients 180 of similar characteristics). The pool 1460 of encoding units 1461 encodes stream 1450 of processed GOPs where several processed GOPs may be encoded concurrently in different encoders 1461. Due to the variation of encoding time intervals of different processed GOPs, the output stream of stage-3 may comprise decoded GOPs produced in an order that differs from the order of respective processed GOPs of stream 1450 as illustrated in FIG. 20 and FIG. 22. For a steady-state operation, the collective encoding capability of stage-3 is selected so that the mean value of the completion time intervals of successive encoded GOPs within stage-3 does not exceed $\tau_0$.

The output stream 1470 of stage-3 comprises compressed encoded GOPs compatible with capabilities of intended receiving clients 140. The GOPs of the output stream 1470 over a moving time window may need to be buffered to enable re-ordering of the GOPs as needed.

The mean values $\tau_1$, $\tau_2$, and $\tau_3$ of the completion time intervals, together with corresponding standard deviations $\sigma_1$, $\sigma_2$, and $\sigma_3$, may be determined from measurements to be used for optimal provisioning of resources of the transcoding station.

Figure 15:
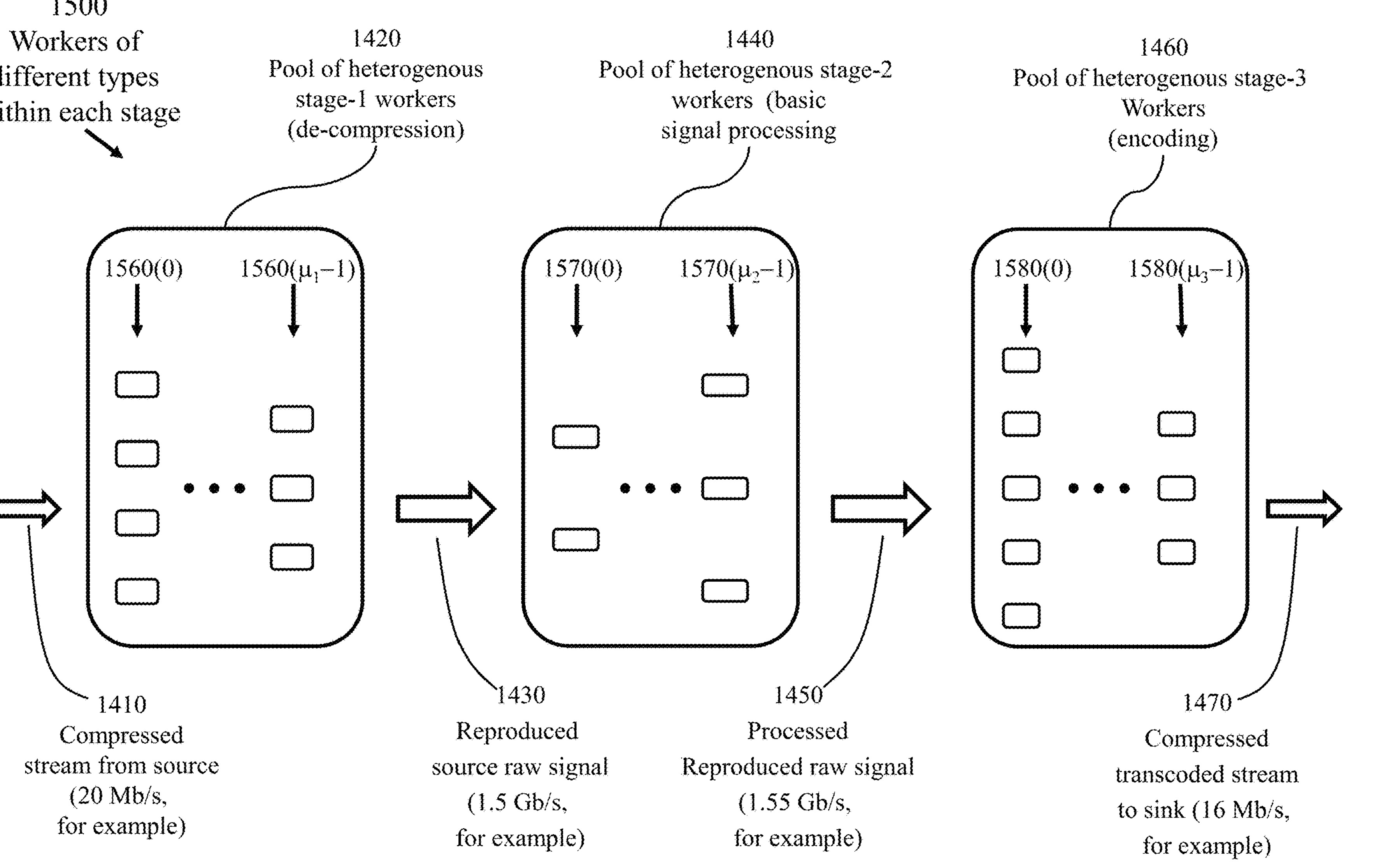
FIG. 15 illustrates the transcoding-station resources of FIG. 14 where the pool of decoding workers comprises clusters of decoding workers of distinct forms, the pool of signal processing workers comprising clusters of distinct signal-processing workers, and the pool of decoding workers comprises clusters of distinct decoding workers, in accordance with an embodiment of the present invention.

FIG. 15 illustrates details 1500 of the transcoding-station resources of FIG. 14 where at least one pool of workers is arranged into multiple clusters of workers of distinct characteristics.

In general, the pool 1420 of decoding workers comprises $\mu_1$ clusters, $\mu_1 \geq 1$, referenced as 1560(0) to 1560($\mu_1-1$) of decoding workers of distinct forms, the pool 1440 of signal processing workers comprises $\mu_2$ clusters, $\mu_2 \geq 1$, referenced as 1570(0) to 1570($\mu_2-1$) of distinct signal-processing workers, and the pool 1460 of encoders comprises $\mu_3$ clusters, $\mu_3-1$, referenced as 1580(0) to 1580($\mu_3-1$), of distinct encoders.

Figure 16:
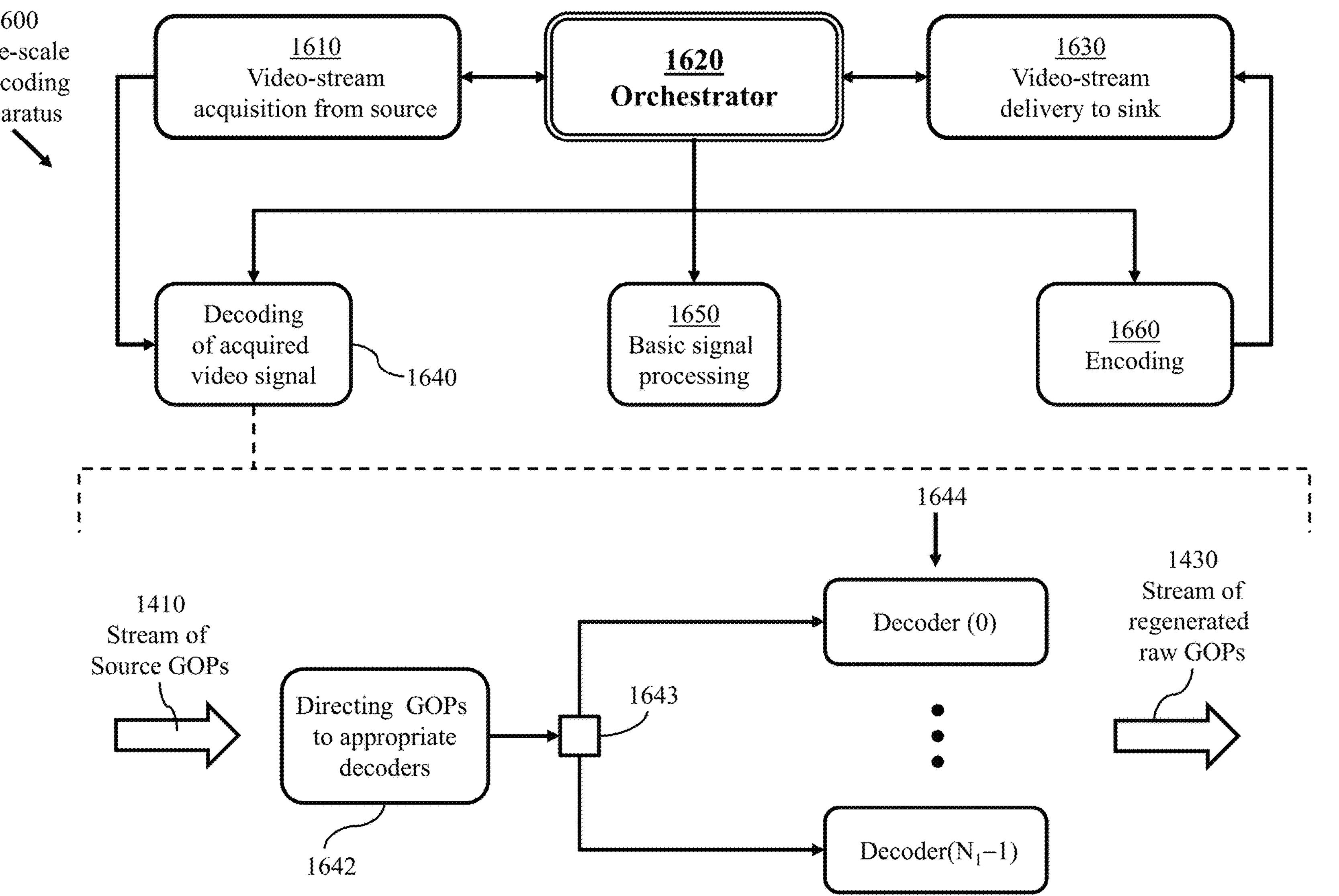
FIG. 16 is a schematic of a large-scale transcoding station comprising an orchestrator directing operations of the decoding stage, the signal-processing stage, and the decoding stage of FIG. 14, detailing the decoding stage, in accordance with an embodiment of the present invention.
Figure 17:
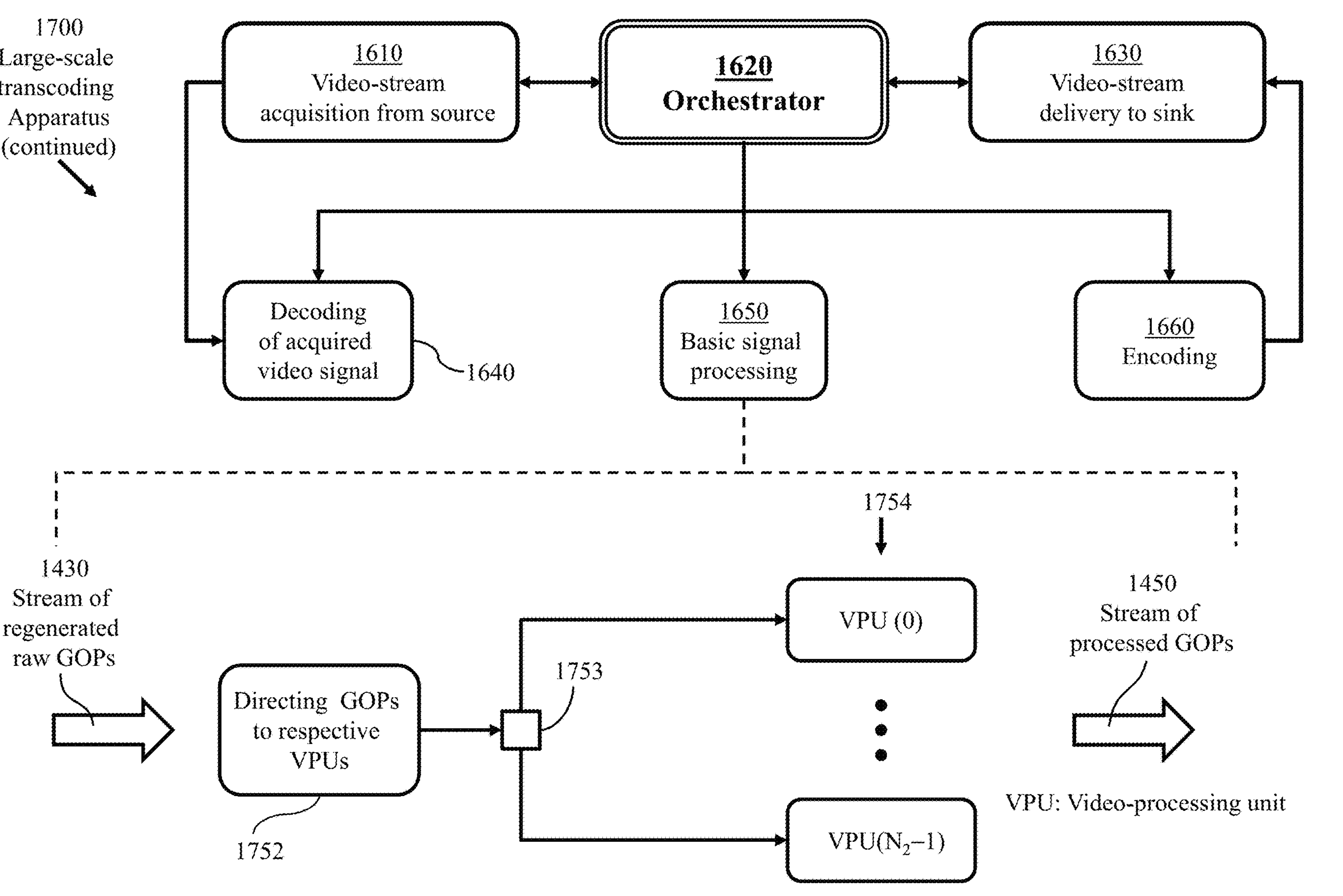
FIG. 17 is a continuation of FIG. 16 detailing the signal-processing stage, in accordance with an embodiment of the present invention.
Figure 18:
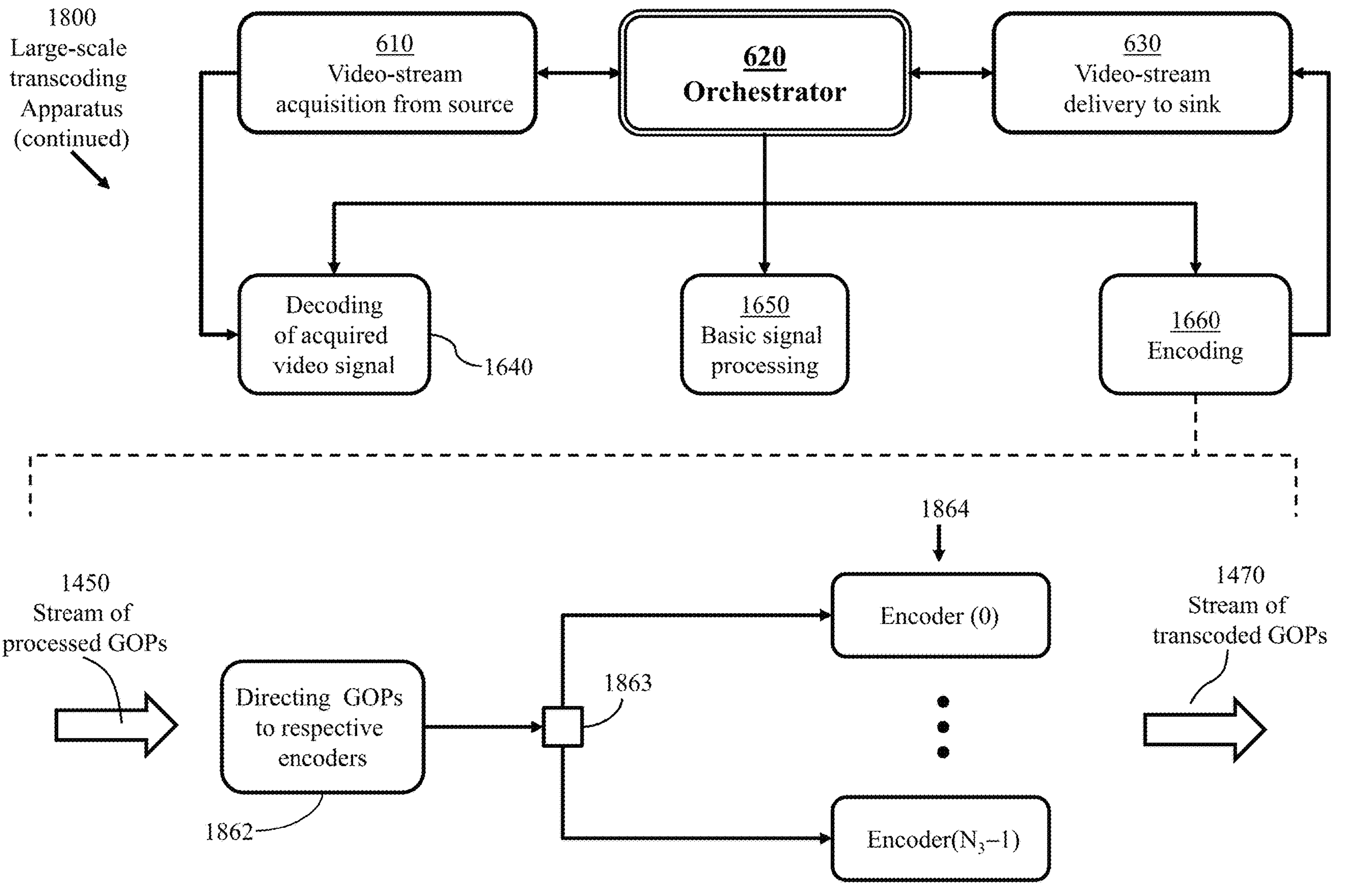
FIG. 18 is a continuation of FIG. 17 detailing the decoding stage, in accordance with an embodiment of the present invention.

With a focus on selected clusters of resources applicable to a specific stream, a cluster 1560 of $N_1$ decoders, $N_1 \geq 1$, a cluster 1570 of $N_2$ signal adaptors, $N_2 \geq 1$, and a cluster 1580 of $N_3$ encoders, $N_3 \geq 1$, are used in FIG. 16, FIG. 17, and FIG. 18.

FIG. 16 is a schematic 1600 illustrating a large-scale transcoding apparatus comprising: an orchestrator 1620 of a transcoding station directing operation of: a module 1610 configured to perform a process of acquisition of a multimedia stream from a multimedia source 140; a decoding stage 1640; a signal-processing stage 1650, an encoding stage 1660; and a module 1630 for communicating transcoded multimedia stream to a client 180 under control of orchestrator 1620. A module 1642 is configured to direct a stream of GOPs to an appropriate decoder cluster 1560, through a 1:$N_1$ selector, and direct individual GOPs of the stream to available decoders 1644 within the cluster.

FIG. 17 is schematic 1700 illustrating the large-scale transcoding station of FIG. 16 detailing processes of the signal-processing stage 1650. A module 1752 is configured to direct a stream of decoded GOPs to an appropriate VPU cluster 1570, through a 1:$N_2$ selector, and direct individual decoded GOPs of the stream to available VPUs 1754 within the cluster.

FIG. 18 is a schematic 1800 illustrating the large-scale transcoding station of FIG. 16 and FIG. 17 detailing processes of the encoding stage 1860. A module 1862 is configured to direct a stream of processed GOPs to an appropriate encoder cluster 1580, through a 1:$N_3$ selector, and direct individual processed GOPs of the stream to available encoders 1864 within the cluster.

FIG. 19 illustrates video-stream components 1900 of multimedia streams formed at a multimedia source 140 to be directed to a transcoding station 160. The video streams may comprise variable-flow-rate streams with fixed durations of group-of-pictures (GOPs), or fixed-flow-rate streams with variable GOP durations. A raw video stream 1910 originating at a multimedia source 140 is arranged in raw groups of pictures (GOPs). Six raw GOPs, indexed as 000 to 005, are illustrated. The raw video stream 1910 may be compressed to form a compressed video stream 1920 of a variable flow rate but equal compressed GOP durations, or a compressed video stream 1930 of a fixed flow rate, hence variable compressed GOP durations.

FIG. 20 illustrates allocation 2000 of successive GOPs of video-stream 1920, of a variable flow rate, constant inter-GOP periods, to workers of the three stages of FIG. 15

Within the first stage, compressed GOPs 2010, of indices 2020, are received at successive time instants $t_j$, where the intervals ($t_{j+1}$-$t_j$), j≥0, are equal. The durations 2030 of processing individual GOPs 2010 within the first stage may vary significantly; consequently, the temporal order of generating decoded GOPs may differ from the order of receiving the GOPs from the source. With the illustrated successive GOPs denoted GOP-0 to GOP-9, and the processing durations of individual GOPs indicated with respective thick line spans, it is seen that the decoded GOPs, labeled [GOP-1] to [GOP-8], corresponding to the incoming compressed GOP-0 to GOP-8, are produced in the order [GOP-1], [GOP-0], [GOP-2], [GOP-4], [GOP-3], [GOP-5], [GOP-6], [GOP-7], [GOP-8].

Within the second-stage, decoded GOPs derived from received GOPs 2010, are received during generally unequal intervals. The duration 2040 of processing of a GOP within the second stage may also vary; consequently, the temporal order of generating processed decoded GOPs may differ from the temporal order at which the decoded GOPs are received from the first stage. As indicated (reference 2035), when decoding of the GOP of index 2 in stage 1 is completed, neither of the two workers of stage 2 is available, hence the decoded GOP is queued at worker(0) of stage-2 for a short interval before processing.

The processed GOPs, labeled [[GOP-0]] to [[GOP-8]], corresponding to the decoded [GOP-0] to [GOP-8], are produced in the order [[GOP-1]]. [[GOP-2]], [[GOP-0]], [[GOP-4]], [[GOP-3]], [GOP-5]], . . . .

Within the third stage, the processed decoded GOPs derived from decoded GOPs, are also received during generally unequal intervals. The duration 2050 of processing of a GOP within the third stage may vary significantly, according to standard to which the stream is encoded.

Figure 21:
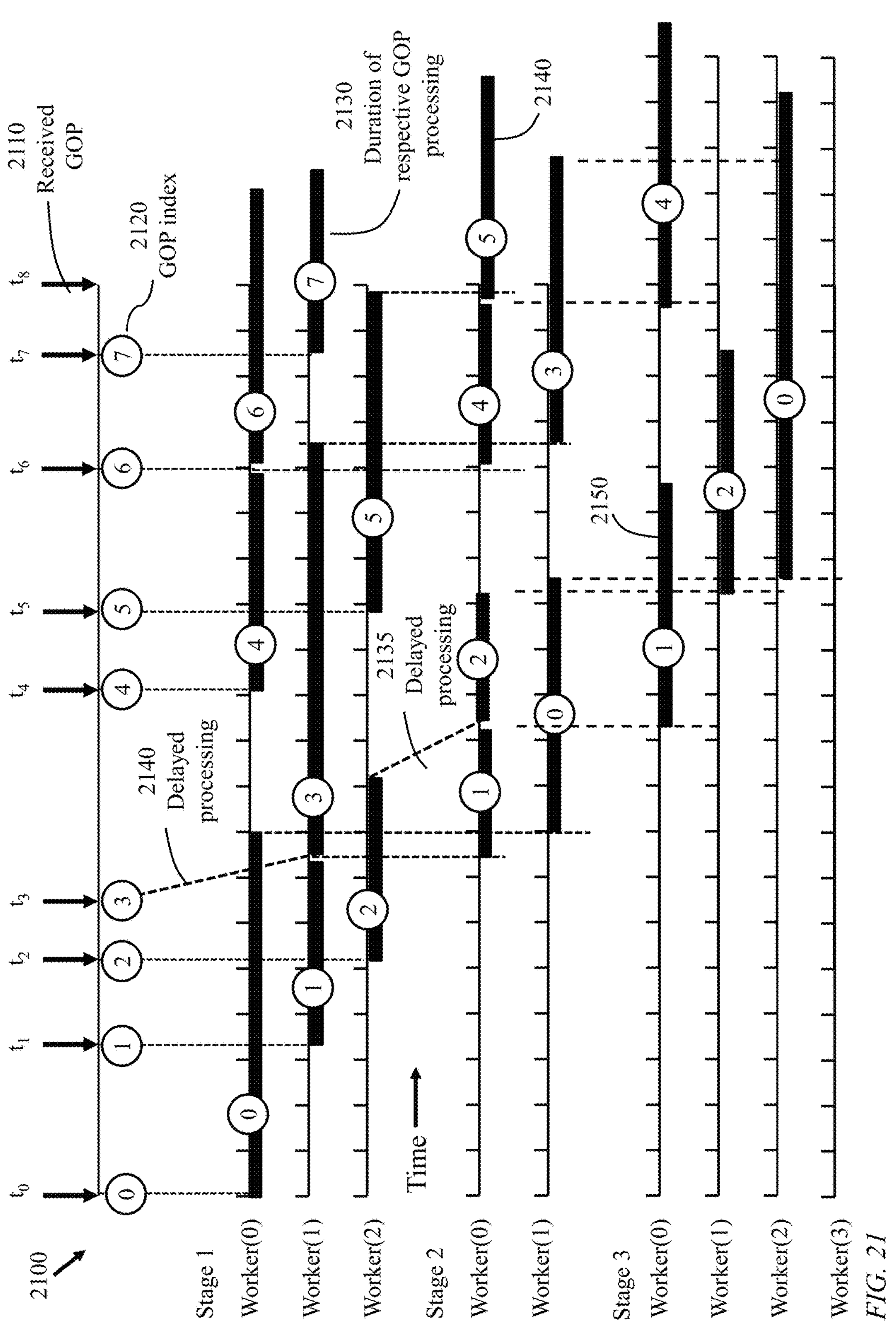
FIG. 21 illustrates allocation of successive GOPs to workers of the three stages of FIG. 14 for a stream of a fixed flow rate with variable inter-arrival periods, in accordance with an embodiment of the present invention.

FIG. 21 illustrates allocation 2100 of successive GOPs of video-stream 1930, of a fixed flow rate, variable inter-GOP periods, to workers of the three stages of FIG. 15.

Within the first stage, compressed GOPs 2110, of indices 2120, are received at successive intervals tj, where the intervals $(t_{j+1}-t_j)$, j≥0, are generally unequal. The durations 2130 of processing individual GOPs 2110 within the first stage may vary significantly; consequently, the temporal order of generating decoded GOPs may differ from the order of receiving the GOPs from the source.

Within the second stage, decoded GOPs derived from received GOPs 2110, are received during generally unequal intervals. The duration 2140 of processing of a GOP within the second stage may also vary; consequently, the temporal order of generating processed decoded GOPs may differ from the temporal order at which the decoded GOPs are received from the first stage. As indicated (reference 2135), when decoding of the GOP of index 2 in stage 1 is completed, neither of the two workers of stage 2 is available, hence the decoded GOP is queued at worker of index 0 of stage-2 for a short interval before processing.

Within the third stage, the processed decoded GOPs derived from decoded GOPs, are also received during generally unequal intervals. The duration 2150 of processing of a GOP within the third stage may vary significantly, according to protocol to which the stream is encoded.

FIG. 22 illustrates an example 2200 of discrepancy between the order of arrival of received GOPs and the order of producing transcoded GOPs due to varying processing time intervals of different GOPs within each of the three stages. The GOPs received at successive time instants 2210 are indexed sequentially, in steps of 1 (reference 2220). Received GOPs of indices 0 to 15 are illustrated. As illustrated, the sequential order of the decoded GOPs 2230 in stage-1 differs from the sequential order of the GOPs received from the source. The sequential order of the processed GOPs 2240 in the second stage differs from the sequential order of decoded GOPs 2230. The sequential order of the encoded GOPs 2250 in the third stage differs from the sequential order of processed GOPs 2240.

A process 2260 rearranges the encoded GOPs of stage-3 in the same temporal order of corresponding raw GOPs formed at the source, prior to transmission to a destination client 180. Rearrangement of the encoded GOPs may be performed at the network interface 220/2320 or at a stage controller (an arbitrator) associated with the orchestrator 250. To enable the rearrangement, a number of encoded GOPs, within a moving time window, may need to be held in a circular buffer.

Figure 23:
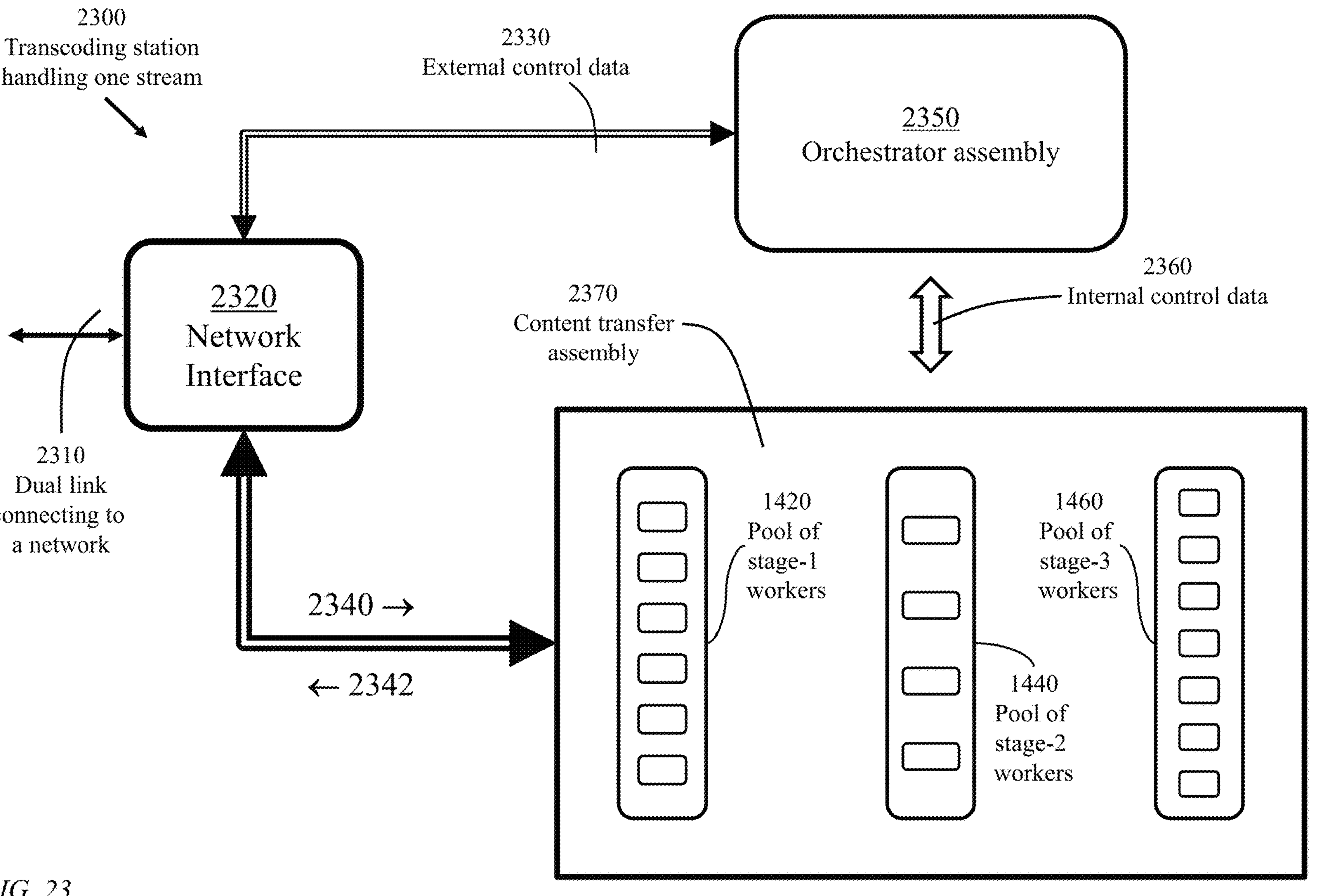
FIG. 23 is an overview of a transcoding station handing GOPs of a single multimedia stream indicating flow of control data from an orchestrator assembly to workers of the three stages, in accordance with an embodiment of the present invention.

FIG. 23 is an overview 2300 of a transcoding station, handling GOPs of a single multimedia signal, comprising an orchestrator assembly 2350 and a content-transfer assembly 2370 configured to transfer GOPs content to the pools of workers illustrated in FIG. 14.

Network interface 2320 communicates with multimedia sources 140 and clients 180 through a dual link 2310 connecting the transcoding station to network 120. The orchestrator assembly 2350 exchanges external control data 2330 with multimedia sources 140 and clients 180. The orchestrator assembly 2350 distributes internal control data 2360 to the content-transfer assembly.

Under control of the orchestrator assembly 2350, the content-transfer assembly 2370 receives upstream content data 2340 from a multimedia source 140 and transmits downstream data 2342 to a client 180 through the network interface 2320.

Figure 24:
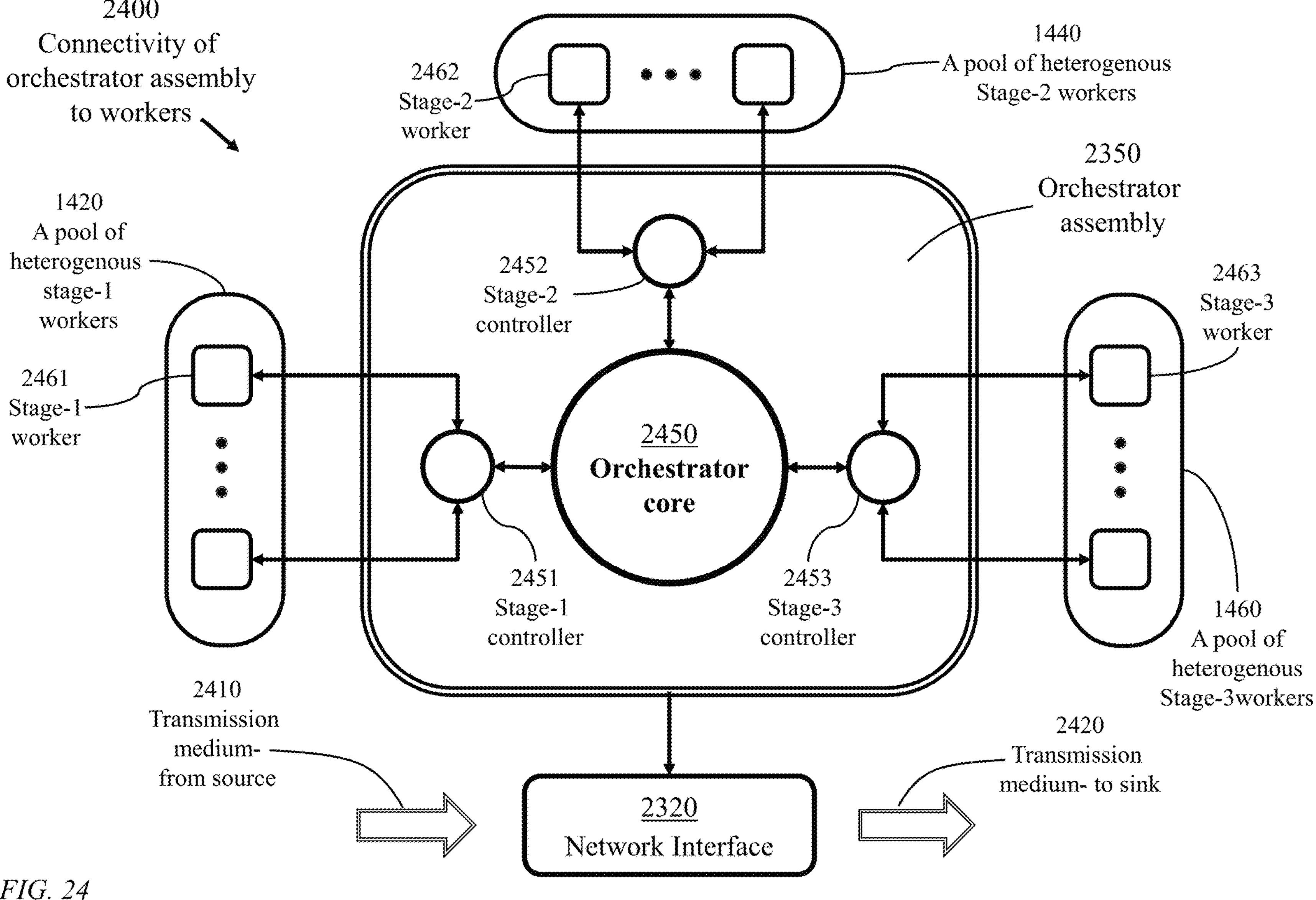
FIG. 24 illustrates an exemplary architecture of the orchestrator assembly of FIG. 23, where an orchestrator core communicates with workers of each stage through a respective stage controller, in accordance with an embodiment of the present invention.

FIG. 24 illustrates an architecture 2400 of the orchestrator assembly 2350, where an orchestrator core 2450 communicates with workers of each stage through a respective stage controller. Network interface 2320 receives compressed streams from multimedia sources 240 through a transmission medium 2410 from network 120 and transmits transcoded compressed streams to clients 180 through a transmission medium 2420 to network 120 (dual link 2310 constitute transmission medium 2410 and transmission medium 2420).

Stage-1 controller 2451 allocates stage-1 workers (decoders) 2461 to incoming compressed GOPs from a multimedia source 240. Stage-2 controller 2452 allocates stage-2 workers (VPUs) 2462 to the output stream of stage-1 (decoded GOPs). Stage-3 controller 2453 allocates stage-3 workers (encoders) 2463 to the output stream of stage-2 (processed GOPs).

Figure 25:
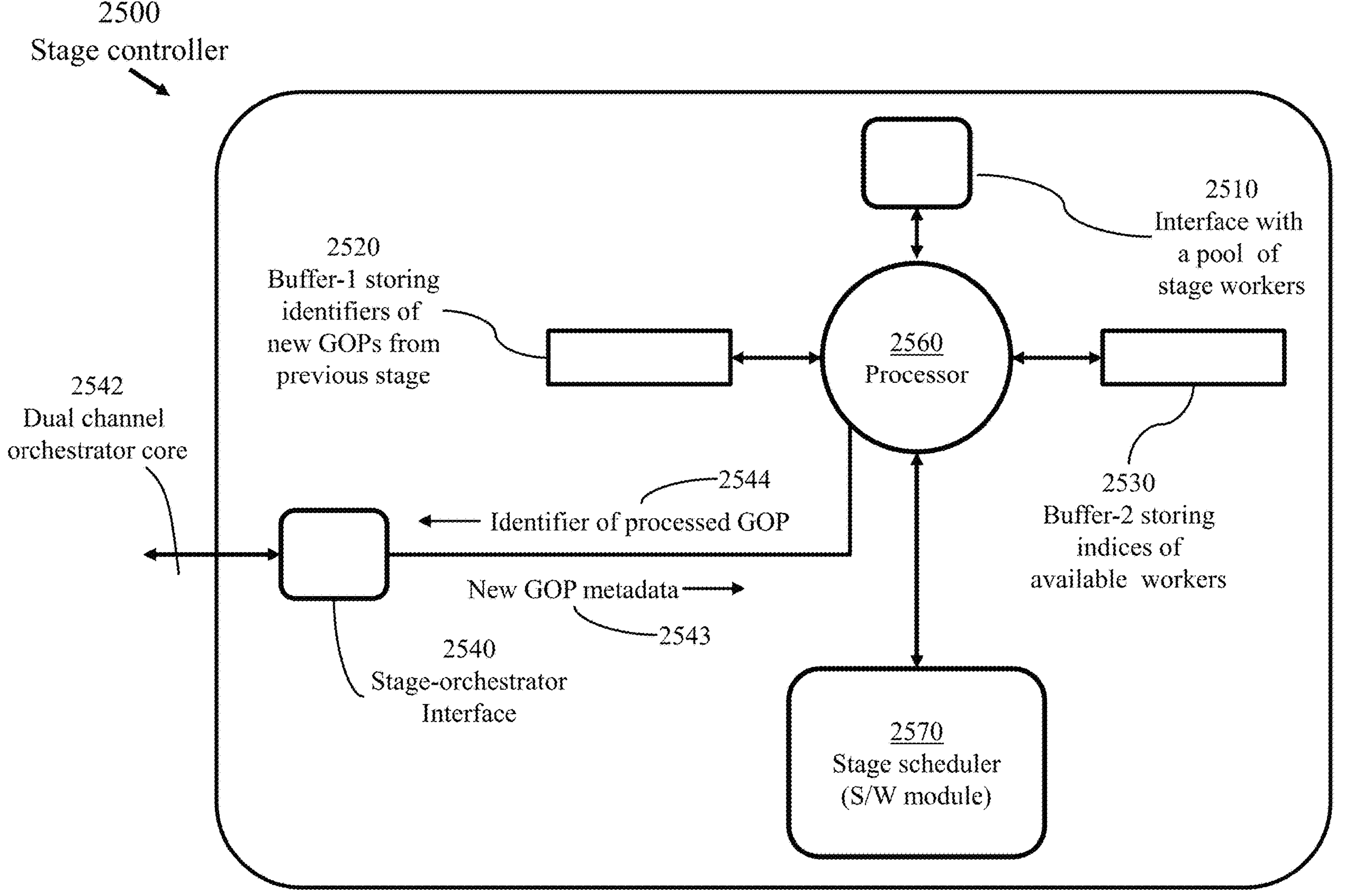
FIG. 25 illustrates a preferred structure of a stage controller, in accordance with an embodiment of the present invention.

FIG. 25 illustrates a structure 2500 of a stage controller 2550 (one of 2451, 2452, and 2453) comprising:

- an interface 2510 with a cluster of workers (FIG. 15) of a respective stage;
- an interface 2540 with the orchestrator core 2450;
- a buffer 2520 holding identifiers of GOPs received from a previous stage;
- a buffer 2530 storing indices of released workers;
- a memory device 2570 storing a scheduler module (software instructions); and
- a processor (or an assembly of processors) 2560 coupled to interface 2510, interface 2540, buffer 2520, buffer 2530, and memory device 2570.

A dual channel 2542 from/to orchestrator core 2450 carries metadata 2543 of a new GOP to be scheduled, and an identifier 2544 of a successfully scheduled GOP.

Figure 26:
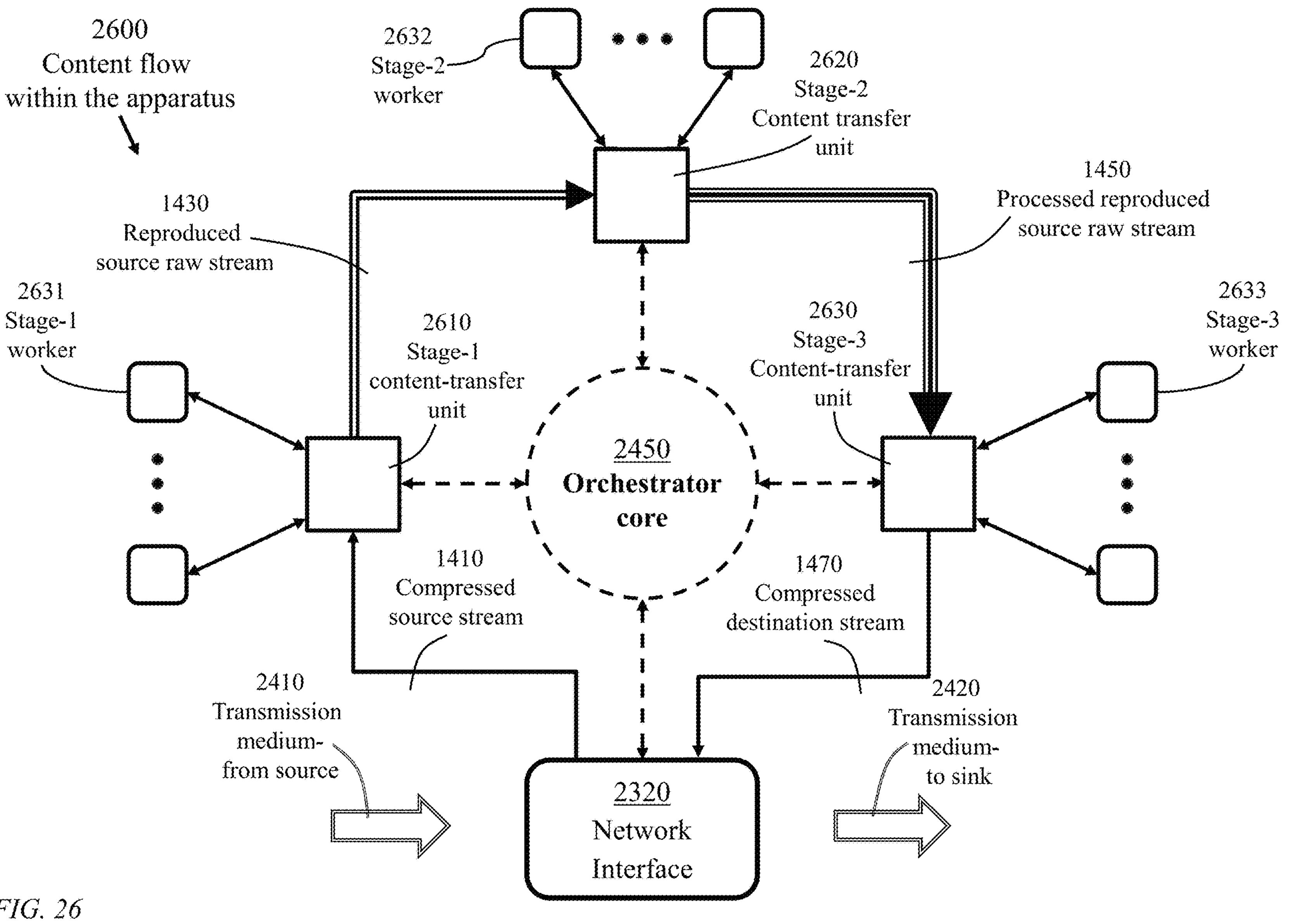
FIG. 26 illustrates content-data flow within the transcoding station, in accordance with an embodiment of the present invention.

FIG. 26 illustrates a content-transfer mechanism 2600 within the transcoding station comprising content-transfer units 2610, 2620, and 2630. The orchestrator core 2450 is communicatively coupled to stage-1 content transfer unit 2610, stage-2 content-transfer unit 2620, and stage-3 content-transfer unit 2630.

Content-transfer unit 2610 transfers stream 1410 of compressed GOPs, received from a source 240 through network interface 2320, to a selected cluster of stage-1 workers for decoding and transfers the decoded stream 1430 of GOPs to content-transfer unit 2620.

Content-transfer unit 2620 transfers the decoded stream 1430 to a selected cluster of stage-2 workers for performing selected signal-processing operations, as indicated in respective metadata, and transfers the processed stream 1440 to content-transfer unit 2630.

Content-transfer unit 2630 transfers the decoded stream 1430 to a selected cluster of stage-3 workers for encoding to a specific standard, according to orchestrator-core instructions, and transfers the encoded (compressed) stream 1470 to the network interface 2320 to be delivered through network 120 to a specified client 180, or a designated set of clients 180.

Heterogenous Resources

Figure 27:
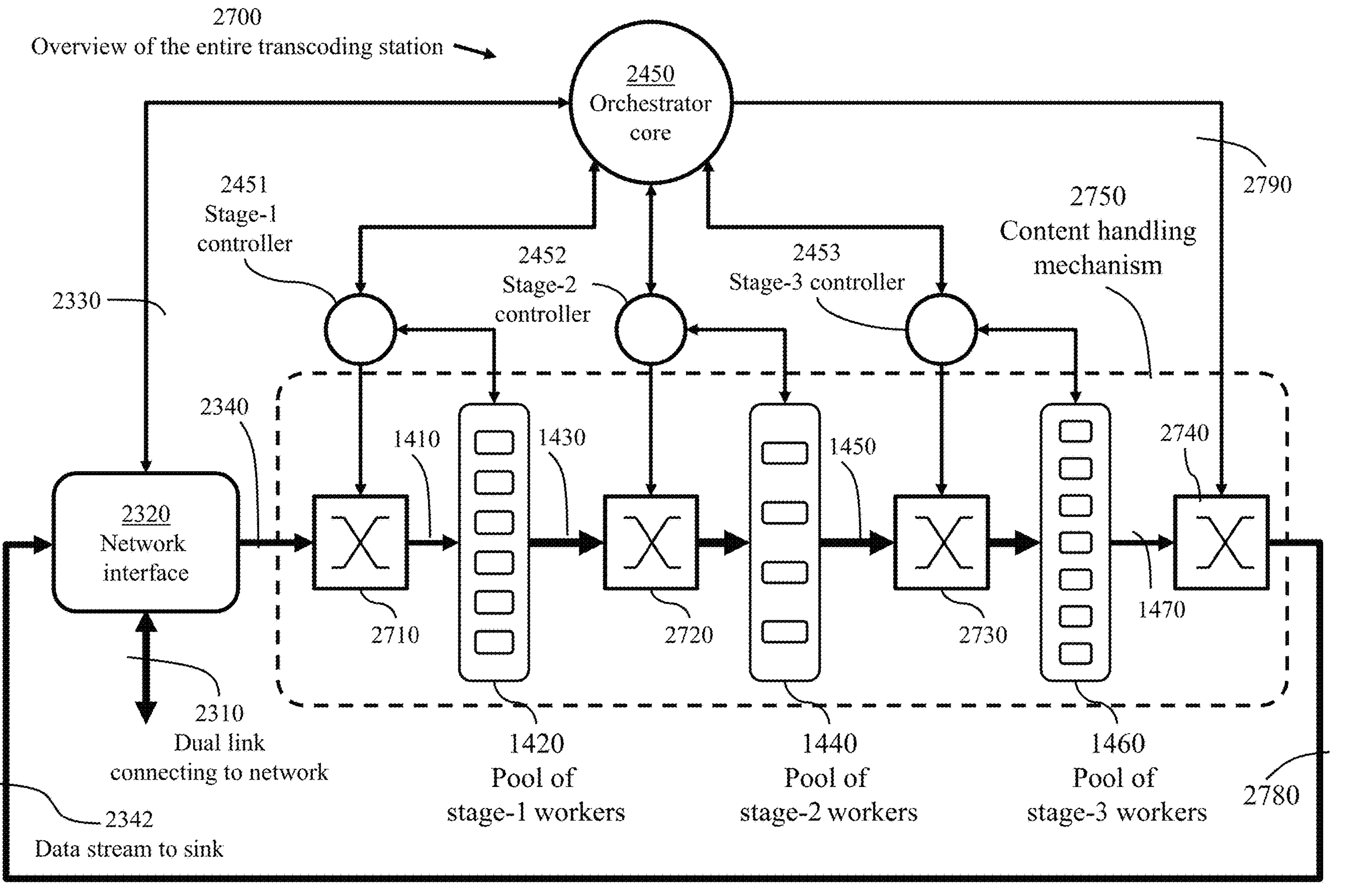
FIG. 27 is an overview of a transcoding station indicating connection of the orchestrator assembly and content-processing assembly, in accordance with an embodiment of the present invention.
Figure 28:
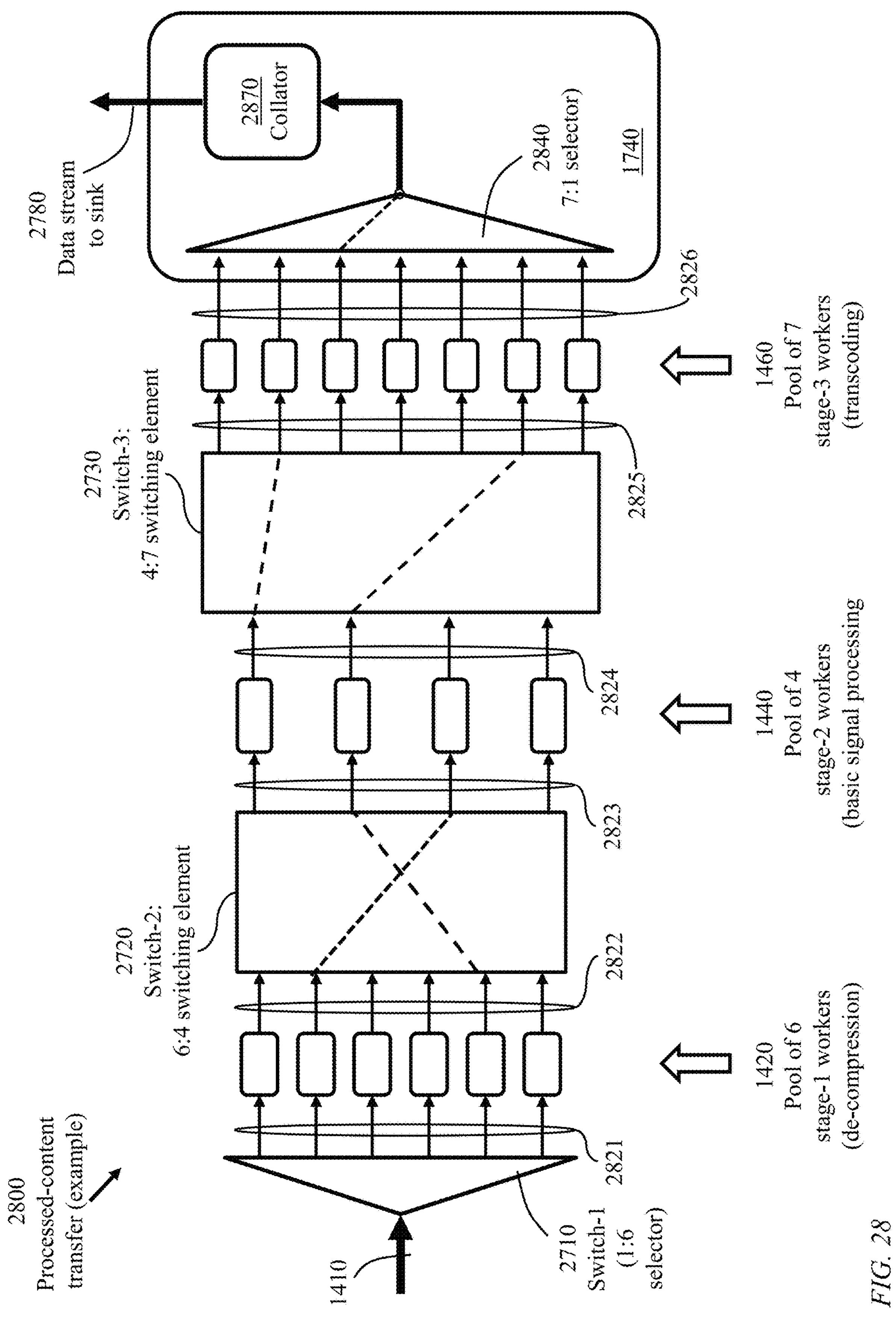
FIG. 28 illustrates a mechanism of content processing within the transcoding station, in accordance with an embodiment of the present invention.

FIG. 27 is an overview 2700 of a transcoding station indicating connection of the orchestrator assembly 2350 and a content-processing assembly 2750. The orchestrator assembly comprises the orchestrator core 2450, stage-1 controller 2451, stage-2 controller 2452, and stage-3 controller 2453. The content-processing assembly comprises:

- a first content-access unit (1710) between the network interface 2420 and a cluster 1420 of stage-1 workers;
- a second content-access unit (1720) between cluster 1420 and a cluster 1440 of stage-2 workers;
- a third content-access unit (1730) between cluster 1440 workers and a cluster 1460 of stage-3 workers; and
- a fourth content-access unit (1740) between cluster 1430 and the network interface 2320, comprising a collator of decoded GOPs (illustrated in FIG. 28).

The first content-access unit directs a stream 1410 of compressed GOPs from a source 240 to a specific stage-1 cluster selected at stage-1 controller 2451. The second content-access unit directs reproduced source raw signal 1430 to a specific stage-2 cluster selected at stage-2 controller 2452. The third content-access unit directs processed reproduced source raw signal to a specific stage-3 cluster 1460 selected at stage-3 controller 2453. The fourth content-access unit, communicatively coupled to the orchestrator core through dual channel 2790, directs compressed transcoded stream 2780 to the network interface 2320 for transmission to at least one client 180.

FIG. 28 illustrates an exemplary implementation 2800 of the content-processing assembly 2750. The selected stage-1 cluster comprises six workers (six decoders). The selected stage-2 cluster comprises four workers (four VPUs). The selected stage-3 cluster comprises seven workers (seven encoders). Content-access units 2710, 2720, and 2730 are implemented as a 1:6 selector, a 6:4 switching unit, and a 4:7 switching unit respectively. Content-access unit 2740 is implemented as a 7:1 selector 2840 and a collator 2870 of decoded GOPs.

Channels 2821 connect output ports of switch-1, implemented as a 1:n selector (n=6, in the illustrated example) to individual stage-1 workers (decoders). Channels 2822 connects individual stage-1 workers to input ports of switch-2 having 6 input ports and 4 output ports. Channels 2823 connects output ports of switch-2 to stage-2 workers (video-processing units, VPUs). Channels 2824 connect stage-2 workers to input ports of switch-3 having 4 input ports and 7 output ports. Channels 2825 connect output ports of switch-3 to stage-3 workers (encoders). Channels 2826 connect stage-3 workers to input ports of switch-4 (implemented as an m:1 selector, m=7, in the illustrated example).

Switch-1, implemented as a 1:6 selector, directs individual GOPs of compressed stream 1410 to respective allocated decoders through channels 2821 as determined at a controller of switch-1 (not illustrated). Switch-2, implemented as a 6:4 switch, directs individual decoded GOPs to respective allocated VPUs through channels 2823 as determined at a controller of switch-2 (not illustrated). Switch-3, implemented as a 4:7 switch, directs individual processed GOPs to respective allocated encoders through channels 2825 as determined at a controller of switch-3 (not illustrated). Switch-4, implemented as a 7:1 selector, directs individual encoded GOPs to the network interface 2320.

In a conventional $m_1$:$m_2$ switch ($m_1$ input ports and $m_2$ output ports), $m_1>1$, $m_2>1$, all of the $m_1$ input ports and all of the m2 output ports may be active simultaneously. However, in the content-processing assembly of FIG. 28, an input port of any switch connecting at input to workers is only activated when a respective worker completes a respective function (decoding in stage-1, signal-processing in stage-2, or encoding in stage-3). With the processing time duration at any of the three stages substantially exceeding the transfer time of a GOP (hence the need for multiple workers for each stage), only a subset of input ports of a switch is activated simultaneously. Accordingly, the switching mechanisms can be simplified, in comparison with a switching mechanism of a conventional switch.

Figure 29:
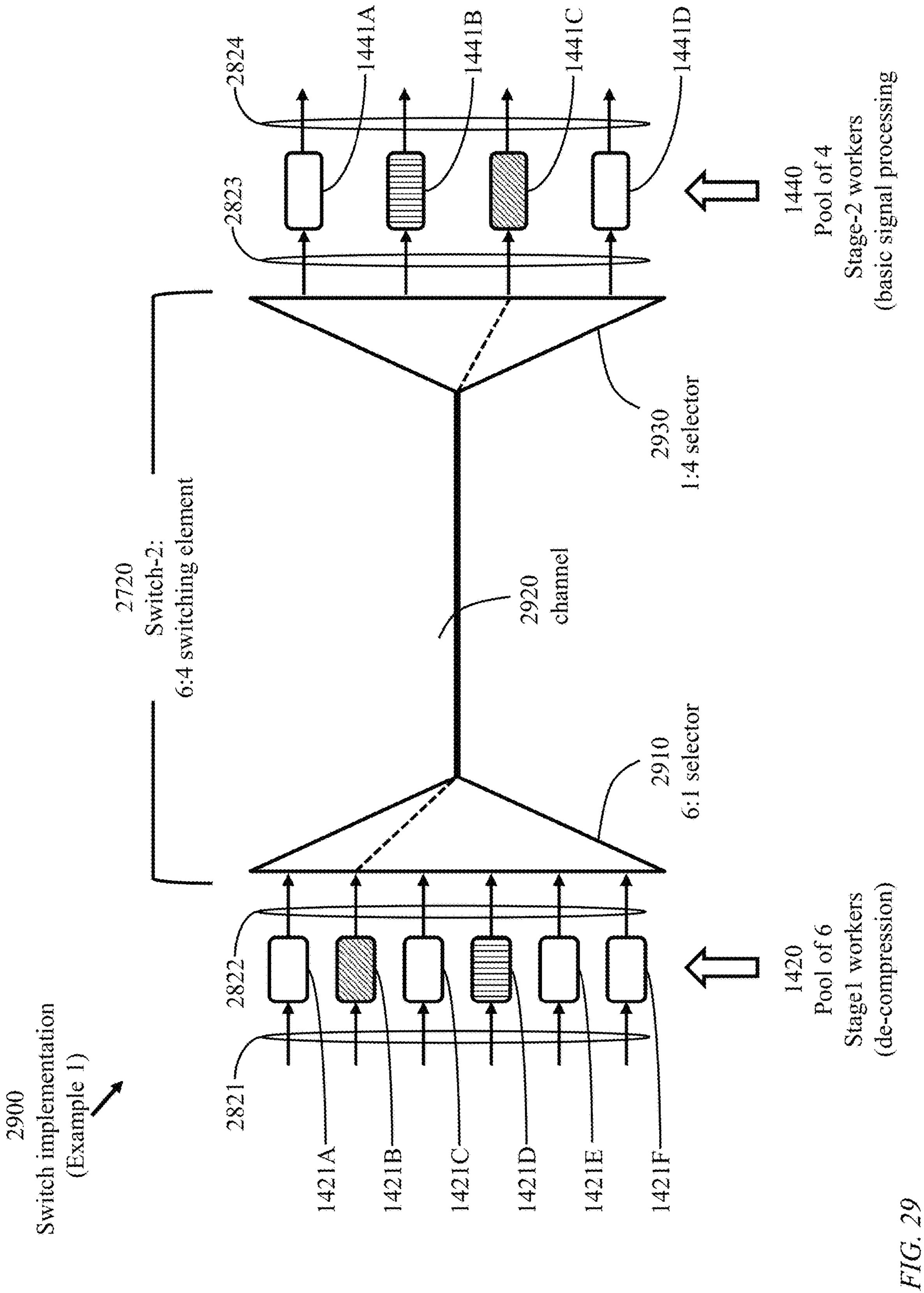
FIG. 29 illustrates a first example of a switching component of the mechanism of FIG. 28, in accordance with an embodiment of the present invention.

FIG. 29 illustrates an implementation 2900 of a 6:4 switch ($m_1$=6, $m_2$=4) comprising a 6:1 selector 2910, a 1:4 selector 2930, and a channel 2920 connecting the output port of selector 2910 to the input port of selector 2930. Only one GOP may be transferred at a time. Thus, an output GOP of a worker of cluster 1420 may be buffered if another GOP is in transit along channel 2920. As mentioned above, the transit time of a processed GOP is typically much smaller than the processing time at a respective worker.

In the illustrated case, when worker 1421B of stage-1 completes decoding a GOP, the decoded GOP is transferred through 6:1 selector 2910 and channel 2920 to 1:4 selector 2930 to stage-2 worker 1441C. Subsequently, when worker 1421D of stage-1 completes decoding another GOP, the decoded GOP is transferred through 6:1 selector 2910 and channel 2920 to 1:4 selector 2930 to stage-2 worker 1441B.

Figure 30:
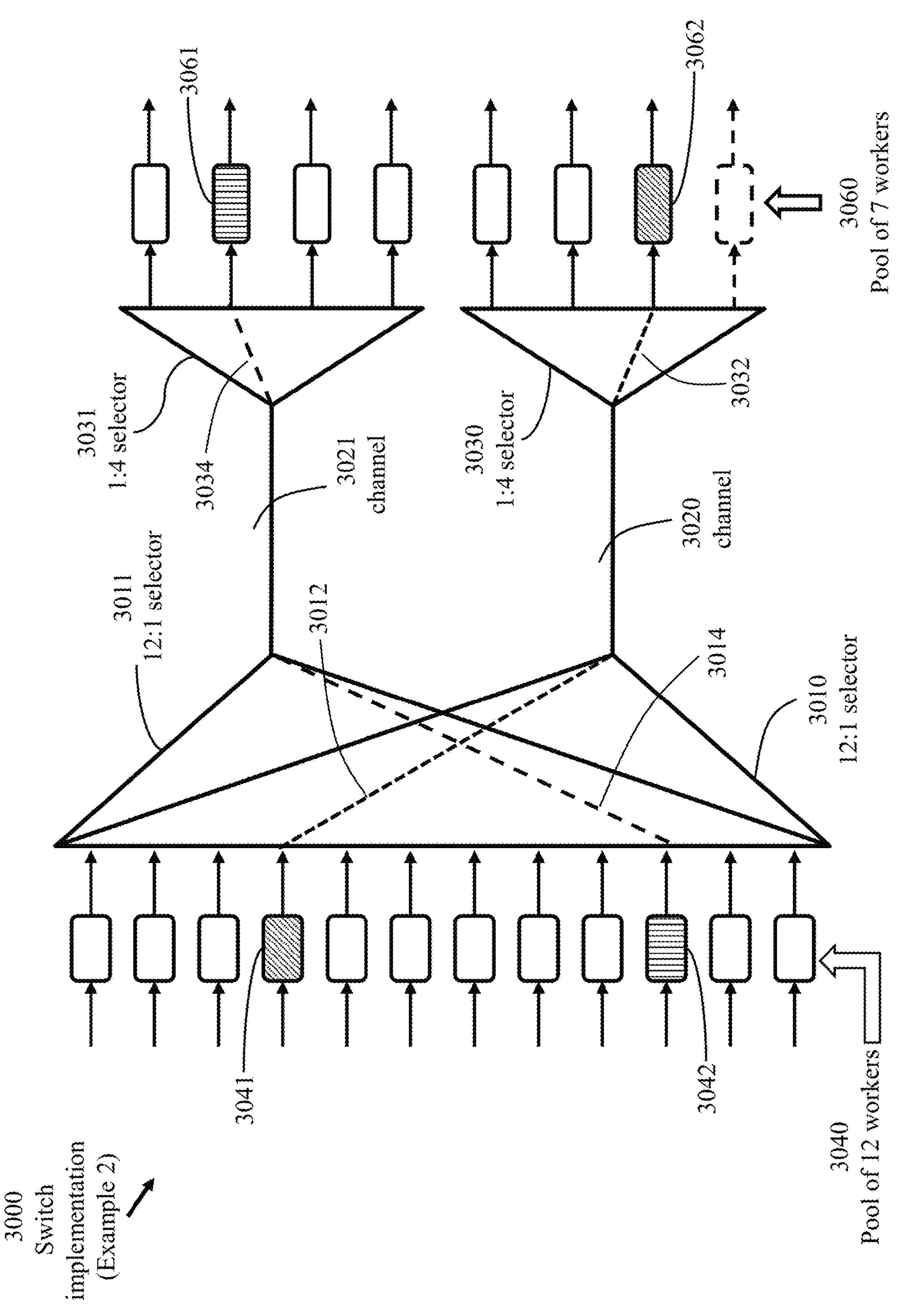
FIG. 30 illustrates a second example of a switching component of the mechanism of FIG. 28, in accordance with an embodiment of the present invention.

FIG. 30 illustrates an implementation 3000 of a 12:8 switch ($m_1$=12, $m_2$=8) comprising a two 12:1 selectors, 3010 and 3011, two 1:4 selectors, 3030 and 3031, a channel 3020 connecting the output port of selector 3010 to the input port of selector 3030, and a channel 3021 connecting the output port of selector 3011 to the input port of selector 3031. Two GOP may be transferred concurrently from cluster 3040 of workers to cluster 3060 of workers.

For example, worker 3041 may transfer respective content data to worker 3062 traversing path 3012 within selector 3010, channel 3020, then path 3032 within selector 3030. Concurrently, worker 3042 may transfer respective content data to worker 3061 traversing path 3014 within selector 3011, channel 3021, then path 3034 within selector 3031.

Figure 31:
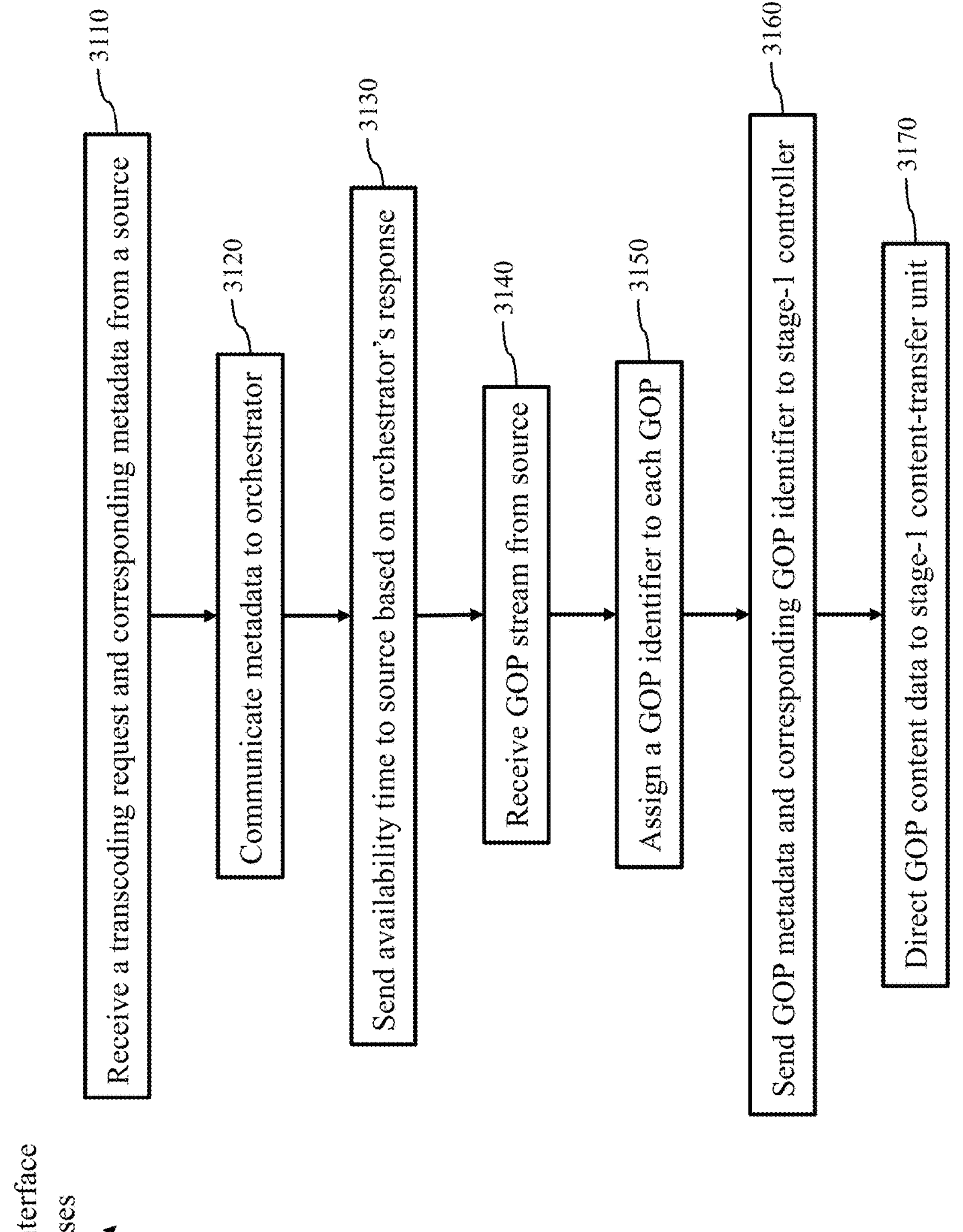
FIG. 31 illustrates processes performed at the network interface of FIG. 24 and FIG. 27, in accordance with an embodiment of the present invention.

FIG. 31 illustrates processes 3100 performed at the network interface 2320. In process 3110, the network-interface receives a transcoding request, and corresponding metadata, for transcoding a specific multimedia stream from a multimedia source 140. The metadata includes information defining the standard according to which the video component of the specific multimedia stream is encoded, the requisite standard to which the transcoded stream is to be encoded, and other relevant characterization of the specific multimedia stream such as the size of a GOP and the video-component frame rate. In process 3120, the network interface communicates the metadata to the orchestrator (1350, FIG. 23, FIG. 24). Upon receiving a response from the orchestrator, the network interface sends information regarding availability time to the multimedia source (process 3130) then receives the multimedia stream from the source (process 3140), assigns a GOP identifier to each GOP, and prefixes GOP identifiers to metadata and contents of respective GOPs (process 3150) to enable tracking processed GOPs which may experience temporal scrambling within the transcoding station due to variation of GOPs' processing times. Preferably, the GOP identifiers are cyclical integers in steps of 1, starting with 0; such as 0 to 127, for example, since the transcoding station would not at any time be handling more than a relatively small number, 16 for example, of most recent GOPs. The network-interface sends the GOPs metadata marked with corresponding GOPs identifiers to stage-1 controller of the orchestrator assembly (process 3160) and sends content data (process 3170), marked with corresponding GOPs identifiers, to content transfer unit 2610, FIG. 26, 2710, FIG. 27.

Figure 32:
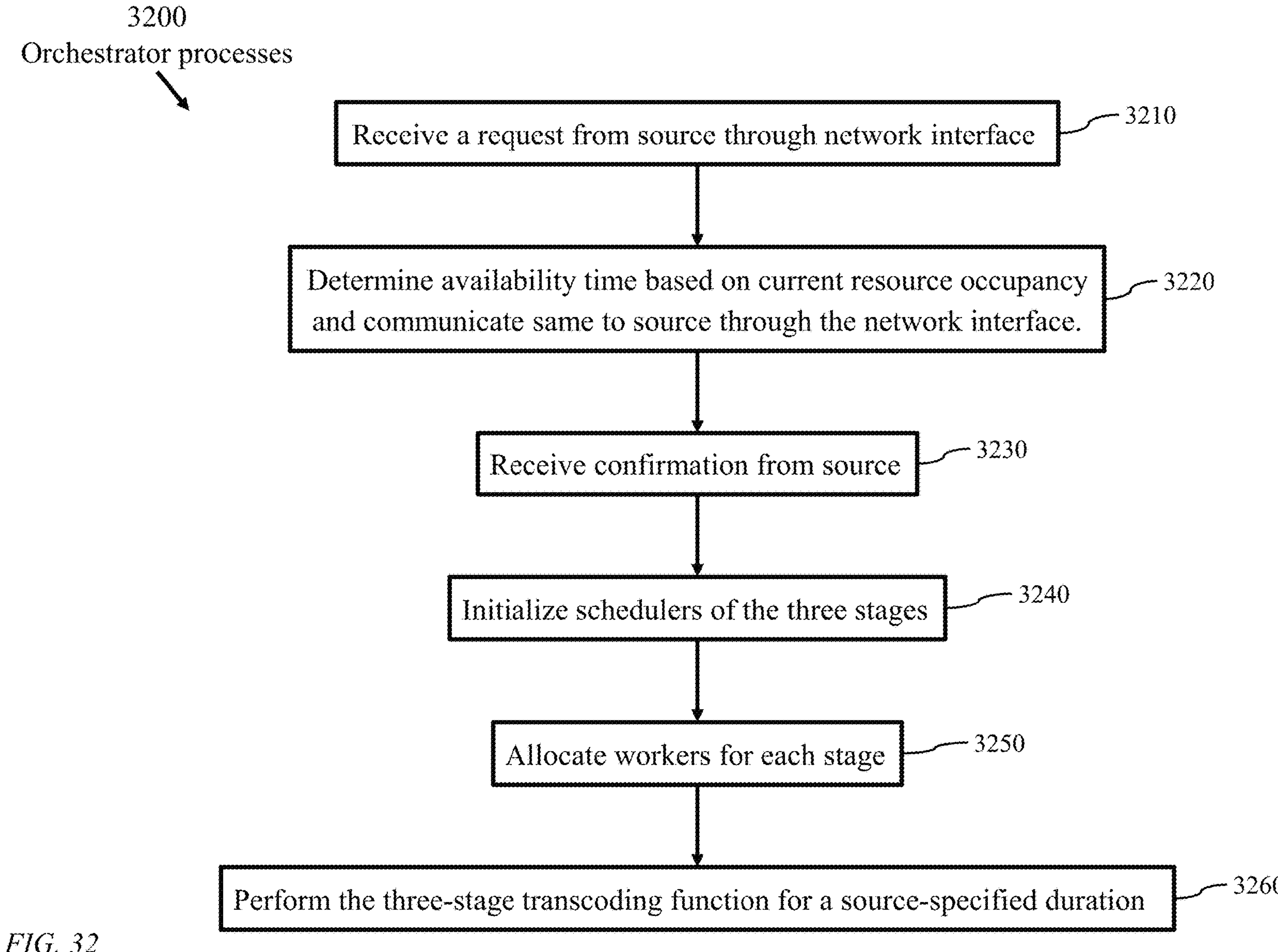
FIG. 32 illustrates processes performed at the orchestrator assembly of FIG. 23 and FIG. 24 to initialize stream-specific transcoding processes, in accordance with an embodiment of the present invention.

FIG. 32 illustrates processes 3200 performed at the orchestrator assembly 2350 (FIG. 23, FIG. 24) to initialize stream-specific transcoding processes. In process 3210, the orchestrator assembly receives a request and respective metadata from the multimedia source, through the interface as illustrated in FIG. 31. The orchestrator core 2450 determines availability time instant based on current resource (workers) occupancy and communicates the availability time instant to the multimedia source through the network interface (process 3220). Upon receiving confirmation from the multimedia source (process 3230), the orchestrator core initializes schedulers of the three stages (process 3240) and allocates workers to each stage based on the metadata (process 3250). The three-stage transcoding functions are then performed for the duration of the multi-media stream (process 3260).

Figure 33:
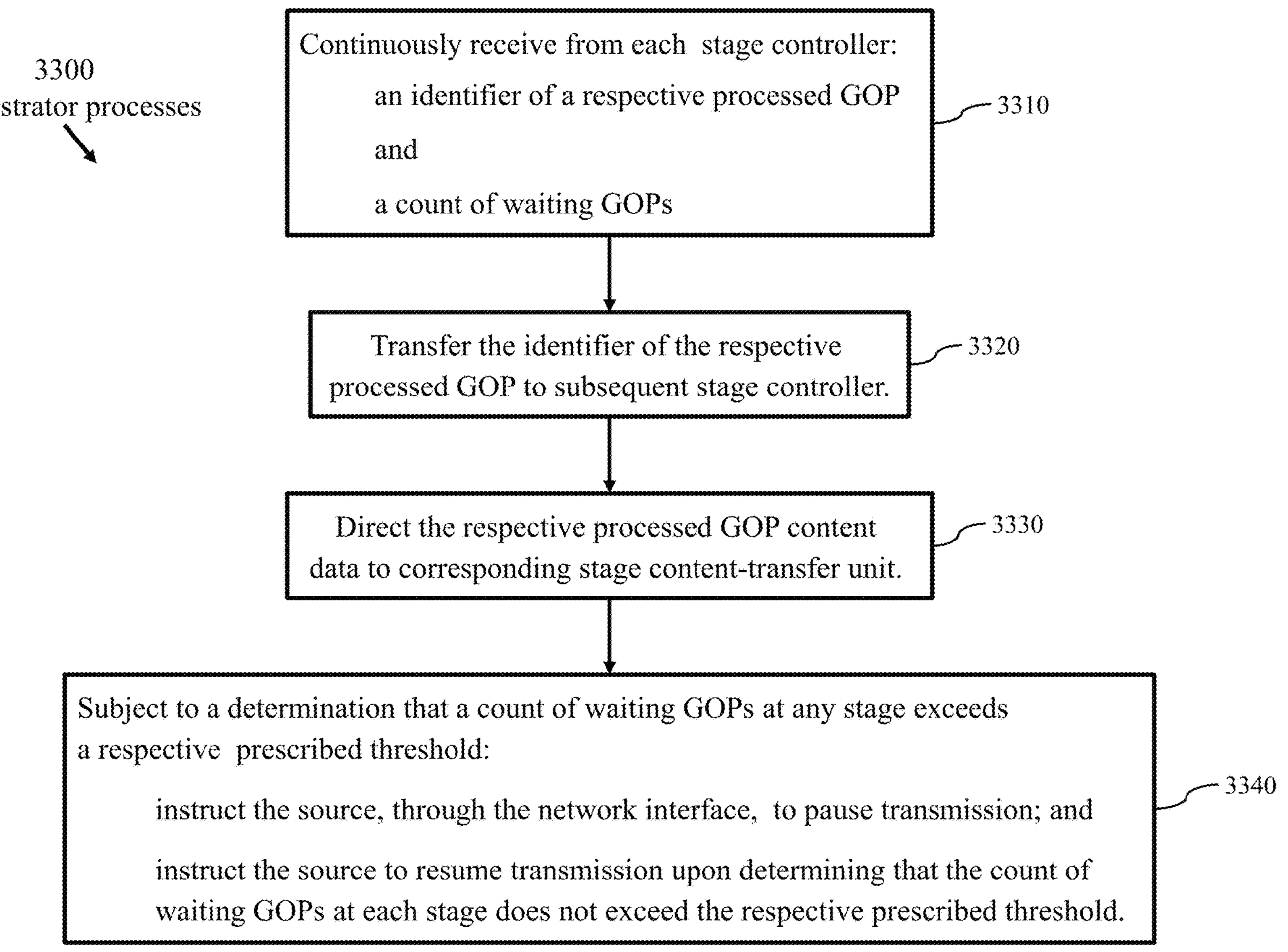
FIG. 33 illustrates processes performed at the orchestrator core of FIG. 24 and FIG. 27, in accordance with an embodiment of the present invention.

FIG. 33 illustrates pipelined processes 3300 performed at the orchestrator assembly 2350. In process 3310, the orchestrator core continuously receives from each stage controller an identifier of a respective processed GOP and a count of waiting GOPs. The stage-1 workers, the stage-2 workers, and the stage-3 workers may concurrently be handling several GOPs and the orchestrator core is made aware of the progress in each of the three stages.

The orchestrator core transfers (process 3320):

an identifier of a decoded GOP in stage 1 to controller 2452 of stage 2;

an identifier of a processed GOP in stage 2 to controller 2453 of stage-3; and an identifier of an encoded GOP in stage-3 to network interface 2320 through control-data path 2330.

The content-transfer assembly concurrently directs (process 3330):

the decoded GOP in stage 1 (output of stage-1 encoders) to designated workers (VPUs) of stage-2;

the processed GOP in stage-3 (output of stage-2 VPUs) to designated encoders of stage-3; and the encoded GOP in stage-3 to network-interface 2320 through content-data path 2780 (FIG. 27).

Subject to a determination that a count of waiting GOPs at any stage exceeds a respective predetermined threshold (permissible level), the orchestrator core instructs (process 3340) the multimedia source to pause transmission of the multimedia stream to be resumed when the count of waiting GOPs is below the threshold. Thus, if the waiting GOPs in any of stage-1, stage-2, or stage-3 exceeding a respective permissible level, the source pauses transmission. Determination of the permissible levels takes into account the two-way transfer delay between the transcoding station and the multimedia source. In a network 120 configured to handle high-quality streaming services, the dual transfer delay would be a small fraction of a second between any two points on the planet. The duration of a typical GOP is of the order of one second; thus, even repetitive pausing and resuming transmission from the multi-media source would still allow smooth operation of the transcoding processes.

Figure 34:
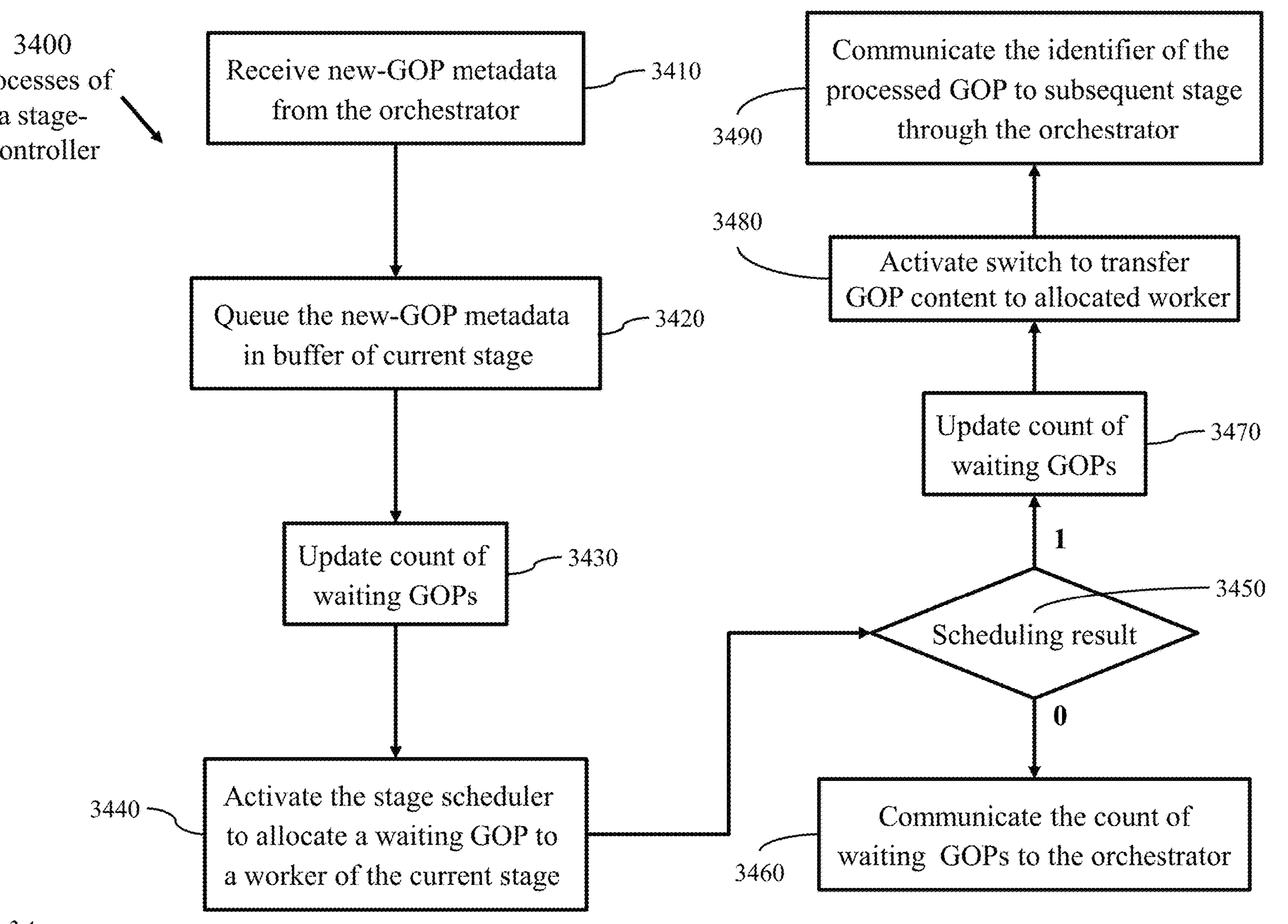
FIG. 34 illustrates processes performed at a stage controller, in accordance with an embodiment of the present invention.

FIG. 34 illustrates processes 3400 performed at a stage-controller 2500 (2451, 2452, or 2453) according to a first scheme of worker allocation. Upon receiving (process 3410) metadata of a new-GOP from the orchestrator core, a stage-orchestrator interface 2540 causes processor 2560 to queue the new-GOP metadata in buffer 2520 (process 3420) and update a count of waiting GOPs (process 3430). The stage scheduler 2570 is activated to cause processor 2560 to allocate a worker of the stage to a selected waiting GOP (process 3440). The stage scheduler 2570 returns a state 0 if an appropriate worker is not available or a state "1" together with an identifier of an allocated worker (process 3450). If an appropriate worker is not available, stage-orchestrator interface 2540 communicates (process 3460) the count of waiting GOPs to the orchestrator core 2450. Otherwise, the count of waiting GOPs is reduced (process 3470), the content of the selected waiting GOP is transferred to the allocated worker through a content-transfer path (process 3480), and an identifier of the selected GOP is communicated to the subsequent stage.

As illustrated in FIG. 15, the transcoding station employs $\mu_1$ distinct clusters of decoding workers, $\mu_2$ distinct clusters of signal-processing workers, and $\mu_3$ distinct clusters of encoders, $\mu_1 \geq 1$, $\mu_2 \geq 1$, $\mu_3 \geq 1$. Each cluster of workers is specific to a stage and a worker type. The workers of stage-1, for example, may comprise a number of worker-clusters each for decoding a received compressed stream formed according to a specific standard (such as H.264, H.265, etc.). A scheduler 2570 is dedicated to a specific worker-type of a specific stage. According to the first scheme of stage-specific worker allocation, a cluster-specific number of workers of a same type is reserved for each cluster.

Identifiers of the workers of a cluster are placed in a circular buffer in any order at entries indexed as 0 to $(\nu-1)$, $\nu$ being a provisioned number of same-type workers of a cluster, $\nu>1$. With W(j), $0 \leq j < \nu$, denoting a worker's identifier placed in entry j, an initial selection of W(j) is selected to equal j. A first index, denoted $index_1$, points to an entry in the circular buffer holding an identifier of an available worker. A second index, denoted $Index_2$, points to an entry in the circular buffer in which an identifier of a worker, of the cluster of workers, that has just completed a task relevant to a respective GOP is to be written. An integer $\beta$ denotes a number of workers of the provisioned workers that are occupied at a given instant of time; $0 \leq \beta \leq \nu$. Each of $Index_1$, $Index_2$, and $\beta$ is initialized as integer zero.

Figure 35:
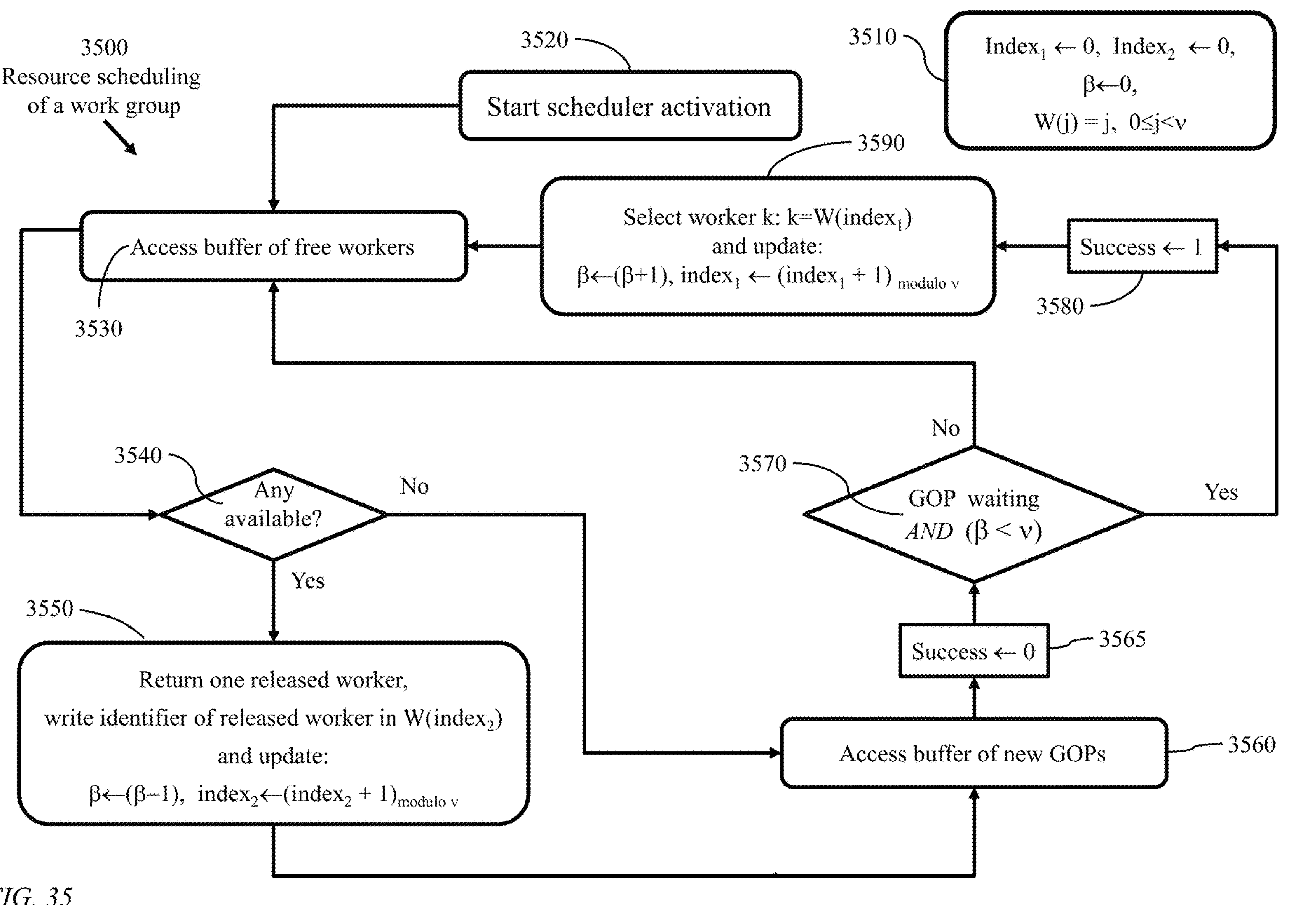
FIG. 35 illustrates a first scheme of stage-specific worker allocation, in accordance with an embodiment of the present invention.

FIG. 35 illustrates processes 3500 performed at a stage scheduler 2570 according to the first scheme of stage-specific worker allocation. Process 3510 initializes each of $Index_1$, $index_2$, and $\beta$ to equal integer 0, setting W(j) to equal j, for $0 \leq j < \nu$. Process 3520 starts executing the processes of allocating a worker, from the cluster of workers, to process a GOP of an identifier queued in buffer 2520, if any. In process 3530, processer 2560 accesses buffer 2530 storing indices of released workers. If process 3540 determines that buffer 2530 is empty, process 3560 is activated. If process 3540 determines that a released worker is found, process 3550 is activated to return the released worker where an identifier of the released worker is written in entry $Index_2$ of the circular buffer, the number $\beta$ of occupied workers is reduced to $(\beta-1)$, and $index_2$ is updated to $(index_2+1)|_\nu$ (X modulo Y, where X and Y are positive integers is conventionally denoted $X|_Y$). Buffer 2520 holding identifiers of GOPs to be processed is then accessed to read an identifier of a waiting GOP (process 3560).

Process 3565 initializes as zero an indication of successful allocation of a worker to a waiting GOP. In process 3570 if buffer 2520 is found to be empty or the number of occupied workers has already reached the maximum value $\nu$, process 3530 is revisited. Otherwise, If process 3570 determines that there is a waiting GOP and the number of occupied workers is less than $\nu$, process 3580 declares that a worker is allocated to the waiting GOP and process 3590 selects worker $W(index_1)$, increases the number $\beta$ of occupied workers to $(\beta+1)$, and updates $index_1$ to $(index_1+1)|_\nu$.

Figure 36:
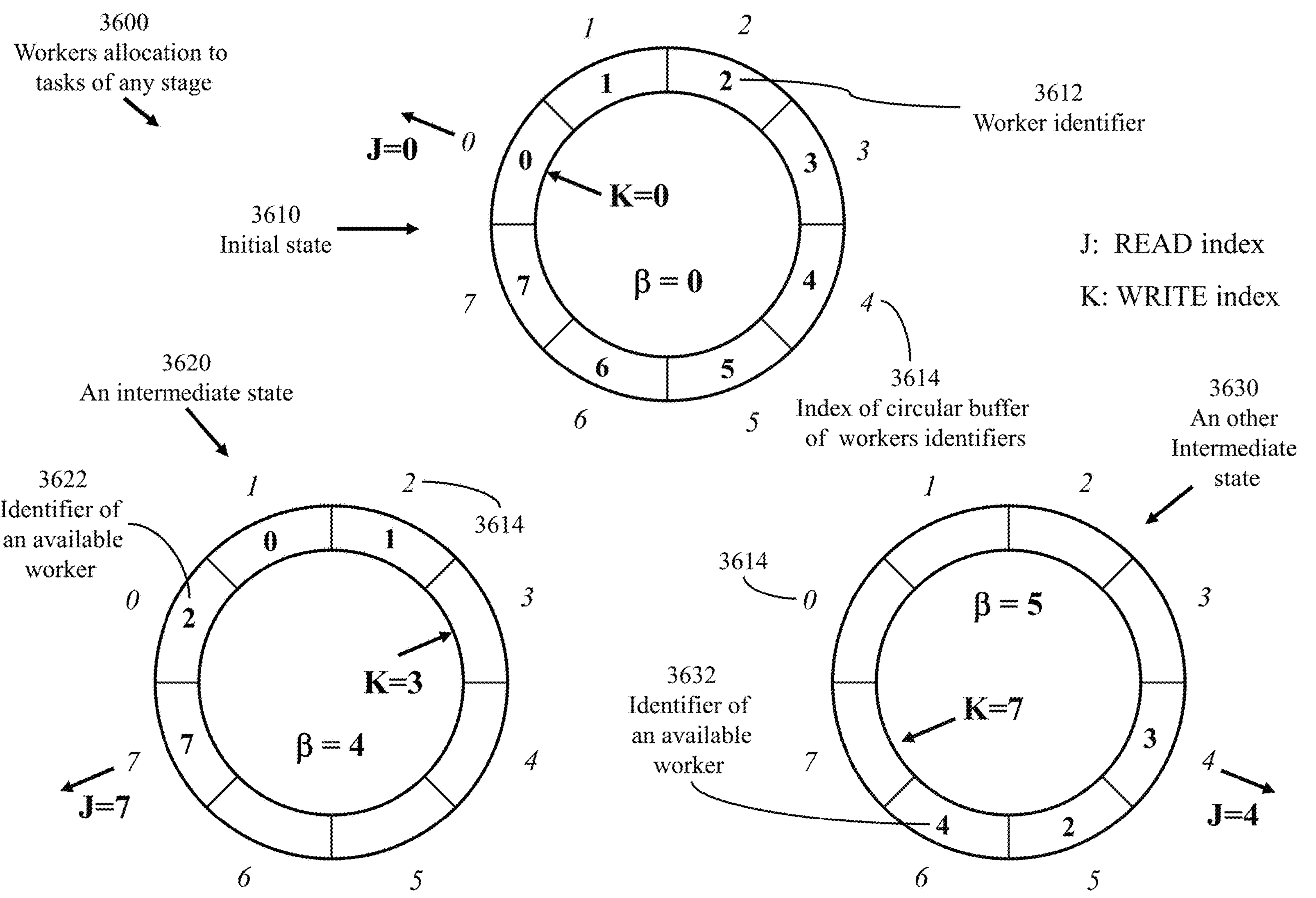
FIG. 36 illustrates a process of worker selection implemented according to the first scheme of stage-specific worker allocation of FIG. 35, in accordance with an embodiment of the present invention.

FIG. 36 illustrates an example 3600 of worker selection implemented according to the first scheme of stage-specific worker allocation for a case of $\nu=8$. The initial state 3610 of a circular buffer holding worker identifiers 0 to 7 is illustrated with $\beta=0$, and $Index_1=index_2=0$, and worker indices (reference 3612) set as W(j)=j, 0≤j<8, j being the index 3614 of the circular buffer. At an intermediate state 3620 of the circular buffer, following handling several GOPs, $Index_1$=7, $index_2$=3, β=4, and the order of available workers becomes scrambled, due to varying GOPs' processing durations; for example, worker identifier 3622 at index 0 is now 2 instead of 0 (W(0)=2). At a further intermediate state 3630 of the circular buffer, $Index_1$=4, $index_2$=7, β=5, and the order of available workers is scrambled; worker identifier 3632 at index 6 is 4 (W(6)=4), for example.

Figure 37:
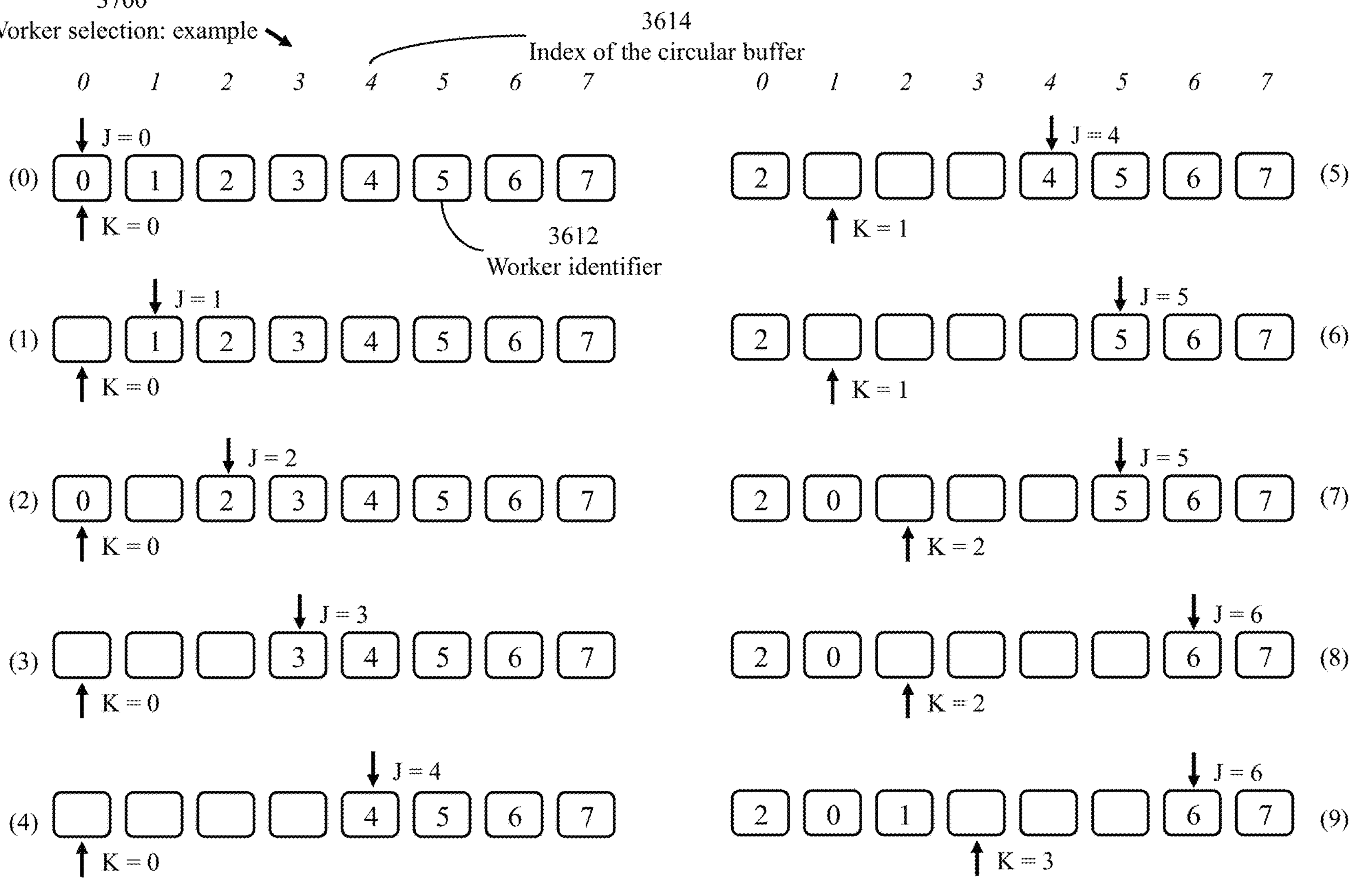
FIG. 37 is a walkthrough of the process of FIG. 36.
Figure 38:
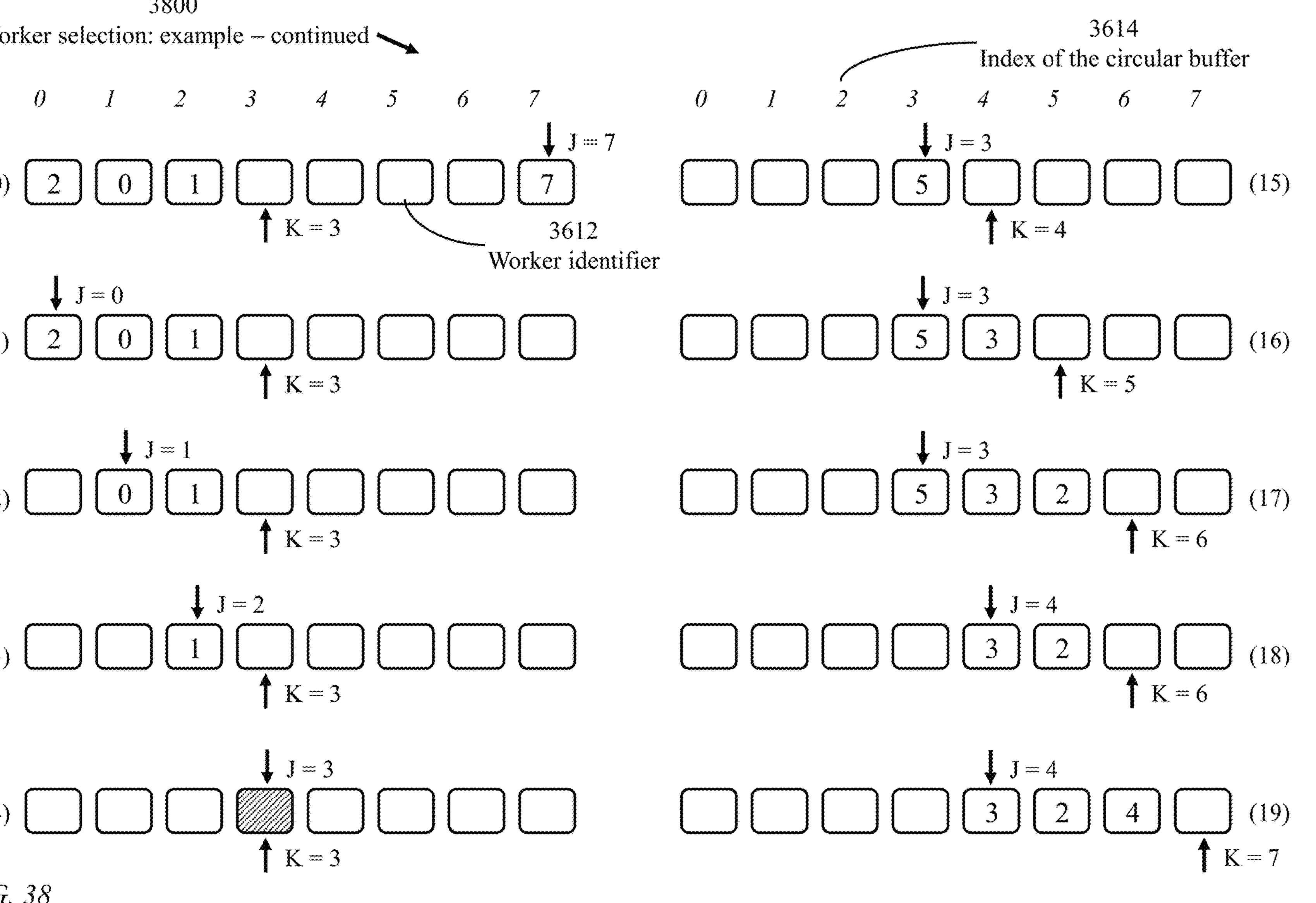
FIG. 38 is a continuation of FIG. 37.

FIG. 37 is a walkthrough 3700 of the process of FIG. 36, illustrating steps of workers selection. FIG. 38 is a continuation 3800 of FIG. 37. The states of the circular buffer are identified sequentially; states (0) to (19) are illustrated.

In state (0), J=0, K=0, β=0, and W(j)=j. 0≤j<8.

In state (1), worker 0 is allocated to a GOP, J=1, K=0, β=1, and W(0)=null.

In state (2), worker 1 is allocated to another GOP, J=2, K=0, β=2, and W(j)=null, j=0, 1.

In state (3), worker 2 is allocated to another GOP, J=3, K=0, β=3, and W(j)=null, 0≤j<3.

In state (4), worker 3 is allocated to another GOP, J=4, K=0, β=4, and W(j)=null, 0≤j<4.

In state (5), worker 2 is released and placed in entry K=0, and K is increased to 1, hence J=4, K=1, β=3, and W(j)=null, 1≤j<4.

In state (6), worker 4 is allocated to a new GOP, J=5, K=1, β=4, and W(j)=null, 1≤j<5.

In state (7), worker 0 is released and placed in entry K=1, and K is increased to 2, hence J=5, K=2, β=3, and W(j)=null, 2≤j<5.

In state (8), worker 5 is allocated to a new GOP, J=6, K=2, β=4, and W(j)=null, 2≤j<6.

In state (9), worker 1 is released and placed in entry K=2, and K is increased to 3, hence J=6, K=3, β=3, and W(j)=null, 3≤j<6.

In state (10), worker 6 is allocated to a new GOP, J=7, K=3, β=4, and W(j)=null, 3≤j<7.

In state (11), worker 7 is allocated to a new GOP, $J=8|_8=0$, K=3, β=5, and W(j)=null, 3≤j<8.

In state (12), worker 2 is allocated to a new GOP, J=1, K=3, β=6, and W(j)=null, 3≤j<8, and j=0.

In state (13), worker 0 is allocated to a new GOP, J=2, K=3, β=7, and W(j)=null, 3≤j<8, and j=0, 1.

In state (14), worker 1 is allocated to a new GOP, J=3, K=3, β=8, and W(j)=null, 3≤j<8, and j=0, 1, 2. J=K when all workers of the cluster are free (as initialized in state 0) or all workers of the cluster are occupied (state 14 in this example).

In state (15), worker 5 is released and placed in entry K=3, and K is increased to 4, hence J=3, K=4, β=7, and W(j)=null, 4≤j<8, and j=0, 1, 3.

In state (16), worker 3 is released and placed in entry K=4, and K is increased to 5, hence J=3, K=5, β=6, and W(j)=null, 5≤j<8, and j=0, 1, 3.

In state (17), worker 2 is released and placed in entry K=5, and K is increased to 6, hence J=3, K=6, β=5, and W(j)=null, j=6,7, and j=0, 1, 3.

In state (18), worker 5 is allocated to a new GOP, J=4, K=6, β=6, and W(j)=null, j=6, 7, and 0≤j<4.

In state (19), worker 4 is released and placed in entry K=6, and K is increased to 7, hence J=4, K=7, β=5, and W(j)=null, j=7, and 0≤j<4.

FIG. 39 illustrates workers organization 3900 into multiple task-specific worker bands 3900, for any of the three stages. For the illustrated case, four task types, labeled task-type-0, to task-type-3, are applicable for a specific stage and workers configured to perform each task-type are sorted into a respective number of bands (four bands for task-type-0, five bands for task-type-1, four bands for task-type-2, and six bands for task-type-3. The first allocation scheme of FIG. 35 is applied to a set of bands comprising a relevant band for each task type. The number of workers per band may vary significantly; for example, band-0 of task-type-2 contains 5 workers (reference 3910) while band-3 of task-type-3 contains 11 workers.

As illustrated in FIGS. 14, 15, 23, 24, and 27, the transcoding station 160 comprises a network interface 2320, a pool of decoders 1420, a pool of signal-adaptors 1440, a pool of encoders 1460, an orchestrator assembly 2350, and a content-processing assembly 2370, 2750.

The network interface is configured to receive, from a multimedia source 140, a transcoding request and a multimedia stream comprising a video stream 1900 organized into source groups-of-pictures (GOPs). The transcoding request indicates a first standard according to which the multimedia stream is formed and a second standard according to which an output decoded stream is to be formed.

The pool of decoders is configured to concurrently decode different GOPs, according to the first standard, to produce respective decoded GOPs. The pool of signal-adaptors is configured to concurrently process different decoded GOPs to produce respective adapted GOPs. The pool of encoders is configured to concurrently encode different adapted GOPs to produce respective encoded GOPs according to the second standard;

The orchestrator assembly 2350 is configured to assign each source GOP to an available decoder, each decoded GOP to an available signal adaptor, and each adapted GOP to an available encoder. The content-processing assembly 2750 is configured to provide each source GOP access to an available decoder, each decoded GOP access to an available signal adaptor, and each adapted GOP access to an available encoder. An output-collating module, coupled to the network interface, is configured to arrange successive encoded GOPs in the order of corresponding source GOPs.

Each decoder of the pool of decoders, each signal adaptor of the pool of signal adaptors, and each encoder of the pool of encoders comprises a respective hardware processor coupled to a memory device storing software instructions, and a buffer holding intermediate data.

The orchestrator assembly 2350 is further configured to determine, in response to the transcoding request, availability time based on current occupancy of the pool of decoders, the pool of signal adaptors, and the pool of encoders. The orchestrator assembly 2350 communicates the availability time to the multimedia source 140 through the network interface 2320.

The orchestrator assembly 2350 is further configured to track counts of source GOPs, decoded GOPs, and adapted GOPs waiting for assignment to respective decoders, signal-adaptors, and encoders, respectively. If any of the counts exceeds a respective prescribed threshold, the orchestrator assembly instructs the multimedia source 140, through the network interface 2320, to pause transmission of the multimedia stream. When none of the counts exceeds a corresponding prescribed threshold while transmission of the multimedia stream is paused, the orchestrator assembly instructs the multimedia source, through the network interface, to resume transmission of the multimedia stream.

The content-processing assembly 2750 comprises a first content-access unit 2710 coupled to the network interface 2320 and the pool of decoders 1420, a second content-access unit 2720 coupled to the pool of decoders 1420 and the pool of signal-adaptors 1440, a third content-access unit 2730 coupled to the pool of signal-adaptors 1440 and the pool of encoders 1460, and a fourth content-access unit 2740, comprising a collating module, coupled to the pool of encoders 1460 and the network interface 2320.

The orchestrator assembly comprises an orchestrator core 2450 coupled to three controllers. A first controller 2451 is coupled to the first content-access unit 2710 and the pool of decoders 1420. A second controller 2452 is coupled to the second-content-access unit 2720 and the pool of signal adaptors 1440. A third controller 2453 is coupled to the third content-access unit 2730 and the pool of encoders 1460.

The network interface is further configured to affix a GOP identifier 2020, 2120, 2220, to each source GOP of the multimedia stream and communicate the source GOP identifiers and corresponding metadata to the orchestrator assembly 2350 and to the content-processing assembly 2750.

The first controller 2451 is configured to queue an identifier of each source GOP and, upon locating an available decoder, instruct the content-processing assembly to process content of a queued source GOP. The second controller 2452 is configured to queue an identifier of each decoded GOP and, upon locating an available signal adaptor, instruct the content-processing assembly to process content of a queued decoded GOP. The third controller 2453 is configured to queue an identifier of each adapted GOP and, upon locating an available decoder, instruct the content-processing assembly to process content of a queued adapted GOP.

According to an implementation, the pool of decoders 1420 comprises a first number, $\mu_1$, $\mu_1 \geq 1$, of clusters 1560 of respective distinct decoders. The pool of signal-adaptors 1440 comprises a second number, $\mu_2$, $\mu_2 \geq 1$, of clusters 1570 of respective distinct signal-adaptors. The pool of encoders 1460 comprises a third number, $\mu_3$, $\mu_3 - 1$, of clusters 1580 of respective distinct encoders.

Based on information within the transcoding request, an available decoder is selected from a compatible cluster 1560 of the first number of clusters, an available signal-adaptor is selected from a compatible cluster 1570 of the second number of clusters, and an available encoder is selected from a compatible cluster 1580 of the third number of clusters.

The disclosed method of multimedia transcoding comprises receiving, at a network interface 2320, from a multimedia source 240, a transcoding request and a multimedia stream. A hardware orchestrator 2350 assembly and a content-processing assembly 2750 perform requisite transcoding processes of the multimedia stream.

The multimedia stream comprises a video stream 1900 organized into source groups-of-pictures (GOPs) and corresponding metadata. The transcoding request indicates a first standard according to which the multimedia stream is formed and a second standard according to which an encoded stream is to be formed.

Multiple decoding workers 1420 of the pool of decoding workers are activated concurrently to decode different source GOPs, according to the first standard, to produce respective decoded GOPs;

Multiple signal-adaptation workers 1440, of a pool of signal-adaptation workers, are activated concurrently to process different decoded GOPs of the respective decoded GOPs to produce respective adapted GOPs.

Multiple encoding workers 1460, of a pool of encoding workers, are activated concurrently to encode different adapted GOPs of the respective adapted GOPs to produce respective encoded GOPs according to the second standard.

The network interface affixes a GOP identifier 2020, 2120, 2220 to each source GOP of the multimedia stream; and communicates the GOP identifiers to the orchestrator assembly and to the content-processing assembly.

The method segments the pool of decoding workers 1420 into a first number, $\mu_1$, $\mu_1 \geq 1$, of distinct clusters 1560 of decoding workers, the pool of signal-adaptation workers 1440 into a second number, $\mu_2$, $\mu_2 \geq 1$, of distinct clusters 1570 of signal-adaptation workers; and the pool of encoding workers 1460 into a third number, $\mu_3$, $\mu_3 \geq 1$, of distinct clusters 1580 of encoding workers. Based on information within the transcoding request, the orchestrator assembly 2350 selects the multiple decoding workers from a respective cluster 1560 of decoding workers, selects the multiple signal-adaptation workers from a respective cluster 1570 of signal-adaptation workers, and selects the multiple encoding workers from a respective cluster 1580 of encoding workers.

The orchestrator assembly continually tracks a first count of GOPs waiting for processing at the respective cluster of decoding workers, a second count of decoded GOPs waiting for processing at the respective cluster of signal-adaptation workers, and a third count of adapted GOPs waiting for processing at the cluster of encoding workers.

If any of the first count, second count, or third count exceeds a respective prescribed threshold, the orchestrator assembly instructs the multimedia source 140, through the network interface 2320, to pause transmission of the multimedia stream.

If none of the first count, second count, and third count exceeds a corresponding prescribed threshold while transmission of the multimedia stream is paused, the orchestrator assembly instructs the multimedia source, through the network interface, to resume transmission of the multimedia stream.

The orchestrator assembly arranges successive encoded GOPs, of the respective encoded GOPs, according to an order of corresponding source GOPs of the multimedia stream.

In an alternate view, with a focus on selected clusters of resources applicable to a specific stream, the orchestrator assembly 2350 is coupled to a cluster 1560 of $N_1$ decoders, $N_1 \geq 1$, a cluster 1570 of $N_2$ signal adaptors, $N_2 \geq 1$, and a cluster 1580 of $N_3$ encoders, $N_3 \geq 1$ (FIG. 6, FIG. 7, FIG. 18).

A 1:$N_1$ selector 2710 is configured to distribute contents of successive source GOPs to orchestrator-selected decoders to produce respective decoded GOPs. An $N_1$:$N_2$ switching element 2720 is configured to distribute the respective decoded GOPs to orchestrator-selected signal adaptors to produce respective adapted GOPs. An $N_2$:$N_3$ switching element 2730 is configured to distribute the respective adapted GOPs to orchestrator-selected encoders to produce respective encoded GOPs. An $N_3$:1 selector 2740 coupled to a collating module is configured to collate the respective encoded GOPs to form a contiguous transcoded video stream.

Each decoder is compatible with a first standard, indicated in the transcoding request, according to which the multimedia stream is formed. Each encoder is configured to encode an output of any signal adaptor according to a second standard specified in the transcoding request.

The orchestrator assembly 2350 is configured to track a first count of source GOPs waiting for decoding at the cluster of $N_1$ decoders, a second count of decoded GOPs waiting for signal adaptation at the cluster of $N_2$ signal adaptors, and a third count of adapted GOPs waiting for decoding at the cluster of $N_3$ encoders.

If any of the first count, the second count, or the third count exceeds a respective prescribed threshold, the orchestrator assembly 2350 instructs the multimedia source 140 to halt transmission of the multimedia stream. If none of the first count, the second count, and the third count exceeds the prescribed threshold while transmission of the multimedia stream is halted, the orchestrator assembly instructs the multimedia source 140 to resume transmission of the multimedia stream.

The cluster of $N_1$ decoders is selected from a plurality of decoders based on the first standard and detailed characterization of content of the multimedia stream indicated in the metadata. The cluster of $N_2$ signal adaptors is selected from a plurality of signal adaptors based on requisite signal-adaptation processes indicated in the metadata. The cluster of $N_3$ encoders is selected from a plurality of encoders based on the second standard. Each of the $N_1$ decoders, $N_2$ signal adaptors, and $N_3$ encoders comprises a respective hardware processor coupled to a memory device storing software instructions, and a buffer holding intermediate data.

Thus, the disclosed technique of high-speed transcoding enables transcoding at a much higher speed in comparison with conventional techniques and eliminates the need to download and locally store the multimedia file to be transcoded, the produced transcoded file, or intermediary format. Any transient media format is streamed from one stage of transcoding to another in a continuous way, reducing the amount of RAM memory used as opposed to storing complete intermediate media before passing them on to the next stage.

It is noted that the methods described above adapt to GOPs of unequal durations, sizes, or numbers of frames per GOP within the same media.

Heterogenous Multifunctional Resources

FIG. 40 illustrates an example 4000 of heterogenous resources of a large-scale transcoding station where workers of any stage comprise a mixture of uni-functional and multi-functional workers with the multifunctional workers comprising uni-tasking worker and multitasking workers. A uni-functional worker performs a single task. A multi-functional worker is configured to perform more than one task. A multi-functional worker may be uni-tasking, capable to perform only one task at a time, or multi-tasking, capable to perform more than one task concurrently. In the illustrated example, the total number of tasks that a specific stage (decoding, signal processing, or encoding) may perform is eight, with the tasks individually identified as 0 to 7.

An identifier of a uni-functional worker has a leftmost digit of "0" and a following binary number 4010 indicating an index of a task. An identifier of a multi-functional worker has a leftmost digit of "1", a following binary number 4020 indicating the maximum number of concurrent tasks, then a string 4030 of eight binary digits identifying tasks that a respective worker where a digit "1" in position p, $0 \le p < 8$, indicates that a respective worker is configured to perform task p. In the case of a multifunctional uni-tasking worker, the binary number 4020 is "001" indicating that any of the tasks identified in the position-identified tasks of string 4030 may be performed one at a time.

In the case of a multifunctional multitasking worker, the binary number 4020, which exceeds "001", is the maximum number of tasks, selected from the tasks identified in the position-identified tasks of string 4030, that may be performed concurrently. A binary number 4020 of "000" indicates that all of the position-identified tasks in string 4030 may be performed concurrently. For example:

- an identifier 4020A "1.001.01001100" refers to a multi-functional uni-tasking worker configured to perform any of the position-identified tasks in string "01001100", which are the three tasks of indices 1, 4, and 5;
- an identifier 4020B "1.000.01000100" refers to a multi-functional worker configured to concurrently perform all of the position-identified tasks in string "01000100", which are the two tasks of indices 1 and 5;
- an identifier 4020C "1.010.00011100" refers to a multi-functional worker configured to concurrently perform any two tasks of the position-identified tasks in string "00011100", which are the three tasks of indices 3, 4, and 5; and
- an identifier 4020D "1.100.01110011" refers to a multi-functional worker configured to concurrently perform any four tasks of the position-identified tasks in string "01110011", which are the five tasks of indices 1, 2, 3, 6, and 7.

Figure 41:
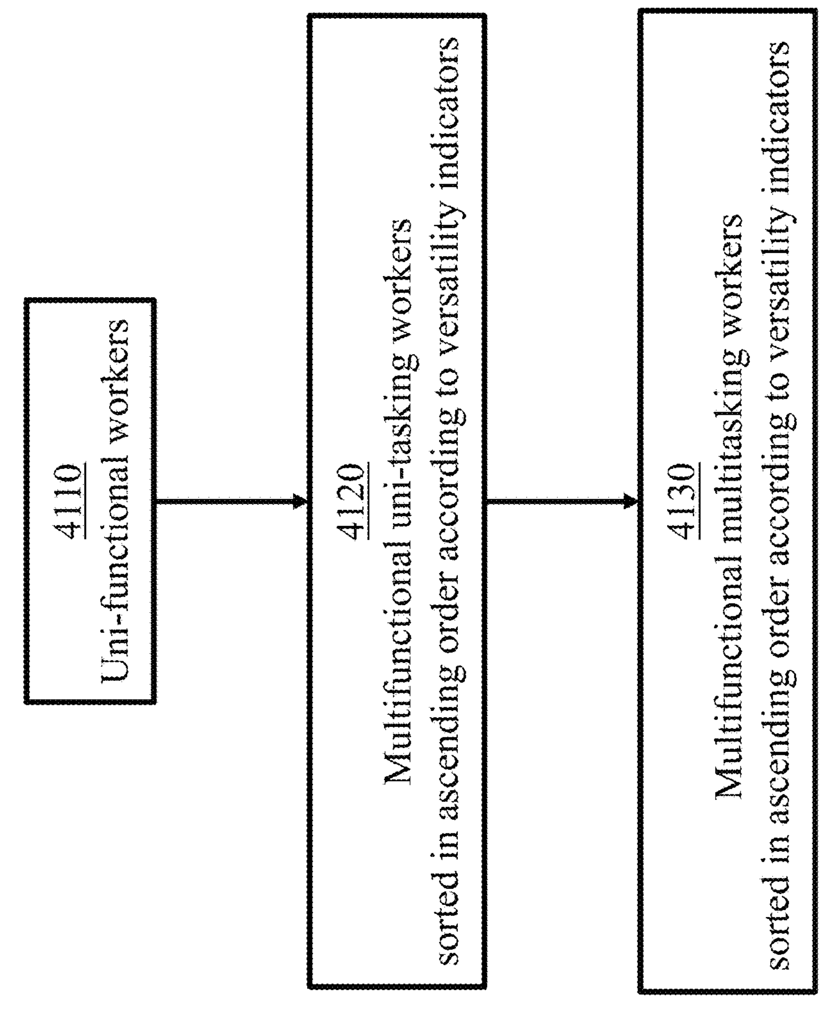
FIG. 41 illustrates a preferred order of selection of the heterogenous workers of FIG. 40, in accordance with an embodiment of the present invention.

FIG. 41 illustrates a preferred order 4100 of selection of the heterogenous workers of FIG. 40, starting with a set 4110 of uni-functional worker, then a set 4120 of multifunctional uni-tasking workers sorted according to an ascending order of versatility indicators, and a set 4130 of multifunctional multitasking workers sorted according to an ascending order of versatility indicators. The versatility indicator of a worker type is the number of tasks that a worker is configure to perform whether one at a time or concurrently. In the example of FIG. 40, the versatility of a worker type is the number of "1" digits within a corresponding string 4030. Thus, the versatility indicators of the nine multifunctional uni-tasking worker types (middle column from top, are {1, 2, 2, 3, 4, 5, 6, 6, 8}, respectively, and the versatility indicators of the twelve multifunctional multitasking worker types (right column, from Top) are {2, 2, 3, 3, 3, 3, 4, 4, 4, 5, 5, 8}, respectively.

Figure 42:
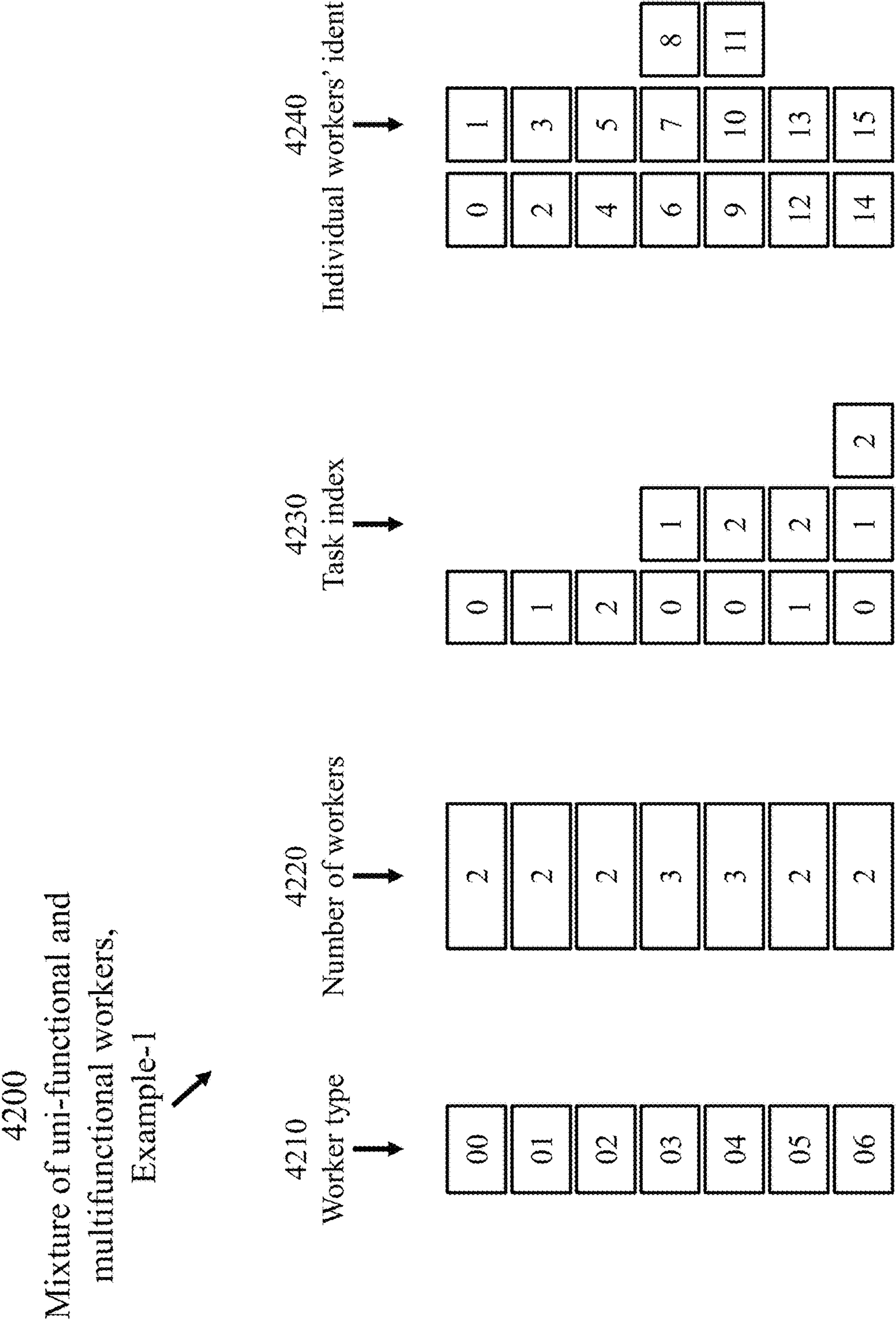
FIG. 42 illustrates a first example of a mixture of uni-functional and multifunctional workers.

FIG. 42 illustrates a first example 4200 of a mixture of uni-functional and multifunctional worker types 4210. Seven worker types, indexed as 0 to 6. are indicated with corresponding:

- numbers 4220 of workers per worker types;
- indices 4230 of tasks that a respective worker is configured to perform; and
- identifiers 4240 of individual workers.

In the example of FIG. 42, the total number of workers is 16, identified as 0 to 15. There are two workers (0, 1) of worker-type 00, two workers (2, 3) of worker-type 01, two workers (4, 5) of worker-type 02, three workers (6, 7, 8) of worker-type 03, three workers (9, 10, 11) of worker-type 04, two workers (12, 13) of worker-type 05, and two workers (14, 15) of worker-type 06. A worker of worker-type 00 performs only a task of index 0, a worker of worker-type 03 may perform task 0 and/or task 1. A worker of worker-type 06 may perform all, or any subset of tasks 0, 1, and 2.

Figure 43:
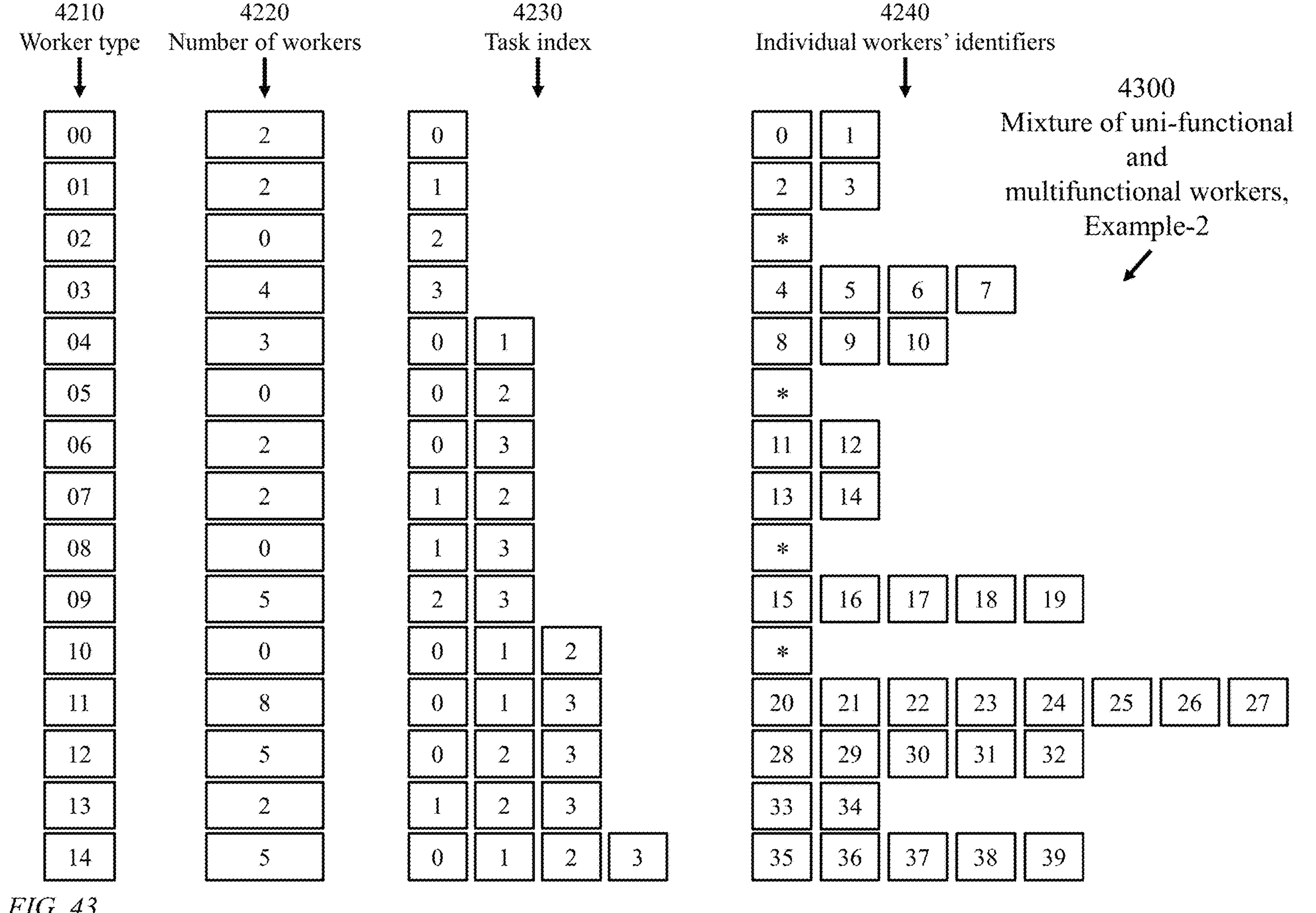
FIG. 43 illustrates a second example of a mixture of uni-functional and multifunctional workers.

FIG. 43 illustrates a second example 4300 of a mixture of uni-functional and multifunctional worker types. Fifteen worker types indexed as 00 to 14 are indicated with corresponding numbers 4220 of workers per worker types, indices 4230 of tasks that a respective worker is configured to perform, and identifiers 4240 of individual workers. In the example of FIG. 43, the total number of workers is 40, identified as 0 to 39. A number of workers 4230 designated as a "*" signifies that workers of a corresponding type are not yet provided. There are two workers (11, 12) of type 06, each configured to perform tasks 0 and 3, five workers (15, 16, 17, 18, 19) of type 09, each configured to perform tasks 2 and 3, and five workers (35, 36, 37, 38, 39) of type 14, each configured to perform tasks 0, 1, 2, and 3.

Workers of types 00 to 03, are uni-functional workers of a versatility indicator of 1. Workers of types 04 to 09 are multifunctional workers of a versatility indicator of 2. Workers of types 10 to 13 are multifunctional workers of a versatility indicator of 3. Workers of type 14 are multifunctional workers of a versatility order of 4.

FIG. 44 is a tabulation 4400 of worker types relevant to each task of each stage, the worker types being sorted in an ascending order according to worker's versatility. The numbers of worker types of stage-1 (the decoding stage), stage-2 (signal-processing stage-2), and stage-3 (the encoding stage) are 14, 9, and 12, respectively. A worker-type is stage-specific; a worker of type 02 of stage-1 performs a decoding-related task while a worker of type 02 of stage-3 performs an encoding task.

Figure 45:
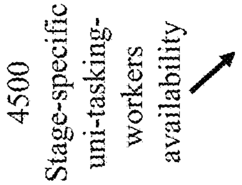
FIG. 45 illustrates a data structure for facilitating selection of workers for a case where all workers are uni-tasking workers, in accordance with an embodiment of the present invention.

FIG. 45 illustrates a data structure 4500 maintaining stage-specific workers data for facilitating selection of workers of a stage for a case where all workers are uni-tasking workers in a transcoding station employing a mixture of uni-functional and multifunctional uni-tasking workers. The symbol "*" (reference 4550) indicates a worker type that has not yet been provided. For each worker type, a number of provisioned workers, a number of available (free) workers, a versatility indicator, and respective task indices are indicated. In the example of FIG. 45, a worker of any of types {00, 04, 05, 06, 10, 11, 12, 14} is configured to perform task-0, a worker of any of types {01, 04, 07, 10, 11, 13, 14} is configured to perform task-1, and so on. The worker types are listed in an ascending order of versatility. If each worker is configured to perform one task at a time, then a worker of any worker type for which the number of available workers is greater than zero may be allocated to a task under consideration. Preferably, a worker is selected from a worker group of a worker type of least versatility in order to increase the availability of workers of higher versatility for forthcoming allocations.

FIG. 46 illustrates a data structure 4600 for facilitating worker selection in a transcoding station employing a mixture of uni-functional and multifunctional workers of both uni-taking and multitasking capabilities. The data 4620 under the field of "available resources" is the product of the number of workers of a respective worker type and a corresponding maximum number of concurrent tasks. For example, a worker of a worker group of worker-type 11 can concurrently perform any two of three tasks (task-0, task-1, and task-3). Thus, the maximum number of available resources pertinent to worker-type 11 is 16.

The data 4640 under the fields of "number of task-specific available workers" for a specific task (of task type-0, task-type-1, task-type-2, or task-type-3) is the number workers of a respective worker type that are not performing the specific task and, therefore, may be available. Initially, the number of task-specific available workers of a work group of any work type is the number of workers of the work group. For example, the number 4640A of available workers of work-type 4 configured to perform task 0 and/or task 1 is the number or workers of type 4.

The "available resources" and "number of task-specific available workers", are time varying. The values indicated in FIG. 46 correspond to the initial state before any worker allocation takes place while values indicated in FIG. 47 correspond to the state of the transcoding station at a later time instant.

FIG. 47 illustrates exemplary entries 4700 of data structure 4600 in operation, corresponding to a particular stage, indicating a snapshot of availability of workers of the mixture of workers of FIG. 46. To allocate a worker of a candidate work-group (of a work type) to perform a task of a specific task-type to a new GOP, two conditions must be met: the number of task-specific workers and the number of available resources of the candidate work group must be greater than zero. For example, to allocate a worker to perform a task of task-type-2, candidate worker groups of worker types 07, 09, 12, 13, and 14 are examined. For worker-group 07, the number of task-specific available workers is zero. For worker-group-13, the number of available resources is zero. Hence, a worker may be selected from any of worker groups 09, 12, or 14 with corresponding versatility indicators of 2, 3, and 4, respectively. As illustrated in FIG. 41, the first available worker in the versatility-sorted list of worker types is preferred.

Figure 48:
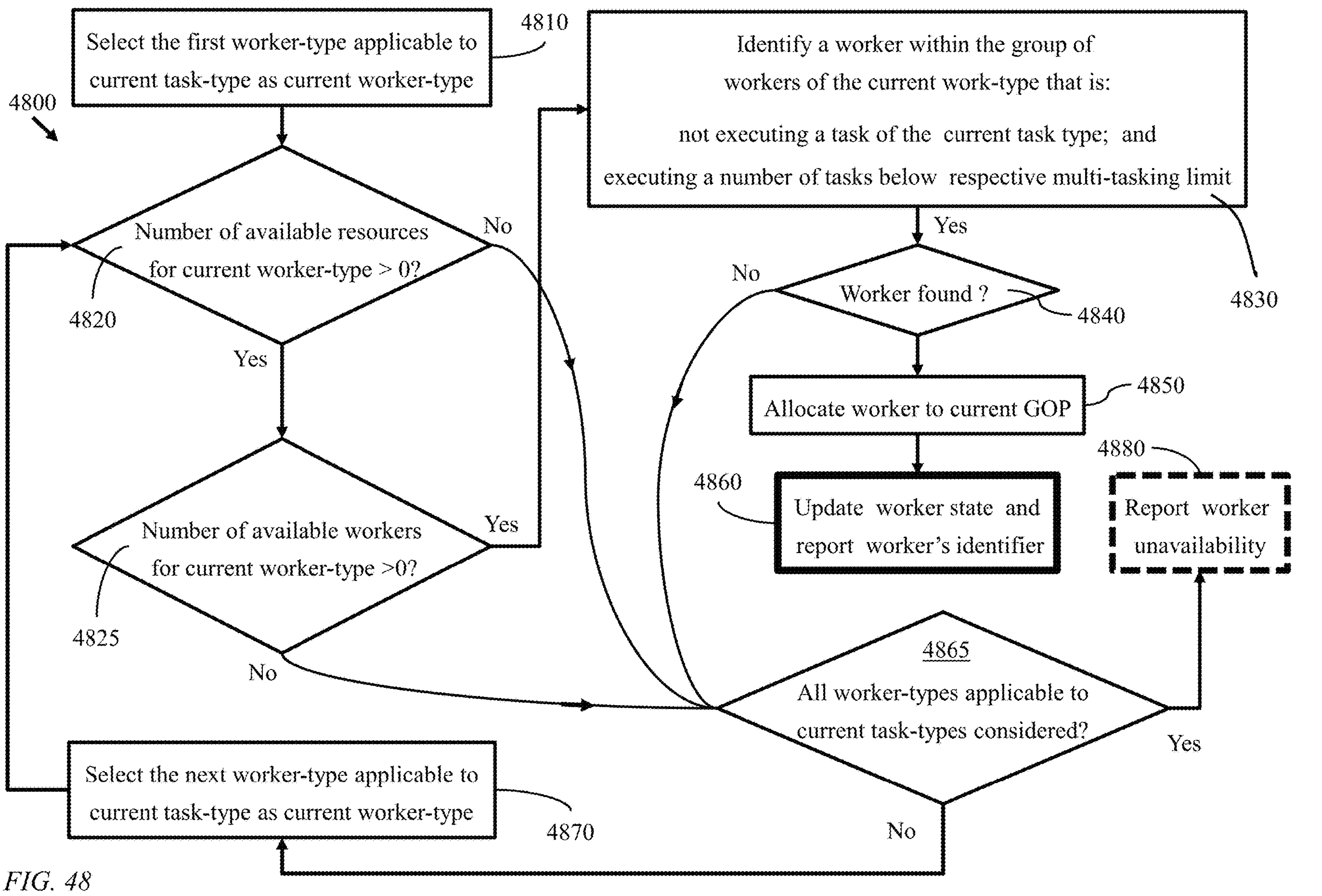
FIG. 48 illustrates processes of worker selection of heterogenous sources, in accordance with an embodiment of the present invention.

FIG. 48 illustrates processes 4800 of worker selection of heterogenous workers implemented as a stage controller 2451, 2452, or 2453. Process 4810 selects the first worker type applicable to a current task type as a current worker type. Process 4820 branches to process 4825 if the number of available resources 4620 for the current worker type exceeds zero, or branches to process 4865 otherwise. Process 4825 branches to process 4830 if the number of available workers for the current worker type exceeds zero, or branches to process 4865 otherwise. Process 4830 identifies a candidate worker, within the group of workers of the current worker type, satisfying two conditions: the candidate worker is not executing a task of the current task type; and the number of tasks that the candidate worker is executing is less than a respective multi-tasking limit.

Process 4840 branches to process 4865 if the candidate worker does not meet the above two conditions, or branches to process 4850 which allocates the candidate worker to a new GOP. Process 4860 then updates the state of the allocated candidate worker and reports the identifier of the allocated candidate worker.

Process 4865 determines if all worker-types (hence all worker groups) that are applicable to the current task type have been considered. If so, process 4880 reports unavailability of an appropriate worker; otherwise process 4870 is activated to select a subsequent worker-type that is applicable to the current task type as the current worker type then revisits process 4820.

Referring to FIG. 46 and FIG. 47, worker-types {00, 04, 06, 11, 12, 14} are applicable to task-type 0 and are considered sequentially. The sequence of worker-types applicable to task-types 1, 2, and 3 are: {01, 04, 07, 11, 13, 14}, {07, 09, 12, 13, 14}, and {03, 06, 09, 11, 12, 13, 14}, respectively.

Figure 49:
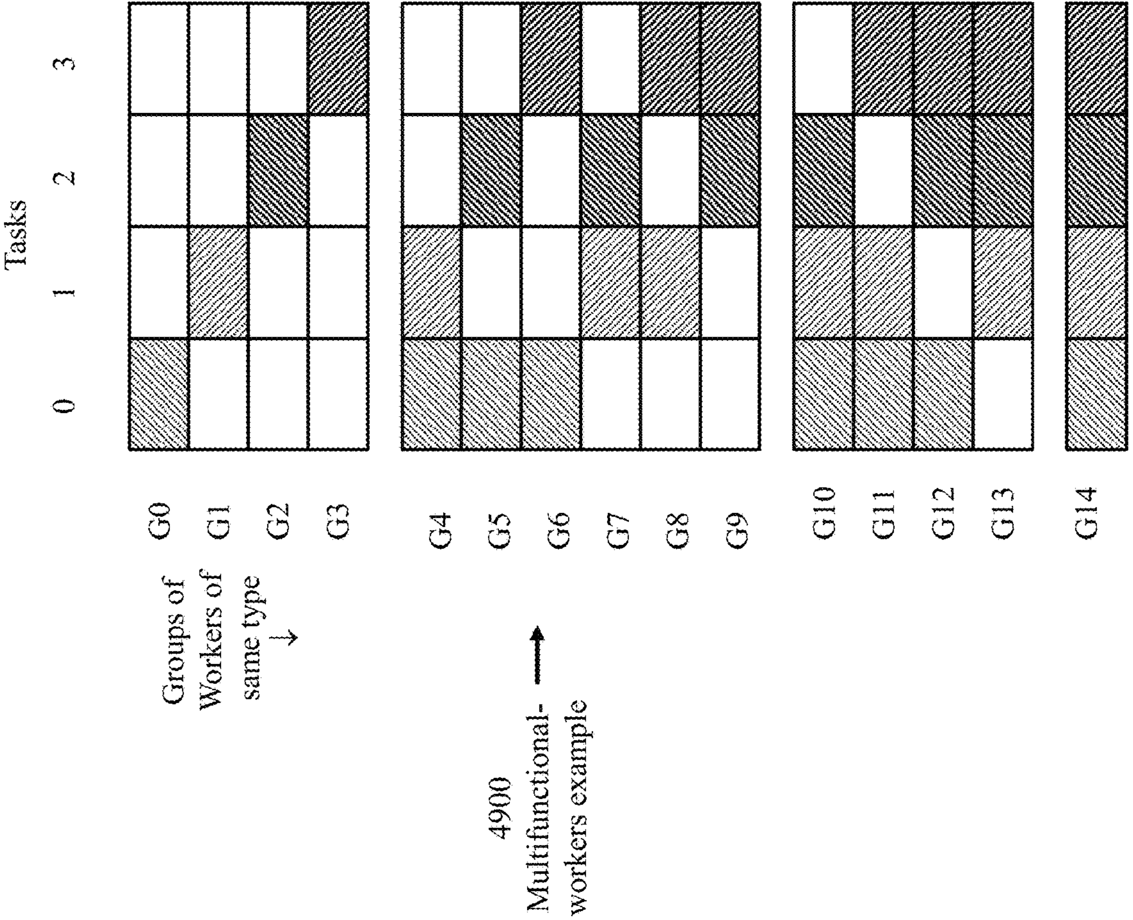
FIG. 49 illustrates examples of uni-functional and multi-functional worker types.

FIG. 49 illustrates worker-type-specific tasks 4900 that may be performed at each of uni-functional worker-type and multi-functional worker types used in FIG. 43, FIG. 46, and FIG. 47.

Figure 50:
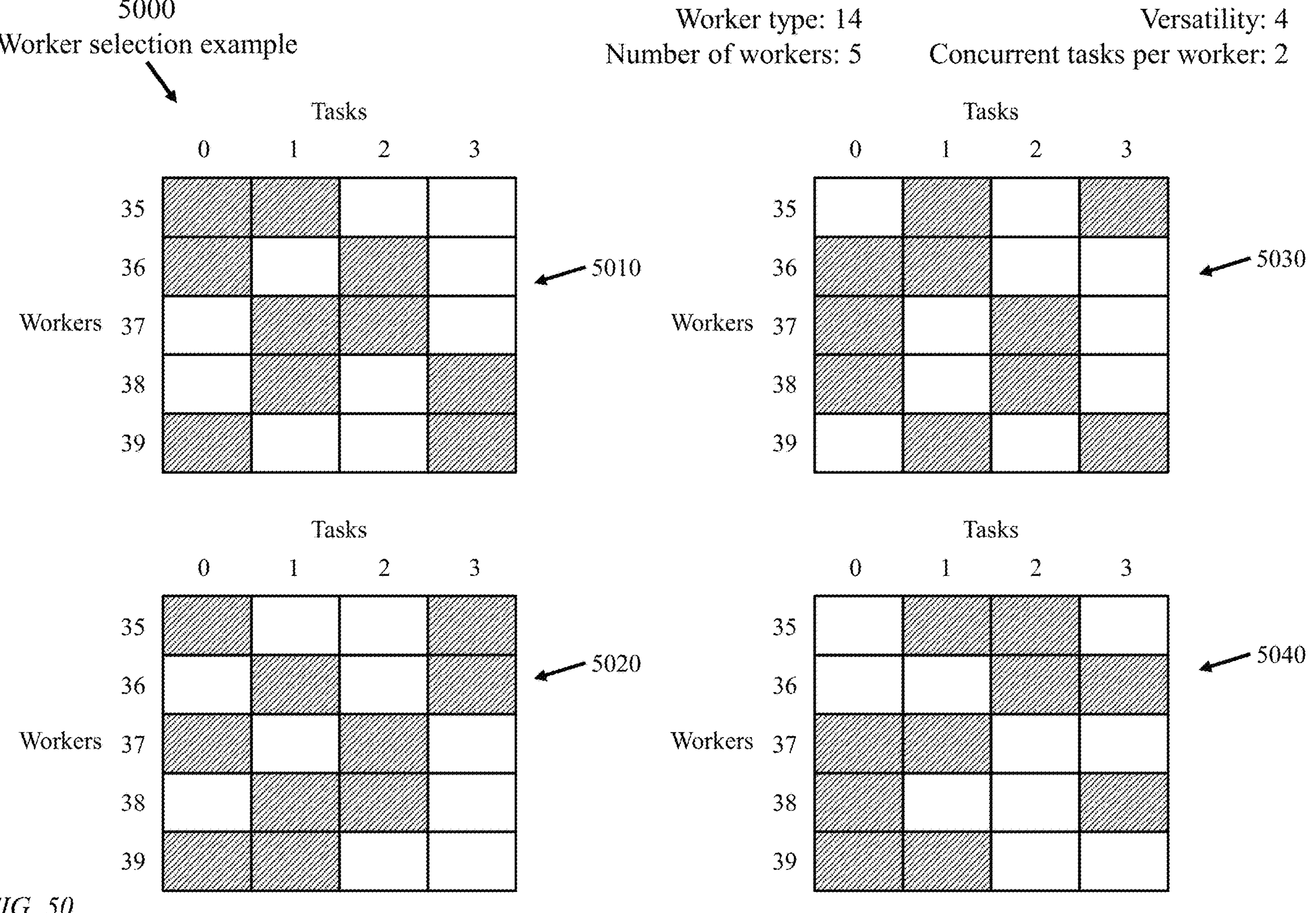
FIG. 50 illustrates patterns of worker selection from a respective worker group of a same worker type.

FIG. 50 illustrates exemplary worker-selection scenarios 5000 for the worker-group of worker-type 14 (FIG. 46, FIG. 47) which comprises five workers 35, 36, 37, 38, and 39, as indicated in FIG. 33, each configured to perform any of 4 tasks (versatility=4) but with a multi-tasking limit of 2 (at most two concurrent tasks per worker). Scenarios 5010, 5020, 5030, and 5040 correspond to cases where the work load of the worker group comprises three tasks of task-type 0, three tasks of task-type-1, two tasks of task-type-2, and two tasks of task type-3. Any three workers of the worker group may perform the three tasks of task-type 0, any two workers of the worker-group may perform the two tasks of task-type 2, etc.

Figure 51:
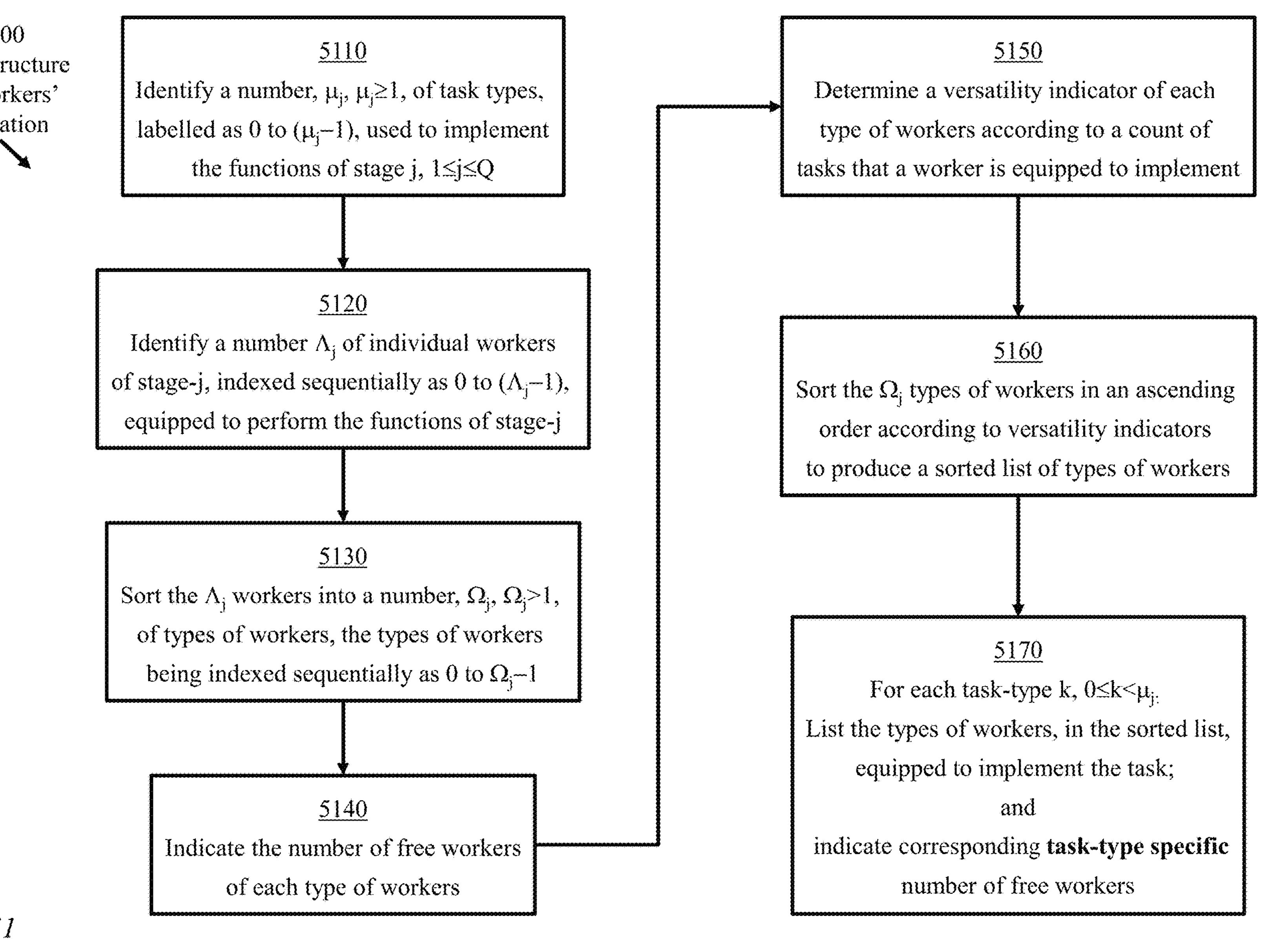
FIG. 51 illustrates a procedure for constructing a data structure for facilitating allocation of workers, in accordance with an embodiment of the present invention.

FIG. 51 illustrates a procedure 5100 for constructing a data structure (such as the exemplary data structure of FIG.

36) for facilitating allocation of workers. Process 5110 identifies a number $\mu_j$, $\mu_j>1$, of task types, labelled as 0 to $(\mu_j-1)$ performed in stage j, $0\le j<Q$, Q being a number of stages (Q=3 in the structure of FIG. 6, FIG. 7, and FIG. 8). In the structure of FIG. 33, FIG. 36 and FIG. 47, $\mu_j=4$.

Process 5120 identifies a number of individual workers of stage-j, indexed sequentially as 0 to $(\Lambda_j-1)$, in steps of 1, which are provisioned for stage-j. In the structure of FIG. 33, $\Lambda_j=40$. Process 5130 sorts the $\Lambda$j workers into a number $\Omega_j$, $\Omega_j>1$, of types of workers, indexed sequentially as 0 to $(\Omega_j-1)$ in steps of 1. In the structure of FIG. 33, FIG. 36, and FIG. 47, $\Omega_j=15$. Process 5140 tracks the number of free workers of each group of workers of a same worker-type.

Process 5150 determines a versatility indicator of each type of workers according to a count of tasks that a worker is equipped to implement. Process 5160 sorts the $\Omega_j$ types of workers in an ascending order according to versatility indicators to produce a sorted list of types of workers. In the structure of FIG. 33 and FIG. 36, worker-types 00 to 03 have a versatility of 1, worker-types 04 to 09 have a versatility of 2, worker-types 10 to 13 have a versatility of 3, and worker-type 14 has a versatility of 4. For each task-type k, $0\le k<\mu_j$, of stage-j, process 5170 lists the types of workers equipped to implement a task of type k and indicates corresponding task-type-specific number of free workers.

Figure 52:
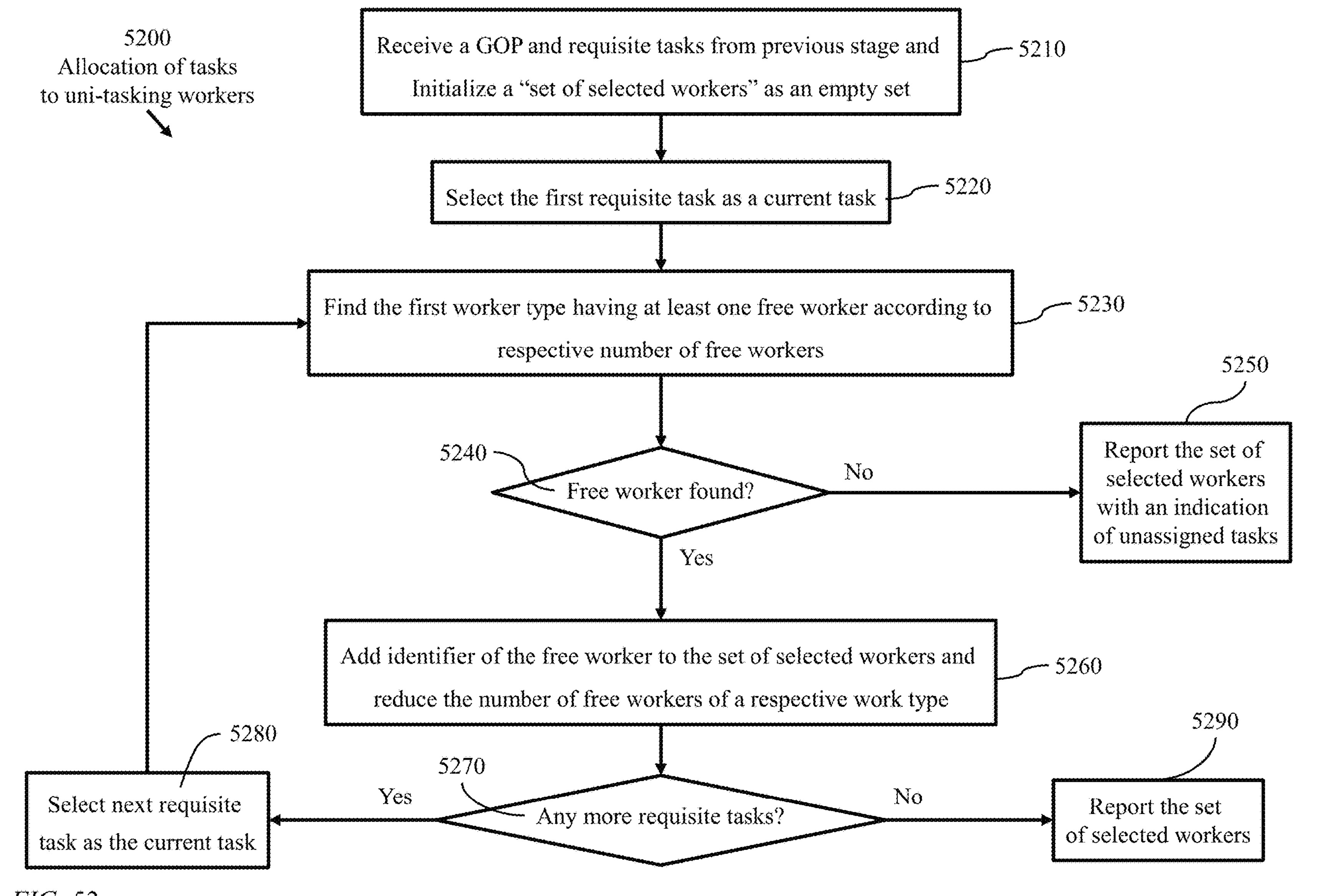
FIG. 52 illustrates a procedure for allocating tasks to workers for a case of FIG. 45 where all workers are uni-tasking workers, in accordance with an embodiment of the present invention.

FIG. 52 illustrates a procedure 5200 for allocating tasks to workers for a case of a transcoding station employing a mixture of uni-functional and multifunctional workers where all workers are uni-tasking workers (such as in the case of FIG. 45). Process 5210 receives a GOP and corresponding requisite tasks from a previous stage and initializes a "set of selected workers" as an empty set. Process 5220 selects the first requisite task as a current task. Process 5230 finds the first worker type that has at least one free worker. If no free worker is found, process 5240 branches to process 5250 which reports the set of selected workers, if any, with an indication of unassigned tasks. Otherwise, process 5260 adds an identifier of the free worker to the set of selected workers and reduces the number of free workers of the respective work group. If all requisite tasks have been assigned, process 5270 branches to process 5290 which reports the set of selected workers for the requisite tasks. Otherwise, process 5270 branches to process 5280 which selects a subsequent requisite task and revisits process 5230.

Figure 53:
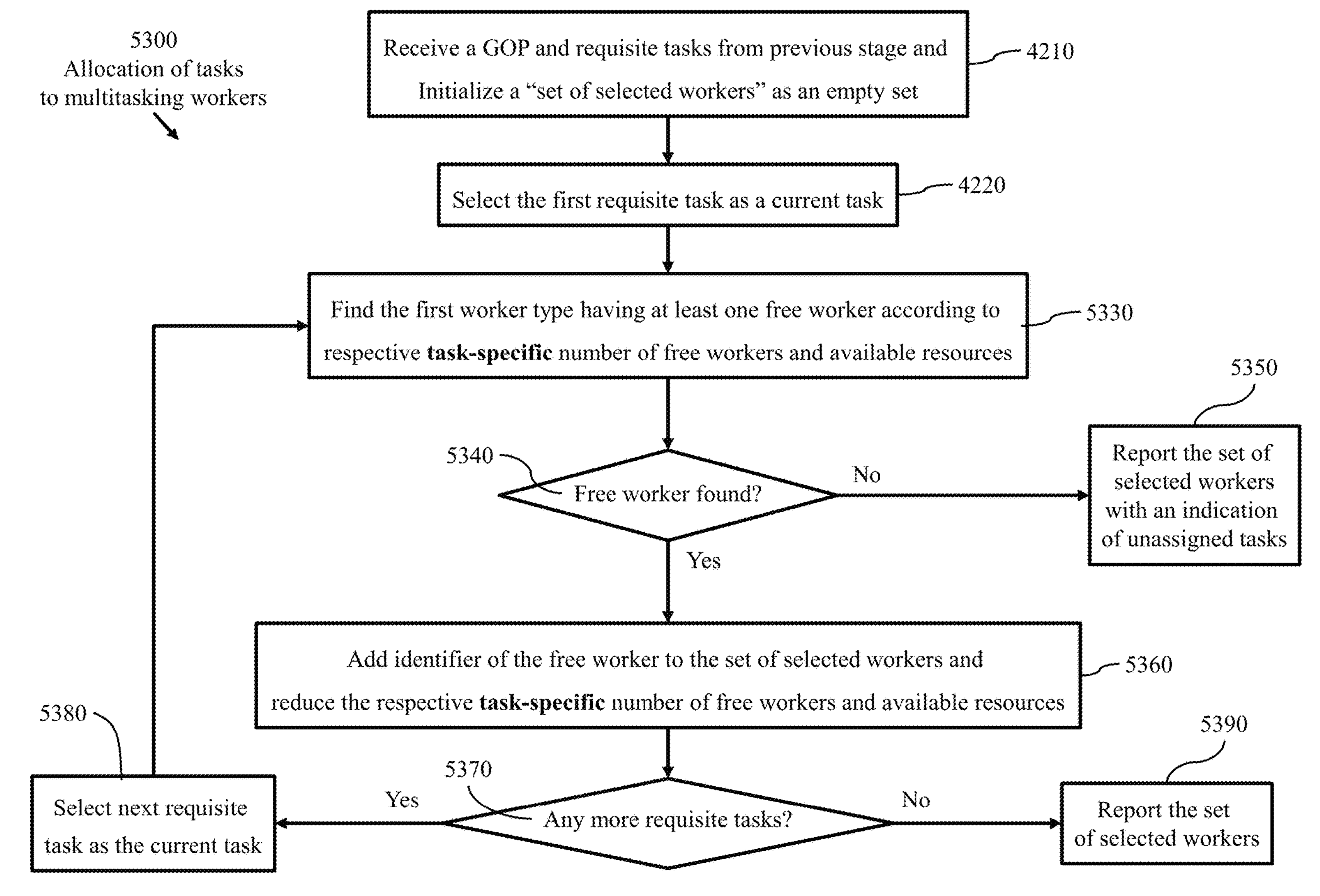
FIG. 53 illustrates a procedure for allocating tasks to workers for the case of FIG. 46 where a mixture of workers comprises both uni-tasking workers and multitasking workers, in accordance with an embodiment of the present invention.

FIG. 53 illustrates a procedure 5300 for allocating workers to tasks for a case of a transcoding station employing a mixture of uni-functional and multifunctional workers with workers of both uni-tasking and multicasting capabilities. As in the procedure of FIG. 52, process 5210 receives a GOP and corresponding requisite tasks from a previous stage and initializes a "set of selected workers" as an empty set. Process 5220 selects the first requisite task as a current task.

Process 5330 finds the first worker type that has at least one free worker based on respective task-specific available workers and available resources 3620. If no free worker is found, process 5340 branches to process 5350 which reports the set of selected workers, if any, with an indication of unassigned tasks. Otherwise, process 5340 branches to process 5360 which adds an identifier of the free worker to the set of selected workers and reduces the number of task-specific available workers and the number of available resources of the respective work group. If all requisite tasks have been assigned, process 5370 branches to process 5390 which reports the set of selected workers for the requisite tasks. Otherwise, process 5370 branches to process 5380 which selects a subsequent requisite task and revisits process 5330.

Multi-Stream Transcoding

Figure 54:
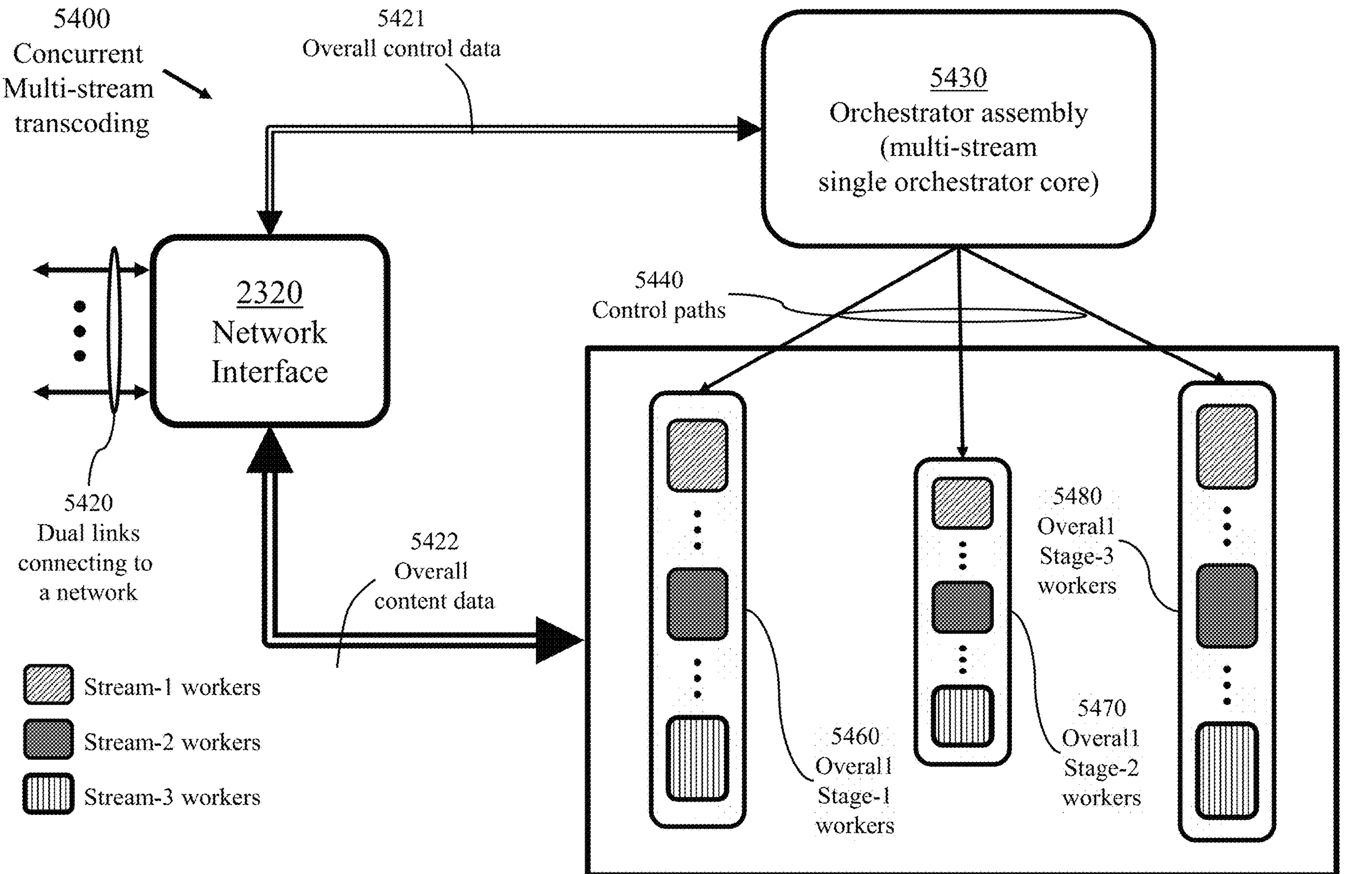
FIG. 54 is an overview of a transcoding station configured to concurrently transcode multiple streams using a shared orchestrator assembly, in accordance with an embodiment of the present invention.

FIG. 54 is an overview 5400 of a transcoding station configured to concurrently transcode multiple streams using a shared orchestrator core. Dual links 5420 connect the network interface 2320 to network 120. The network interface directs overall control data 5421 from all connecting multimedia sources 140 to an orchestrator assembly 5430 having a single orchestrator core configured to handle multiple streams, and overall content data 5422 from all connecting multimedia sources 140 to a pool 5460 of overall stage-1 workers, handling all streams, which transfer processed content of all streams to a pool 5470 of stage-2 workers handling all streams which, in turn, transfer processed content of all streams to a pool 5480 of stage-3 workers handling all streams.

Figure 55:
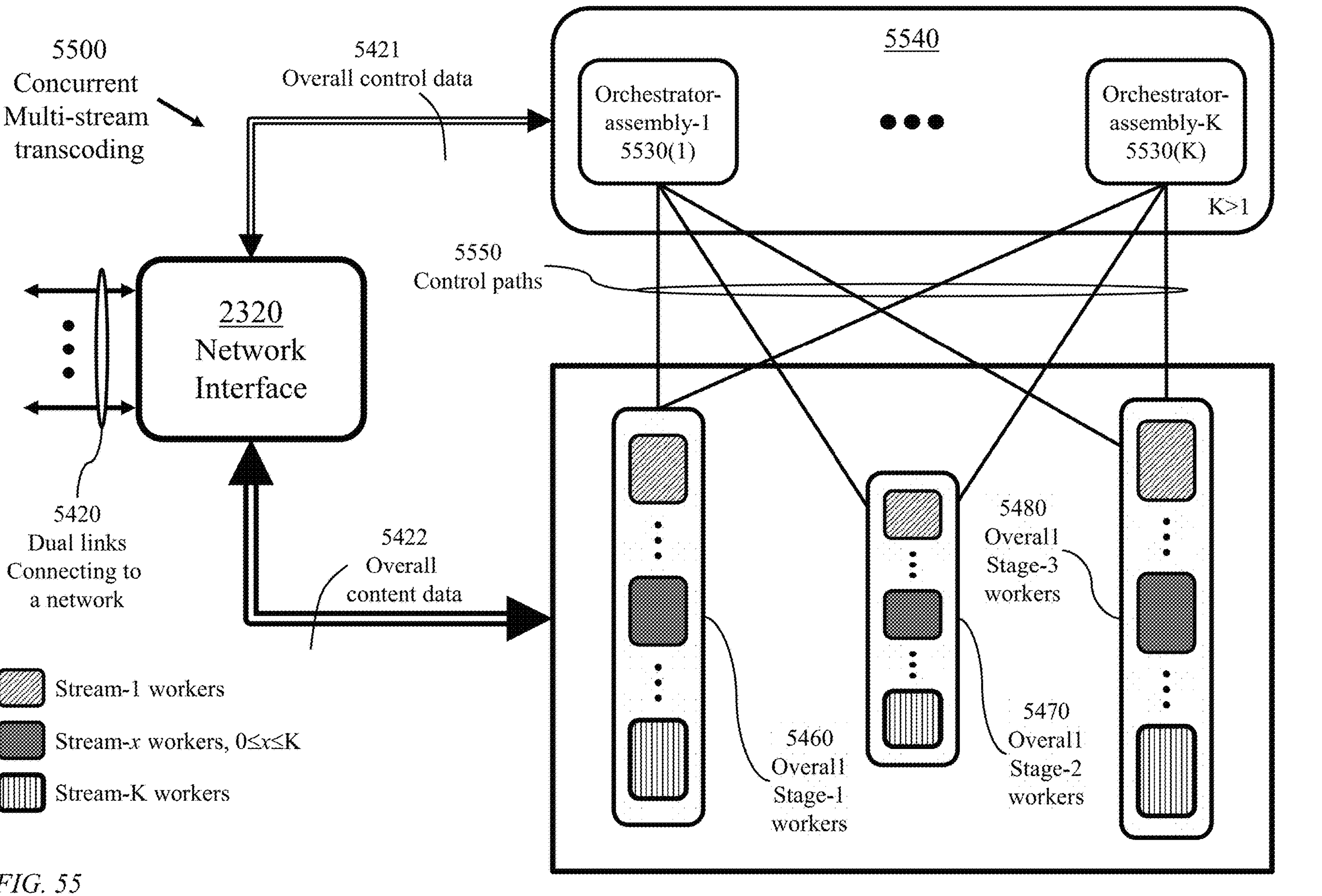
FIG. 55 is an overview of a transcoding station configured to concurrently transcode multiple streams using multiple orchestrator assemblies, in accordance with an embodiment of the present invention.

FIG. 55 is an overview 5500 of a transcoding station configured to concurrently transcode multiple streams using a set 5540 of K orchestrator assemblies 5530(1) to 5530(K), K>1. The set of K orchestrator assemblies control content processing and content transfer through dual control paths 5550 between the set 5540 of orchestrator assemblies and the pools of shared workers 5460, 5470, and 5480. The number of multimedia streams that may be transcoded concurrently is determined dynamically according to execution-duration measurements.

Figure 56:
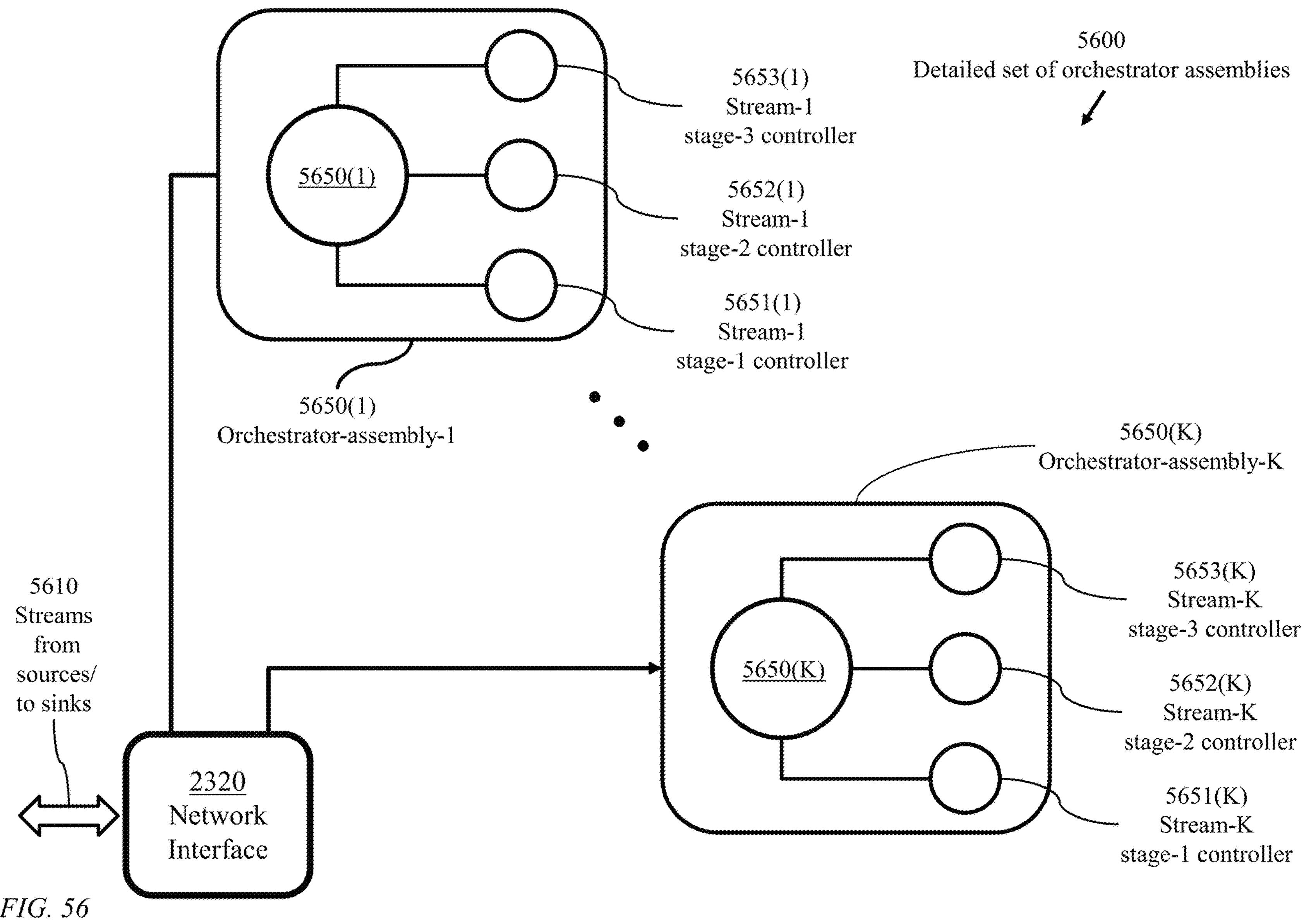
FIG. 56 further details the orchestrator assemblies of FIG. 55.

FIG. 56 further details the transcoding station of FIG. 55. Each of orchestrator assemblies 5530(1) to 5530(K) comprises a respective orchestrator core 5650 coupled to respective stage controllers 5651, 5652, and 5653, of stages 1 to 3, respectively. Orchestrator-assembly 5530(*j*) comprises orchestrator core 5650(*j*) and stage controllers 5651(*j*), 5652(*j*), and 5653(*j*), $1\le j\le K$.

Figure 57:
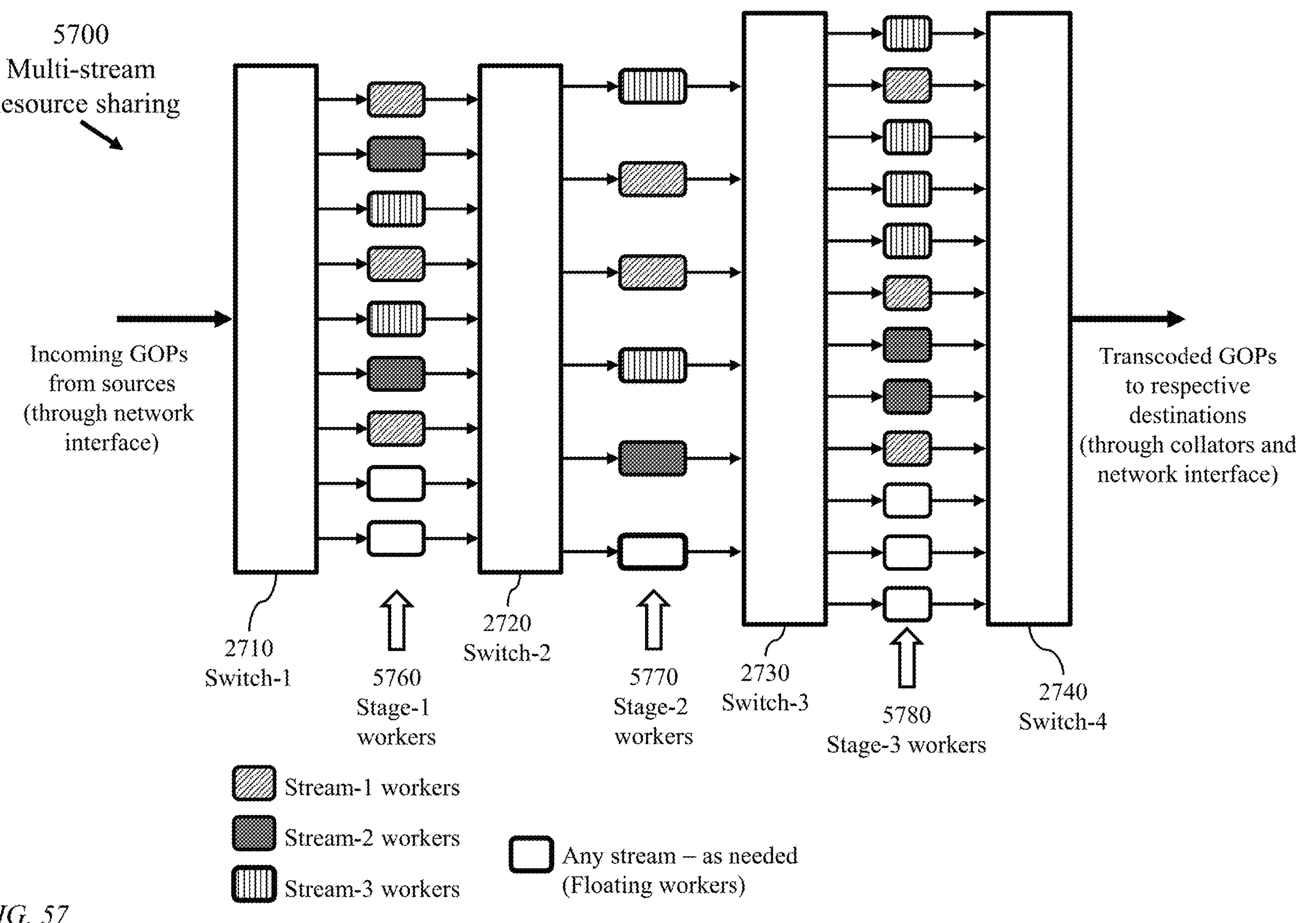
FIG. 57 illustrates a shared content-processing assembly for the transcoding station of FIG. 54, in accordance with an embodiment of the present invention.

FIG. 57 illustrates a shared content-processing assembly 5700 for the transcoding station of FIG. 54 including a first switch 2710 for distributing incoming GOPs from multimedia sources 140 to first-stage workers 5760, a second switch 2720 for distributing decoded GOPs to second-stage workers 5770, a third switch 2730 for distributing processed GOPs to third-stage workers 5780, and a fourth switch 2740 for distributing encoded (transcoded) GOPs to respective clients 180 through the network interface 320.

The workers of each stage are adaptively allocated to any stream of a set of concurrently transcoded streams. Stage-1 workers 5760 include a first number of decoders which may be dynamically partitioned among multiple independent GOP streams. Likewise, stage-2 workers 5770 include a second number of VPUs which may be partitioned, and stage-3 workers 5780 include a third number encoders which may be partitioned.

Figure 58:
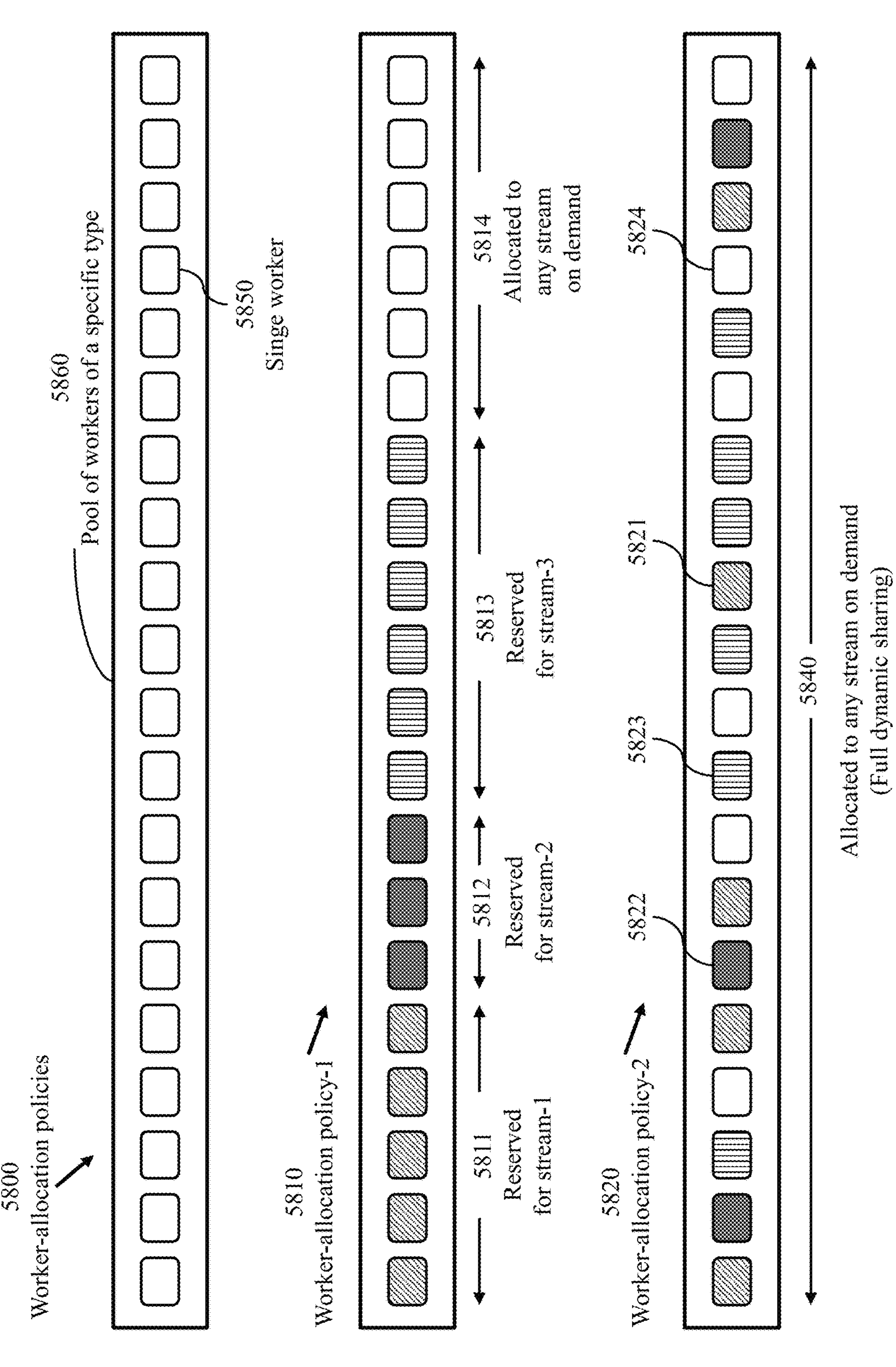
FIG. 58 illustrates policies for allocation of workers of a specific worker type to tasks of multiple streams of the transcoding station of FIG. 54, in accordance with an embodiment of the present invention.

FIG. 58 illustrates policies 5800 for allocation of workers of a specific worker type to tasks of multiple streams of the transcoding station of FIG. 54 or FIG. 55. Individual workers 5850 of a pool 5860 of workers of a specific worker type may be allocated to handle GOPs of different streams according to any of sharing policies.

According to a first worker-allocation policy 5810, the pool 5860 of workers may be segmented into stream-specific groups with an additional group of floating workers that may be adaptively allocated to any of the streams based on workload fluctuation. In the illustrated example, the pool comprises 20 workers 5850 serving three streams labeled stream-1, stream-2, and stream-3. A set 5811 of five workers 5850 is reserved for stream-1, a set 5812 of three workers is reserved for stream-2, and a set 5813 of six workers is reserved for stream-3. Workers of the remaining group 5814 of six workers may be individually allocated to any of the three streams according to time-varying processing requirement; any released worker of group 5814 becomes available to any stream.

According to a second worker-allocation policy 5820, any worker of the pool 5860 of workers may be allocated to any of the streams and when released may be allocated to any other stream. As illustrated, at some time instant, the workers 5850 may be allocated as indicated in pattern 5840 with five workers, individually referenced as 5821 allocated to tream-1, three workers, individually referenced as 5822 allocated to tream-1, six workers, individually referenced as 5823 allocated to tream-3. Unassigned or released workers, individually referenced as 5824 may be individually allocated to any stream.

Figure 59:
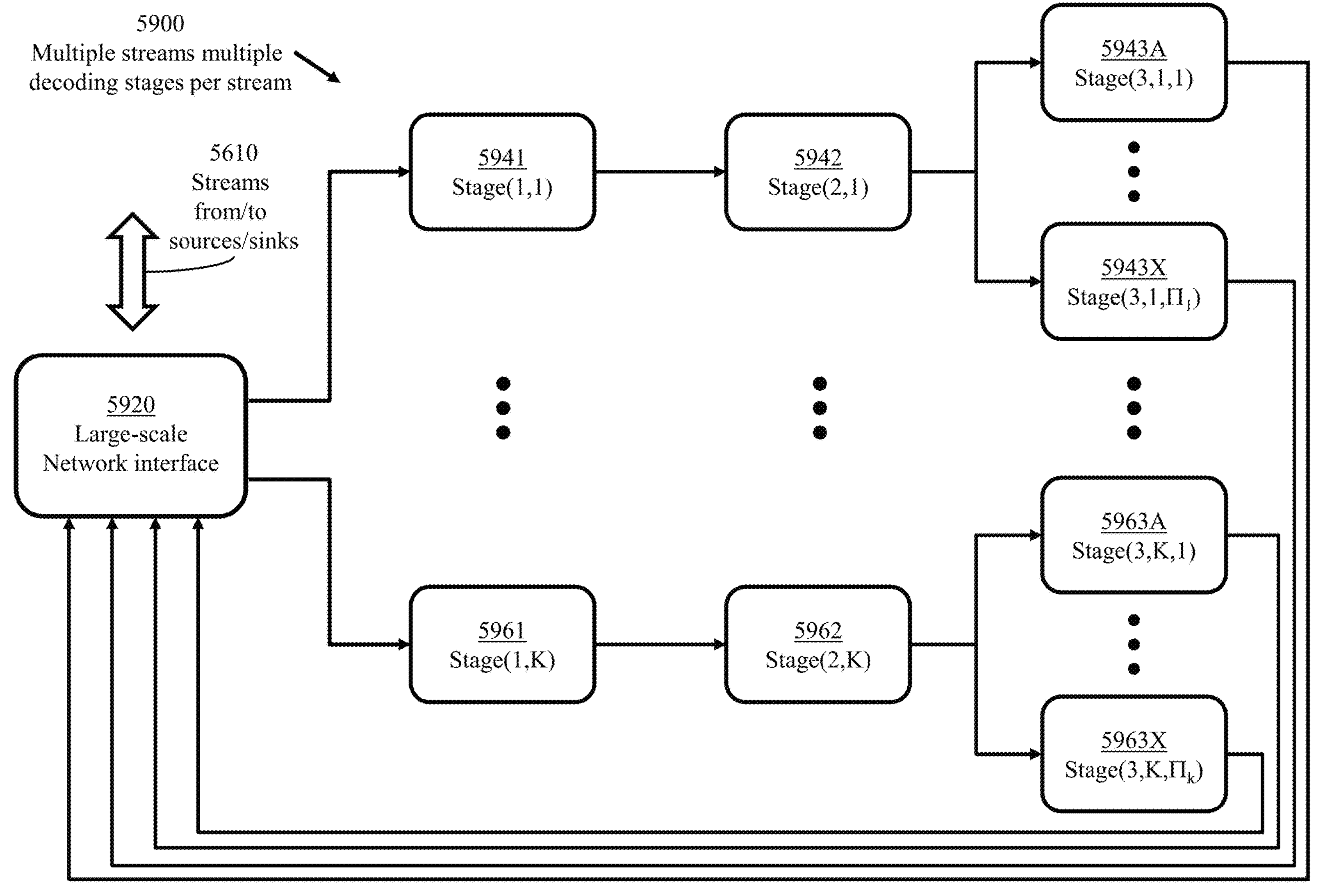
FIG. 59 is an overview of a large-scale transcoding station concurrently handling multiple streams, in accordance with an embodiment of the present invention.

FIG. 59 is an overview 5900 of a large-scale transcoding station concurrently receiving at large-scale network interface 5920 multiple incoming multimedia streams and producing multiple transcoded streams per incoming stream according to different standards. With K parallel streams, K>1, received from different multimedia sources 140, each stream is processed using a respective pool of stage-1 workers, pool of stage-2 workers, and pool of stage-3 workers. Additionally, parallel stage-3 pools may be needed for at least one stream to handle the case where a transcoded stream is directed to receivers obeying different standards. As illustrated, stage-1 pools of workers 5941 to 5961 are indexed as (1, j), stage-2 pools of workers 5942 to 5962 are indexed as (2, j), and stage-3 pools of workers 5943 to 5963 are indexed as (3, j, $\Pi_j$), for a stream of index j, 1≤j≤K, where Πj is a number parallel stage-3 pools of workers for stream-j.

System Analytics

Figure 60:
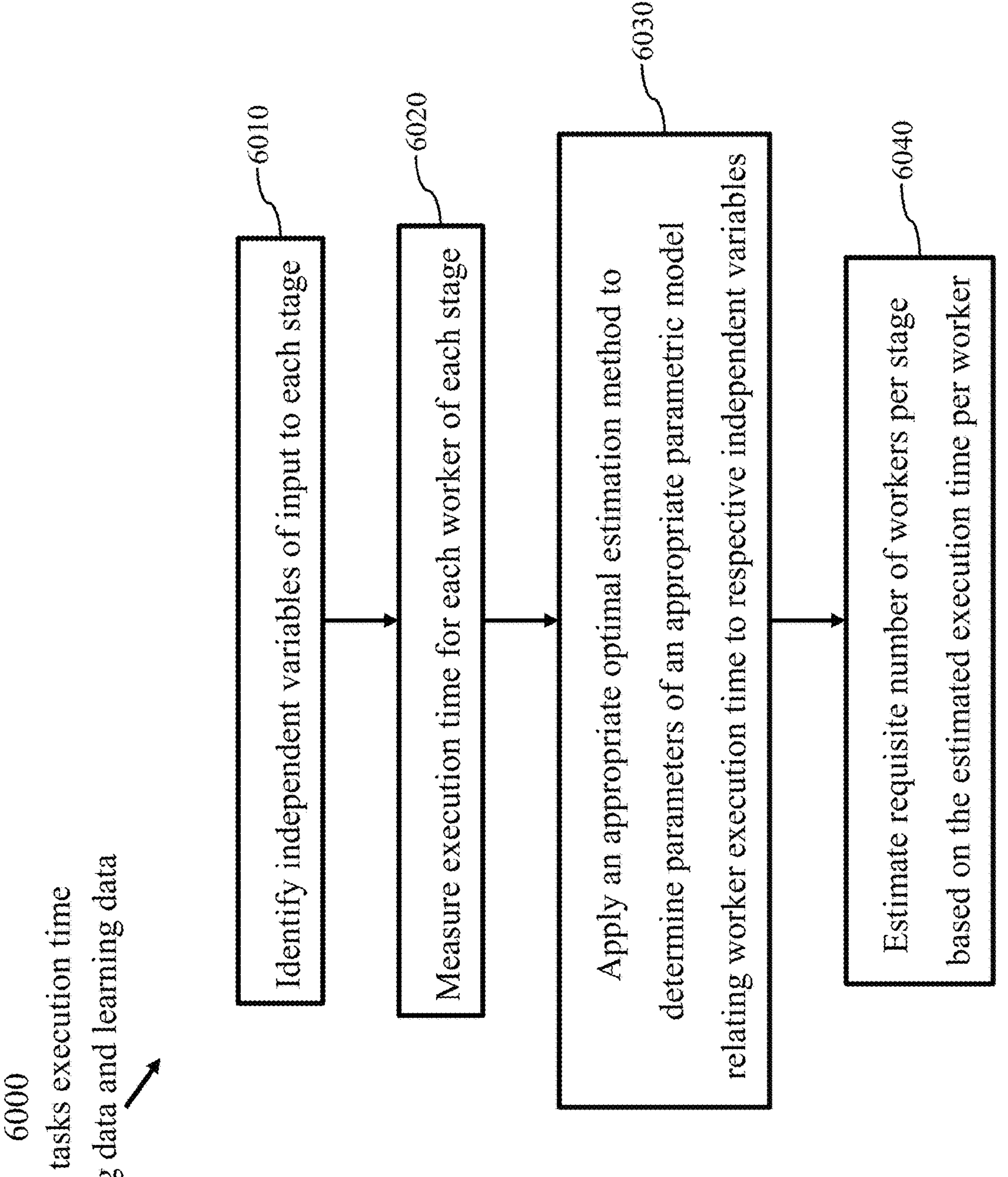
FIG. 60 illustrates a method of measuring task-execution durations using both training data and operational data, in accordance with an embodiment of the present invention.

FIG. 60 illustrates a method 6000 of measuring task-execution durations using both training data and operational data. The method may be implemented at orchestrator core 2450 or at any, or all, of orchestrator cores 5530(1) to 5530(K). Process 6010 identifies characteristics (such as GOP sizes, frame rates, standard according to which incoming GOPs are formed, standard according to which outgoing GOPs are to be formed, etc.) of GOPs handled at each of the three stages (decoding stage, video-signal-processing stage, and encoding stage). Process 6020 measures task-execution time duration at each stage for each worker type. Process 6030 applies an appropriate optimal-estimation method to determine parameters of an appropriate parametric model relating task-execution duration to GOP characteristics and worker types. Process 6040 estimates a requisite number of workers per stage based on the measurements.

FIG. 61 illustrates tracked data 6100 relevant to stage-1 including time measurements corresponding to specific stage-1 metadata. The metadata includes frames/second of received GOPs, number of frames per GOP, number of pixels per raw frame, sizes of compressed GOPs.

FIG. 62 illustrates tracked data 6200 relevant to stage-2 including time measurements corresponding to specific stage-2 metadata. The metadata includes frames/second of processed GOPs, and requisite signal-processing tasks.

FIG. 63 illustrates tracked data 6300 relevant to stage-3 including time measurements corresponding to specific stage-3 metadata. The metadata includes frames/second of transcoded GOPs, number of frames per transcoded GOP, and sizes of compressed transcoded GOPs.

Methods of the embodiment of the invention are performed using one or more hardware processors, executing processor-executable instructions causing the hardware processors to implement the processes described above. Computer executable instructions may be stored in processor-readable storage media such as hard disks, Flash ROMS, non-volatile ROM, and RAM. A variety of processors, such as microprocessors, digital signal processors, and gate arrays, may be employed.

Systems of the embodiments of the invention may be implemented as any of a variety of suitable circuitry, such as one or more microprocessors, digital signal processors (DSPs), application-specific integrated circuits (ASICs), field programmable gate arrays (FPGAs), discrete logic, software, hardware, firmware or any combinations thereof. When modules of the systems of the embodiments of the invention are implemented partially or entirely in software, the modules contain a memory device for storing software instructions in a suitable, non-transitory computer-readable storage medium, and software instructions are executed in hardware using one or more processors to perform the techniques of this disclosure.

It should be noted that methods and systems of the embodiments of the invention and data streams described above are not, in any sense, abstract or intangible. Instead, the data is necessarily presented in a digital form and stored in a physical data-storage computer-readable medium, such as an electronic memory, mass-storage device, or other physical, tangible, data-storage device and medium. It should also be noted that the currently described data-processing and data-storage methods cannot be carried out manually by a human analyst, because of the complexity and vast numbers of intermediate results generated for processing and analysis of even quite modest amounts of data. Instead, the methods described herein are necessarily carried out by electronic computing systems having processors on electronically or magnetically stored data, with the results of the data processing and data analysis digitally stored in one or more tangible, physical, data-storage devices and media.

The invention claimed is:

1. A transcoding station for multimedia transcoding comprising:

a network interface for receiving from a multimedia source a transcoding request and a multimedia stream comprising a video stream organized into source groups-of-pictures (GOPs), said transcoding request indicating a first standard according to which said multimedia stream is formed and a second standard according to which an encoded stream is to be formed;

a pool of decoders for concurrently decoding different GOPs, according to said first standard, to produce respective decoded GOPs;

a pool of signal-adaptors for concurrently processing different decoded GOPs to produce respective adapted GOPs; and a pool of encoders for concurrently encoding different adapted GOPs to produce respective encoded GOPs according to said second standard;

an orchestrator assembly configured to:

assign each source GOP to an available decoder, each decoded GOP to an available signal adaptor, and each adapted GOP to an available encoder;

track counts of source GOPs, decoded GOPs, and adapted GOPs waiting for assignment to respective decoders, signal-adaptors, and encoders, respectively;

subject to a determination that any of the counts exceeds a respective prescribed threshold, instruct the multimedia source, through the network interface, to pause transmission of said multimedia stream;

subject to a determination that none of the counts exceeds a corresponding prescribed threshold while transmission of the multimedia stream is paused, instruct the multimedia source, through the network interface, to resume transmission of said multimedia stream; and a content-processing assembly, configured to provide said each source GOP access to said available decoder, said each decoded GOP access to said available signal adaptor, and said each adapted GOP access to said available encoder.

2. The transcoding station of claim 1 further comprising an output-collating module, coupled to said network interface, configured to arrange successive encoded GOPs in the order of corresponding source GOPs.

3. The transcoding station of claim 1 wherein each decoder of said pool of decoders, each signal adaptor of said pool of signal adaptors, and each encoder of said pool of encoders comprises a respective hardware processor coupled to a memory device storing software instructions, and a buffer holding intermediate data.

4. The transcoding station of claim 1 wherein said orchestrator assembly is further configured to:

upon receiving said transcoding request from said multimedia source:

determine availability time based on current occupancy of each of said pool of decoders, said pool of signal adaptors, and said pool of encoders; and communicate said availability time to said multimedia source through said network interface.

5. The transcoding station of claim 1 wherein said content-processing assembly comprises:

a first content-access unit coupled to said network interface and said pool of decoders;

a second content-access unit coupled to said pool of decoders and said pool of signal-adaptors;

a third content-access unit coupled to said pool of signal-adaptors and said pool of encoders; and a fourth content-access unit, comprising a collating module, coupled to said pool of encoders and said network interface.

6. The transcoding station of claim 5 wherein said orchestrator assembly comprises an orchestrator core coupled to a set of controllers comprising:

a first controller, coupled to said first content-access unit and said pool of decoders;

a second controller, coupled to said second content-access unit and said pool of signal adaptors; and a third controller coupled to said third content-access unit and said pool of encoders.

7. The transcoding station of claim 1 wherein said network interface is further configured to:

affix a GOP identifier to said each source GOP of said multimedia stream; and send the source GOP identifiers and corresponding metadata to said orchestrator assembly and to said content-processing assembly.

8. The transcoding station of claim 5 wherein said orchestrator assembly is further configured to:

queue an identifier of said each source GOP;

upon locating said available decoder, instruct said content-processing assembly to process content of said each source GOP;

queue an identifier of said each decoded GOP;

upon locating said available signal adaptor, instruct said content-processing assembly to process content of said each decoded GOP;

queue an identifier of said each adapted GOP;

upon locating said available encoder, instruct said content-processing assembly to process content of said each adapted GOP.

9. The transcoding station of claim 1 wherein:

said pool of decoders comprises a first number of clusters of respective distinct decoders;

said pool of signal-adaptors comprises a second number of clusters of respective distinct signal-adaptors;

said pool of encoders comprises a third number of clusters of respective distinct encoders;

and based on information within said transcoding request:

said available decoder is selected from a compatible cluster of said first number of clusters;

said available signal-adaptor is selected from a compatible cluster of said second number of clusters; and said available encoder is selected from a compatible cluster of said third number of clusters.

10. A method of multimedia transcoding comprising:

receiving, at a network interface, from a multimedia source, a transcoding request and a multimedia stream comprising a video stream organized into source groups-of-pictures (GOPs) and corresponding metadata, said transcoding request indicating a first standard according to which said multimedia stream is formed and a second standard according to which an encoded stream is to be formed;

and performing, using a hardware orchestrator assembly and a content-processing assembly, processes of:

supplying said source GOPs to a pool of decoding workers, with multiple decoding workers concurrently decoding different GOPs, according to said first standard, to produce respective decoded GOPs;

supplying said respective decoded GOPs to a pool of signal-adaptation workers, with multiple signal-adaptation workers concurrently processing different decoded GOPs to produce respective adapted GOPs;

supplying said respective adapted GOPs to a pool of encoding workers with multiple encoding workers concurrently encoding different adapted GOPs to produce respective encoded GOPs according to said second standard;

continually tracking a first count of GOPs waiting for processing at said pool of decoding workers, a second count of decoded GOPs waiting for processing at said pool of signal-adaptation workers, and a third count of adapted GOPs waiting for processing at said pool of encoding workers;

subject to a determination that any of said first count, second count, or third count exceeds a respective prescribed threshold, instructing the multimedia source, through the network interface, to pause transmission of said multimedia stream; and subject to a determination that none of said first count, second count, and third count exceeds a corresponding prescribed threshold while transmission of the multimedia stream is paused, instructing the multimedia source, through the network interface, to resume transmission of said multimedia stream.

11. The method of claim 10 further comprising said network interface performing processes of:

affixing a GOP identifier to each source GOP of said multimedia stream; and sending GOP identifiers to said orchestrator assembly and to said content-processing assembly.

12. The method of claim 10 further comprising:

segmenting said pool of decoding workers into a first number of distinct clusters of decoding workers;

segmenting said pool of signal-adaptation workers into a second number of distinct clusters of signal-adaptation workers; and segmenting said pool of encoding workers into a third number of distinct clusters of encoding workers; and based on information within said transcoding request:

selecting said multiple decoding workers from a respective cluster of decoding workers;

selecting said multiple signal-adaptation workers from a respective cluster of signal-adaptation workers; and selecting said multiple encoding workers from a respective cluster of encoding workers.

13. The method of claim 10 further comprising said orchestrator assembly arranging successive encoded GOPs, of said respective encoded GOPs, according to an order of corresponding source GOPs of said multimedia stream.

* * * * *